United States Patent
Take

(10) Patent No.: US 7,749,626 B2
(45) Date of Patent: Jul. 6, 2010

(54) FUEL CELL POWER GENERATING SYSTEM WITH TWO FUEL CELLS OF DIFFERENT TYPES AND METHOD OF CONTROLLING THE SAME

(75) Inventor: Tetsuo Take, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 757 days.

(21) Appl. No.: 10/705,506

(22) Filed: Nov. 12, 2003

(65) Prior Publication Data
US 2004/0229092 A1  Nov. 18, 2004

(30) Foreign Application Priority Data

| Nov. 11, 2002 | (JP) | ............................. 2002-327233 |
| Dec. 11, 2002 | (JP) | ............................. 2002-359670 |
| Feb. 27, 2003 | (JP) | ............................. 2003-050732 |

(51) Int. Cl.
*H01M 8/04* (2006.01)
*H01M 8/12* (2006.01)

(52) U.S. Cl. ............................. 429/22; 429/23; 429/25; 429/17

(58) Field of Classification Search .................. 429/12, 429/17, 22, 23, 25
See application file for complete search history.

(56) References Cited

U.S. PATENT DOCUMENTS

| 4,098,960 | A | * | 7/1978 | Gagnon ........................ 429/25 |
| 4,859,545 | A | * | 8/1989 | Scheffler et al. .............. 429/17 |
| 5,221,586 | A | * | 6/1993 | Morimoto et al. ............. 429/20 |
| 5,961,928 | A | * | 10/1999 | Maston et al. .............. 422/110 |
| 6,120,923 | A | | 9/2000 | Van Dine et al. |
| 6,299,994 | B1 | | 10/2001 | Towler et al. |
| 6,306,531 | B1 | | 10/2001 | Clingerman et al. |
| 6,370,878 | B1 | | 4/2002 | Dean et al. |
| 6,475,655 | B1 | | 11/2002 | Nakanishi et al. |
| 6,551,732 | B1 | * | 4/2003 | Xu .............................. 429/17 |

(Continued)

FOREIGN PATENT DOCUMENTS

DE  19545186  6/1997

(Continued)

OTHER PUBLICATIONS

Official Action for Canadian Application No. 2,448,715.

(Continued)

*Primary Examiner*—Patrick Ryan
*Assistant Examiner*—Julian Mercado
(74) *Attorney, Agent, or Firm*—Venable LLP; Keith G. Haddaway; Michael A. Sartori

(57) ABSTRACT

A solid oxide fuel cell stack generates power by an electrochemical reaction of oxygen with hydrogen or hydrogen and carbon monoxide in a reformed gas which is produced from a natural gas by a reformer, and supplies waste heat and an anode exhaust gas containing steam to the reformer. The reformed gas produced by the reformer is reduced its CO concentration through a CO shift converter and a CO selective oxidizer. A polymer electrolyte fuel cell stack generates power by an electrochemical reaction of oxygen with hydrogen contained in a reformed gas which is emitted through the CO selective oxidizer with reduced CO concentration and with condensed moisture by a condenser.

30 Claims, 30 Drawing Sheets

U.S. PATENT DOCUMENTS

2002/0155332 A1    10/2002    Cipollini et al.

FOREIGN PATENT DOCUMENTS

| | | |
|---|---|---|
| DE | 19636738 | 3/1998 |
| DE | 19637207 | 3/1998 |
| DE | 19636068 | 5/1998 |
| DE | 19716438 | 10/1998 |
| EP | 1231659 A2 | 8/2002 |
| FR | 2375729 | 7/1978 |
| JP | 08-339815 A | 12/1996 |
| JP | 2001-266924 | 9/2001 |
| JP | 2001-334714 | 11/2002 |
| WO | WO-9603782 A1 | 2/1996 |
| WO | WO 97/21257 | 6/1997 |
| WO | WO-02065564 A2 | 8/2002 |

OTHER PUBLICATIONS

Machine Translation of JP 08-339815.

* cited by examiner

FUEL CELL POWER GENERATING SYSTEM WITH TWO FUEL CELLS OF DIFFERENT TYPES AND METHOD OF CONTROLLING THE SAME

This application claims priority from Japanese Patent Application Nos. 2002-327233, 2002-359670 and 2003-050732 filed Nov. 11, 2002, Dec. 11, 2002 and Feb. 27, 2003, respectively.

BACKGROUND OF THE INVENTION

1. Field of the Invention

The present invention relates to a fuel cell power generating system and a method of controlling the same. Specifically, this invention relates to a fuel cell power generating system having two fuel cell stacks of different types and a method of controlling the same.

2. Description of the Related Art

FIG. 1 shows a configuration of a conventional fuel cell power generating system. The conventional system is a polymer electrolyte fuel cell system which uses natural gas as a fuel. The conventional system primarily comprises a desulfurizer 2, a reformer 3, a reformer burner 53, a CO shift converter 4, a CO selective oxidizer 5, a condenser 39, a polymer electrolyte fuel cell stack 9, a power adjusting device 20, a carbureter 14, a carbureter burner 35, a water tank 90, flow control valves (10, 11, 12, . . . ), a feed water pump 42, an air supply blower 13 and pipes or the like that connect these components to each other.

Reference numerals in FIG. 1 will be now described. Reference numeral 1 denotes a natural gas serving as a fuel, reference numeral 2 denotes a desulfurizer that removes sulfur from the natural gas 1, and reference numeral 3 denotes a reformer that causes a steam reforming reaction of the fuel. Reference numeral 4 denotes a CO shift converter that converts carbon monoxide (CO) resulting from the steam reforming reaction into carbon dioxide by water shift reaction, thereby providing hydrogen. Reference numeral 5 denotes a CO selective oxidizer that oxidizes carbon monoxide remaining after the water shift reaction to form carbon dioxide.

Reference numeral 9 denotes a polymer electrolyte fuel cell stack, and reference numerals 6, 7 and 8 denote an anode, a solid polymer electrolyte and a cathode, respectively, of the polymer electrolyte fuel cell stack 9. Reference numerals 10, 11 and 12 denote flow control valves that control the flow rate of air 18 from an air supply blower 13. Reference numeral 14 denotes a carbureter that produces steam used for the steam reforming reaction. Reference numeral 15 denotes a pump for the carbureter 14, and reference numeral 16 denotes steam produced by the carbureter 14.

Reference numeral 17 denotes a cathode exhaust gas from the polymer electrolyte fuel cell stack 9, reference numeral 18 denotes air from the air supply blower 13 and reference numeral 19 denotes an anode exhaust gas from the polymer electrolyte fuel cell stack 9. Reference numeral 20 denotes a power adjusting device, reference numeral 21 denotes a load, reference numeral 22 denotes a DC output power from the polymer electrolyte fuel cell stack 9, reference numeral 23 denotes an AC output power at a sending end, and reference numeral 24 denotes a combustion exhaust gas from a reformer burner 53. Reference numeral 25 denotes a reformed gas having a CO concentration reduced to about 10 ppm, which is an exhaust gas from the CO selective oxidizer 5. Reference numeral 26 denotes a reformed gas having a CO concentration reduced to 1% or lower, which is an exhaust gas from the CO shift converter 4. Reference numeral 27 denotes a reformed gas rich in hydrogen at an outlet of the reformer 3, which is an exhaust gas from the reformer 3.

Reference numeral 29 denotes a desulfurized natural gas, which is an exhaust gas from the desulfurizer 2, and reference numeral 28 denotes a mixture gas of steam and the desulfurized natural gas. Reference numeral 30 denotes a flow control valve that controls the flow rate of the air 18 from the air supply blower 13. Reference numeral 36 denotes a combustion exhaust gas from the carbureter burner 35, and reference numeral 37 denotes a flow control valve that controls the flow rate of the natural gas 45. Reference numeral 31 denotes air for a carbureter burner 35, reference numeral 32 denotes air for the polymer electrolyte fuel cell stack 9, reference numeral 33 denotes air for the CO selective oxidizer 5, and reference numeral 34 denotes air for the reformer burner 53.

Reference numeral 39 denotes a condenser that condenses moisture in the reformed gas 25, which is the exhaust gas from the CO selective oxidizer 5. Reference numeral 38 denotes a reformed gas resulting after the condenser 39 condenses unreacted steam. Reference numeral 40 denotes water produced by the cell reaction in the polymer electrolyte fuel cell stack 9, and reference numeral 41 denotes a condensate produced by the condenser 39. Reference numeral 42 denotes a feed water pump, reference numeral 43 denotes feed water, and reference numeral 44 denotes water to be supplied to the carbureter 14.

Reference numeral 45 denotes a natural gas to be supplied to the desulfurizer 2, reference numeral 46 denotes a natural gas for the carbureter burner 35, reference numerals 47 and 48 denote flow control valves that control the flow rates of the natural gases 45 and 49, respectively, and reference numeral 49 denotes a natural gas for the reformer burner 53. Reference numeral 50 denotes are cycled reformed gas to the desulfurizer 2. Reference numeral 51 denotes a flow control valve that controls the flow rate of the recycled reformed gas 50. Reference numeral 52 denotes a reformed gas for the CO selective oxidizer 5. Reference numeral 53 denotes the reformer burner as described above, reference numeral 90 denotes a water tank, reference numeral 91 denotes an exhaust gas from the carbureter 14, and reference numeral 96 denotes a flow control valve that controls the flow rate of the steam 16 from the carbureter 14.

The phrase "rich in hydrogen" above means that there is contained enough hydrogen to contribute to power generation through the cell reaction.

For the sake of convenience, FIG. 1 shows the polymer electrolyte fuel cell stack 9 constituted by a unit cell consisting of a set of the anode 6, the solid polymer electrolyte 7 and the cathode 8. In practical, however, the polymer electrolyte fuel cell stack 9 comprises a plurality of unit cells.

In the following, referring to FIG. 1, an operation of the conventional fuel cell power generating system will be described. As the fuel natural gas 1, the natural gas 45, the natural gas 46 and the natural gas 49 are supplied to the desulfurizer 2, the carbureter burner 35 and the reformer burner 53, respectively. The amount of the supplied natural gas 45 is set to a value appropriate to the cell current of the DC output power 22 and the temperature of the reformer 3 (reformer temperature) by controlling the degree of opening of the flow control valve 37 based on a preset relationship among the cell current of the DC output power 22, the reformer temperature and the degree of opening of the flow control valve 37 (i.e. the amount of supplied natural gas 45).

The desulfurizer 2 removes sulfuric contents in an odorous material, such as mercaptan, in the natural gas 45, which cause deterioration of a reforming catalyst in the reformer 3 and an electrode catalyst of the anode 6 in the polymer electrolyte fuel cell stack 9, by hydrodesulfurization by the action of a cobalt-molybdenum-based catalyst, which is a desulfurizing catalyst, and a zinc-oxide adsorbent loading the desulfurizer 2. Specifically, the cobalt-molybdenum-based catalyst first causes reaction of sulfur and hydrogen to produce hydrogen sulfide, and then causes reaction of the resulting hydrogen sulfide and zinc oxide to produce zinc sulfide, thereby removing sulfuric contents. In order to supply hydrogen required to produce hydrogen sulfide, some of the reformed gas 26 rich in hydrogen, which is has been reduced in CO concentration to 1% or lower, is recycled and supplied to the desulfurizer 2 as the recycled reformed gas 50.

The amount of the recycled reformed gas 50 supplied is set to a value appropriate to the amount of the supplied natural gas 45 by controlling the degree of opening of the flow control valve 51 based on a preset relationship between the degree of opening of the flow control valve 37 (i.e. the amount of the supplied natural gas 45) and the degree of opening of the flow control valve 51 (i.e. the amount of the recycled reformed gas 50 supplied). The hydrodesulfurization and the reaction of producing zinc sulfide are both endothermic reactions. The heat required for the reactions is provided by supplying the heat produced by the water shift reaction in the CO shift converter 4, which is an exothermic reaction and will be described later, from the CO shift converter 4 to the desulfurizer 2.

The desulfurized natural gas 29 having the sulfuric content removed by the desulfurizer 2 is mixed with the steam 16 supplied from the carbureter 14, and the mixture gas 28 of the steam and the desulfurized natural gas is supplied to the reformer 3. The reformer 3 is filled with a nickel-based catalyst or a ruthenium-based catalyst serving as a reforming catalyst. The amount of the steam 16 mixed with the desulfurized natural gas 29 is set to such a value that a preset predetermined steam-carbon ratio (ratio of the steam to the carbon in the natural gas) is attained by controlling the degree of opening of the flow control valve 96 based on a preset relationship between the degree of opening of the flow control valve 37 (i.e. the amount of the supplied natural gas 45 for power generation) and the degree of opening of the flow control valve 96 (i.e. the amount of the supplied steam 16).

The carbureter 14 vaporizes the water 44 supplied from the water tank 90 by means of the pump 15. The heat required to vaporize the water 44 is provided by supplying the high-temperature combustion exhaust gas 24, described later, to the carbureter 14 and causing heat exchange between the water 44 and the combustion exhaust gas 24. The combustion exhaust gas 24 having heat exchanged with the water 44 is ejected as the exhaust gas 91. If the heat exchange between the water 44 and the combustion exhaust gas 24 does not provide enough heat to adequately vaporize the water 44 in the carbureter 14, combustion of the natural gas 46 supplied to the carbureter burner 35 via the flow control valve 47 and the air 31, which is some of the air 18 taken in by the air supply blower 13 and supplied to the carbureter burner 35 via the flow control valve 30, may provide additional heat to the carbureter 14.

The amount of the supplied natural gas 46 is set to such a value that a preset predetermined carbureter temperature is attained by controlling the degree of opening of the flow control valve 47 based on a preset relationship between the temperature of the carbureter 14 and the degree of opening of the flow control valve 47 (i.e. the amount of the supplied natural gas 46). Besides, the amount of the supplied air 31 is set to such a value that a preset predetermined air-fuel ratio (ratio of the air to the fuel) is attained by controlling the degree of opening of the flow control valve 30 based on a preset relationship between the degree of opening of the flow control valve 47 (i.e. the amount of the supplied natural gas 46) and the degree of opening of the flow control valve 30 (i.e. the amount of the supplied air 31).

To the water tank 90, the condensate 41 produced by the condenser 39 described later and the water 40 produced by the cell reaction in the polymer electrolyte fuel cell stack 9 are supplied. If they cannot adequately fill the water tank 90, the feed water pump 42 is activated, as required, to supply the feed water 43 to the water tank 90.

In the reformer 3, a steam reforming reaction of hydrocarbon contained in the natural gas is conducted by the action of the reforming catalyst loading the reformer 3, and thus, the reformed gas 27 rich in hydrogen is produced. The steam reforming reaction of methane, which is a primary component of the natural gas, is expressed by the following equation (1).

(Steam Reforming Reaction of Methane)

$$CH_4 + H_2O \rightarrow CO + 3H_2 \tag{1}$$

Steam reforming reactions of hydrocarbon including the steam reforming reaction of methane expressed by the equation (1) are endothermic reactions. Therefore, in order to efficiently produce hydrogen, heat required for the reaction has to be supplied from the outside of the reformer 3 and the temperature of the reformer 3 has to be maintained at 700 to 750 degrees C. Thus, the anode exhaust gas 19 containing about 20% of unreacted hydrogen, described later, is supplied from the polymer electrolyte fuel cell stack 9 to the reformer burner 53, and the air 34 which is some of the air 18 taken in by the air supply blower 13 is concurrently supplied to the reformer burner 53 to cause combustion thereof, thereby supplying heat required for the steam reforming reaction to the reformer 3. The amount of the supplied air 34 is set to such a value that a preset predetermined air-fuel ratio is attained by controlling the degree of opening of the flow control valve 12 based on a preset relationship between the degree of opening of the flow control valve 37 (i.e. the amount of the supplied natural gas 45) and the degree of opening of the flow control valve 12 (i.e. the amount of the supplied air 34).

If the combustion of the anode exhaust gas 19 in the reformer burner 53 does not provide enough heat for the steam reforming reaction of hydrocarbon in the reformer 3, combustion of the natural gas 49 supplied to the reformer burner 53 via the flow control valve 48 and the air 34, which is some of the air 18 taken in by the air supply blower 13 and supplied to the reformer burner 53 via the flow control valve 12, provides additional heat to the reformer 3.

The amount of the supplied natural gas 49 is set to a value appropriate to a preset predetermined temperature of the reformer 3 by controlling the degree of opening of the flow control valve 48 based on a preset relationship between the temperature of the reformer 3 and the degree of opening of the flow control valve 48 (i.e. the amount of the supplied natural gas 49). Besides, the amount of the supplied air 34 is set to such a value that a preset predetermined air-fuel ratio is attained by controlling the degree of opening of the flow control valve 12 based on a preset relationship between the degree of opening of the flow control valve 37 (i.e. the amount of the supplied natural gas 45) and the degree of opening of the flow control valve 12 (i.e. the amount of the supplied air 34).

The reformed gas 27 rich in hydrogen, which is an exhaust gas from the reformer 3, contains carbon monoxide, which causes deterioration of the electrode catalyst at the anode 6 of the polymer electrolyte fuel cell stack 9. Therefore, the reformed gas 27 rich in hydrogen is supplied to the CO shift converter 4 loaded with a CO shift converter catalyst, such as copper-zinc-based catalyst, thereby reducing the concentration of CO in the reformed gas 27 rich in hydrogen to 1% or lower by water shift reaction due to the CO shift converter catalyst, the water shift reaction being expressed by the following equation (2).

(Water Shift Reaction)

$$CO + H_2O \rightarrow CO_2 + H_2 \tag{2}$$

The water shift reaction is an exothermic reaction. The heat generated is supplied to the desulfurizer 2 and used for the hydrodesulfurization and the reaction of producing zinc sulfide in the desulfurizer 2 described above, which are endothermic reactions.

Part of the reformed gas 26, which is an exhaust gas from the CO shift converter 4, is supplied to the desulfurizer 2 as the recycled reformed gas 50 as described above, and the remainder thereof is supplied, as the reformed gas 52, to the CO selective oxidizer 5 loaded with a precious metal catalyst, such as platinum-based catalyst or ruthenium-based catalyst, serving as a CO selective oxidizing catalyst. This is intended to reduce the CO concentration of the reformed gas 52 to about 10 ppm, because a reformed gas having a CO concentration of 100 ppm or higher supplied to the anode 6 causes deterioration of the electrode catalyst. In addition, the air 33 which is some of the air 18 taken in by the air supply blower 13 is supplied to the CO selective oxidizer 5. The CO selective oxidizer 5 causes carbon monoxide contained in the reformed gas 52 to react with oxygen in the air 33 to convert carbon monoxide into carbon dioxide through a CO selective oxidizing reaction expressed by the following equation (3), which is an exothermic reaction, thereby reducing the CO concentration of the reformed gas 52 to about 10 ppm.

(CO Selective Oxidizing Reaction of Carbon Monoxide)

$$CO + 1/2 O_2 \rightarrow CO_2 \tag{3}$$

The amount of the supplied air 33 is set to a value appropriate to the amount of the supplied natural gas 45 by controlling the degree of opening of the flow control valve 11 based on a preset relationship between the degree of opening of the flow control valve 37 (i.e. the amount of the supplied natural gas 45) and the degree of opening of the flow control valve 11 (i.e. the amount of the supplied air 33).

Unreacted steam contained in the reformed gas 25 having the CO concentration reduced to about 10 ppm, which is an exhaust gas from the CO selective oxidizer 5, is cooled to a temperature of 100 degrees C. or lower and collected as the condensate 41 in the condenser 39. The condensate 41 is supplied to the water tank 90 and reused as the water 44 to be supplied to the carbureter 14. The reformed gas 38, which results from condensation of unreacted steam in the condenser 39, is supplied to the anode 6.

On the other hand, the air 32 which is some of the air 18 taken in by the air supply blower 13 is supplied to the cathode 8 of the polymer electrolyte fuel cell stack 9. Typically, the power generating temperature of the polymer electrolyte fuel cell stack 9 is 60 degrees C. to 80 degrees C. The power generating temperature is maintained by heat generated by the cell reaction. The amount of the supplied air 32 is set to a value appropriate to the cell current of the DC output power 22 by controlling the degree of opening of the flow control valve 10 based on a preset relationship between the cell current of the DC output power 22 and the degree of opening of the flow control valve 10 (i.e. the amount of the supplied air 32).

At the anode 6, by the action of a platinum-based electrode catalyst, about 80% of hydrogen contained in the reformed gas 38 is changed into hydrogen ions and electrons through the anode reaction expressed by the following equation (4).

(Anode Reaction)

$$H_2 \rightarrow 2H^+ + 2e^- \tag{4}$$

The hydrogen ions produced at the anode 6 move in the solid polymer electrolyte 7 composed of a fluorine-based polymer having a sulfonic group, such as Nafion, and reach the cathode 8. On the other hand, the electrons produced at the anode 6 move through an external circuit (not shown) and reach the cathode 8. In the process of the electrons moving through the external circuit, electric energy can be extracted as the DC output power 22.

At the cathode 8, by the action of the platinum-based electrode catalyst, the hydrogen ions having moved from the anode 6 to the cathode 8 through the solid polymer electrolyte 7, the electrons having moved from the anode 6 to the cathode 8 through the external circuit, and the oxygen in the air 32 supplied to the cathode 8 react with each other to form water, the reaction being referred to as a cathode reaction expressed by the following equation (5).

(Cathode Reaction)

$$2H^+ + 1/2 O_2 + 2e^- \rightarrow H_2O \tag{5}$$

Bringing together the equations (4) and (5), the cell reaction in the polymer electrolyte fuel cell stack 9 can be expressed as a reverse reaction of the electrolysis of water, in which hydrogen and oxygen react with each other to form water, as expressed by the following equation (6).

(Cell Reaction)

$$H_2 + 1/2 O_2 \rightarrow H_2O \tag{6}$$

The power adjusting device 20 performs voltage conversion and DC/AC conversion on the DC output power 22 generated by the polymer electrolyte fuel cell stack 9 to make it suitable for the load 21 and then supplies the resulting AC output power 23 to the load 21. While FIG. 1 shows an example in which the power adjusting device 20 performs DC/AC conversion, the power adjusting device 20 may perform only voltage conversion and the sending end DC output power may be supplied to the load 21.

The reformed gas 38 is ejected as the anode exhaust gas 19 of the polymer electrolyte fuel cell stack 9 after about 80% of hydrogen therein is consumed at the anode 6 by the anode reaction expressed by the equation (4). On the other hand, the air 32 is ejected as the cathode exhaust gas 17 of the polymer electrolyte fuel cell stack 9 after some of oxygen therein is consumed at the cathode 8 by the cathode reaction expressed by the equation (5).

The water 40 produced in the polymer electrolyte fuel cell stack 9 by the cell reaction expressed by the equation (6) is supplied to the water tank 90, as with the condensate 41, and reused as the water 44 supplied to the carbureter 14. Since about 20% of hydrogen in the reformed gas 38 remains in the anode exhaust gas 19 without being reacted, the anode exhaust gas 19 is used as fuel for the reformer burner 53 as described above.

The conventional fuel cell power generating system shown in FIG. 1 has problems described below. In order to cause the steam reforming reaction of hydrocarbon contained in the natural gas 45 in the anode exhaust gas 19 from the polymer electrolyte fuel cell stack 9 in the reformer 3, not only the anode exhaust gas 19 from the polymer electrolyte fuel cell stack 9 but also the natural gas 49 for the reformer burner 53 have to be supplied to the reformer burner 53 for combustion. Furthermore, since the power generating temperature of the polymer electrolyte fuel cell stack 9 is low, specifically 60 degrees C. to 80 degrees C., no steam can be produced in the process of cooling the cell stack, unlike the case of using a phosphoric acid fuel cell stack having a power generating temperature of 190 degrees C. Therefore, the carbureter 14 has to be provided for heat exchange with the combustion exhaust gas 24, and combustion of the natural gas 46 supplied to the carbureter burner 35 has to be caused to externally supply to the carbureter 14 the heat required to vaporize the water 44, thereby producing the steam 16, which is required for steam reforming reaction of hydrocarbon in the reformer 3. Thus, the conventional fuel cell power generating system has a low sending end efficiency, specifically, lower than 40% (Low Heat Value (LHV) reference, the same in the following). In addition, since the sending end efficiency is low, the AC output power at the sending end is also low.

SUMMARY OF THE INVENTION

An object of the present invention is to provide a fuel cell power generating system that is reduced in energy loss and thus has an improved sending end efficiency and an increased sending end output power.

Another object of the present invention is to provide a method of controlling a fuel cell power generating system which makes it possible to keep the temperatures of a fuel cell stack and a reformer in a given range of temperature even if the sending end output power of the system varies.

A fuel cell power generating system according to an aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and steam resulting from the power generation to the reforming means; converting means for converting carbon monoxide in the reformed gas into carbon dioxide and hydrogen by reaction of the carbon monoxide with steam; oxidizing means for converting carbon monoxide ejected from the converting means into carbon dioxide by oxidation; and second power generating means for generating power by electrochemical reaction of hydrogen ejected from the oxidizing means with oxygen.

A fuel cell power generating system according to another aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and steam resulting from the power generation to the reforming means; converting means for converting carbon monoxide in the reformed gas into carbon dioxide and hydrogen by reaction of the carbon monoxide with steam; and second power generating means for generating power by electrochemical reaction of hydrogen ejected from the converting means with oxygen.

A fuel cell power generating system according to another aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and steam resulting from the power generation to the reforming means; converting means for converting carbon monoxide in the reformed gas into carbon dioxide and hydrogen by reaction of the carbon monoxide with steam; separating means for separating hydrogen from an emission of the converting means; and second power generating means for generating power by electrochemical reaction of the separated hydrogen with oxygen.

A fuel cell power generating system according to another aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and an emission containing steam resulting from the power generation to the reforming means; converting means for converting carbon monoxide in the emission into carbon dioxide and hydrogen by reaction of the carbon monoxide with steam; oxidizing means for converting carbon monoxide ejected from the converting means into carbon dioxide by oxidation; and second power generating means for generating power by electrochemical reaction of hydrogen ejected from the oxidizing means with oxygen.

A fuel cell power generating system according to another aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and an emission containing steam resulting from the power generation to the reforming means; converting means for converting carbon monoxide in the emission into carbon dioxide and hydrogen by reaction of the carbon monoxide with steam; and second power generating means for generating power by electrochemical reaction of hydrogen ejected from the converting means with oxygen.

A fuel cell power generating system according to another aspect of the present invention comprises: reforming means for producing a reformed gas containing hydrogen by a steam reforming reaction of a fuel; first power generating means for generating power by electrochemical reaction of hydrogen or hydrogen and carbon monoxide in the reformed gas with oxygen and supplying waste heat and an emission containing steam resulting from the power generation to the reforming means; converting means for converting carbon monoxide in the emission into carbon dioxide and hydrogen by reaction of the carbon monoxide with steam; separating means for separating hydrogen from an emission of the converting means; and second power generating means for generating power by electrochemical reaction of the separated hydrogen with oxygen.

A fuel cell power generating system according to another aspect of the present invention comprises: first power generating means for producing a reformed gas containing hydrogen at an anode by a steam reforming reaction of a fuel and generating power by electrochemical reaction of hydrogen or hydrogen and carbon monoxide in the reformed gas with oxygen, the first power generating means consuming heat required for the steam reforming reaction and recycling an emission containing steam resulting from the power generation to the anode, the heat resulting from the power generation; converting means for converting carbon monoxide in the emission into carbon dioxide and hydrogen by reaction of the carbon monoxide with steam; oxidizing means for converting carbon monoxide ejected from the converting means into carbon dioxide by oxidation; and second power generating means for generating power by electrochemical reaction of hydrogen ejected from the oxidizing means with oxygen.

A fuel cell power generating system according to another aspect of the present invention comprises: first power generating means for producing a reformed gas containing hydrogen at an anode by a steam reforming reaction of a fuel and generating power by electrochemical reaction of hydrogen or hydrogen and carbon monoxide in the reformed gas with oxygen, the first power generating means consuming heat required for the steam reforming reaction and recycling an emission containing steam resulting from the power generation to the anode, the heat resulting from the power generation; converting means for converting carbon monoxide in the emission into carbon dioxide and hydrogen by reaction of the carbon monoxide with steam; and second power generating means for generating power by electrochemical reaction of hydrogen ejected from the converting means with oxygen.

A fuel cell power generating system according to another aspect of the present invention comprises: first power generating means for producing a reformed gas containing hydrogen at an anode by a steam reforming reaction of a fuel and generating power by electrochemical reaction of hydrogen or hydrogen and carbon monoxide in the reformed gas with oxygen, the first power generating means consuming heat required for the steam reforming reaction and recycling an emission containing steam resulting from the power generation to the anode, the heat resulting from the power generation; converting means for converting carbon monoxide in the emission into carbon dioxide and hydrogen by reaction of the carbon monoxide with steam; separating means for separating hydrogen from an emission of the converting means; and second power generating means for generating power by electrochemical reaction of the separated hydrogen with oxygen.

A fuel cell power generating system according to another aspect of the present invention comprises: first power generating means for producing a reformed gas containing hydrogen at an anode by a steam reforming reaction of a fuel and generating power by electrochemical reaction of hydrogen or hydrogen and carbon monoxide in the reformed gas with oxygen, the first power generating means consuming heat required for the steam reforming reaction and recycling an emission containing steam resulting from the power generation to the anode; converting means for converting carbon monoxide in the emission into carbon dioxide and hydrogen by reaction of the carbon monoxide with steam; separating means for separating hydrogen from an emission of the converting means; and second power generating means for generating power by electrochemical reaction of the separated hydrogen with oxygen.

A fuel cell power generating system according to another aspect of the present invention is the fuel cell power generating system according to any of the above-described aspects and comprises: means for determining whether an output power of a first power generating means increases or decreases; and means for decreasing an amount of air supplied to the first power generating means when the output power of the first power generating means increases, or increasing the amount of the air when the output power of the first power generating means decreases.

A fuel cell power generating system according to another aspect of the present invention is the fuel cell power generating system according to any of the above-described aspects and comprises: means for determining whether an output power of a second power generating means increases or decreases; and means for decreasing an amount of air supplied to a first power generating means when the output power of the second power generating means increases, or increasing the amount of the air when the output power of the second power generating means decreases.

A method of controlling a fuel cell power generating system according to an aspect of the present invention is a method of controlling the fuel cell power generating system according to any of the above-described aspects and comprises the step of determining whether an output power of a first power generating means increases or decreases and the step of decreasing an amount of air supplied to the first power generating means when the output power of the first power generating means increases, or increasing the amount of the air when the output power of the first power generating means decreases.

A method of controlling a fuel cell power generating system according to another aspect of the present invention is a method of controlling the fuel cell power generating system according to any of the above-described aspects and comprises the step of determining whether an output power of a second power generating means increases or decreases and the step of decreasing an amount of air supplied to a first power generating means when the output power of the second power generating means increases, or increasing the amount of the air when the output power of the second power generating means decreases.

In the fuel cell power generating system according to the present invention, waste heat from a first fuel cell stack and steam produced in a cell reaction of the first fuel cell stack can be used to cause a steam reforming reaction of a fuel in a reformer, and the resulting reformed gas rich in hydrogen can be supplied to the first fuel cell stack and a second fuel cell stack to achieve power generation. Therefore, the fuel cell power generating system can have an improved sending end efficiency and an increased sending end output power.

Furthermore, in the fuel cell power generating system according to the present invention, steam and waste heat resulting from a cell reaction of the first fuel cell stack can be used to cause the steam reforming reaction of the fuel, the resulting reformed gas rich in hydrogen can be used for power generation by the first fuel cell stack, and an anode exhaust gas, which contains unreacted hydrogen, of the first fuel cell stack can be supplied to the second fuel cell stack and used by the second fuel cell stack to generate power. Therefore, the fuel cell power generating system can have an improved sending end efficiency and an increased sending end output power.

According to the method of controlling a fuel cell power generating system according to the present invention, the power of the fuel cell power generating system can be changed while keeping the temperatures of the fuel cell stacks and the reformer within a predetermined temperature range. Thus, there is provided an advantage that the power of the fuel cell power generating system can be made to follow a variation of a load while maintaining high-efficiency power generation without adversely affecting the lives of the fuel cell stacks and the reformer and the system reliability.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Fuel Cell Power Generating System

In the following, embodiments of a fuel cell power generating system according to the present invention will be described with reference to the drawings. In the embodiments described below, a first fuel cell stack is a solid oxide fuel cell stack, and a second fuel cell stack is a polymer electrolyte fuel cell stack. Alternatively, the second fuel cell stack may be a phosphoric acid fuel cell stack. In such a case, the CO selective oxidizer described in the following embodiments can be omitted, and the reformed gas ejected from the CO shift converter can be supplied to the second fuel cell stack as it is.

Embodiment 1

Figure 2:
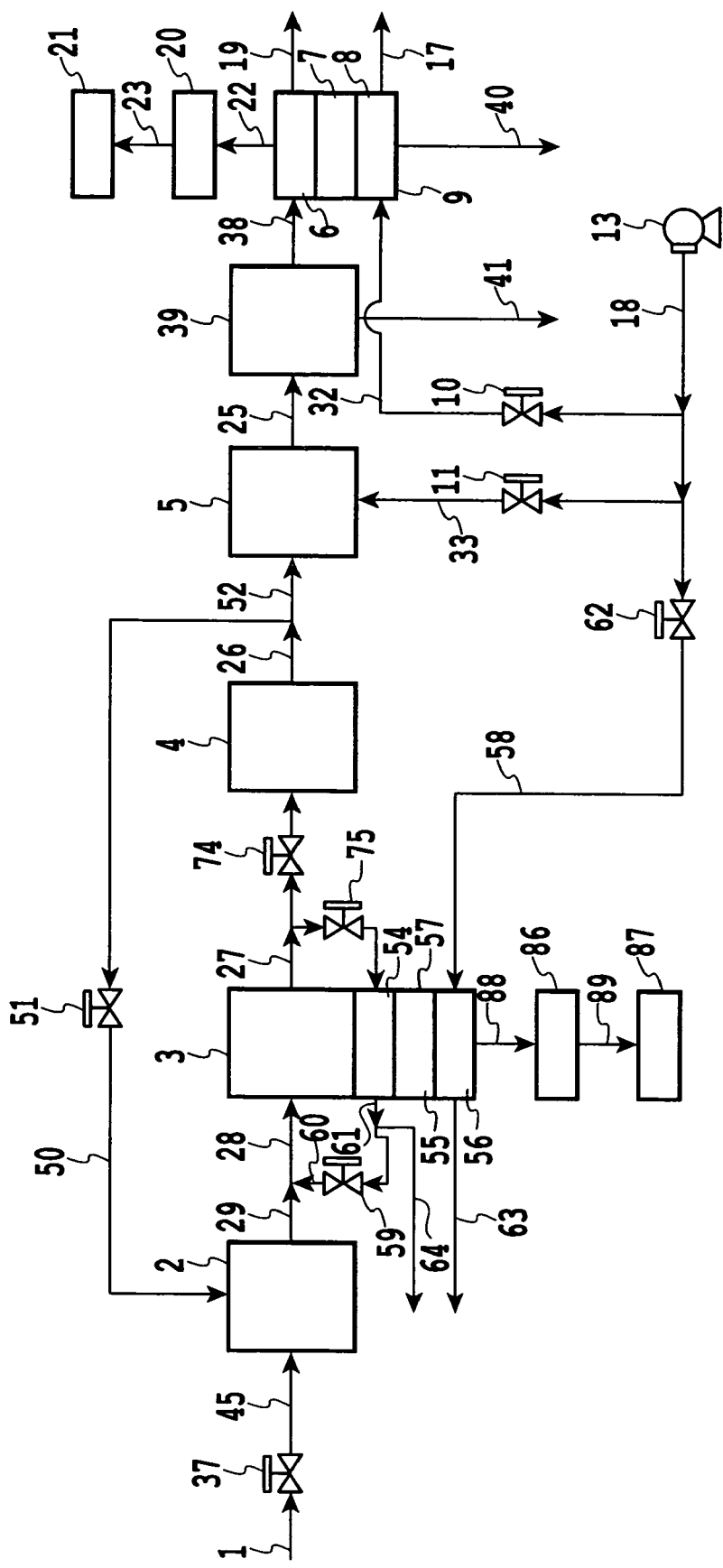
FIG. 2 is a diagram showing an embodiment 1 of a fuel cell power generating system according to the present invention.

FIG. 2 is a diagram showing an embodiment 1 of a fuel cell power generating system according to the present invention. In FIG. 2 and the following drawings, same components as those in the drawings having already been described are assigned the same reference numerals, and descriptions thereof will be omitted.

Reference numerals in FIG. 2 will be now described. Reference numeral 57 denotes a solid oxide fuel cell stack, which is first fuel cell stack, reference numeral 54 denotes an anode of the solid oxide fuel cell stack 57, reference numeral 55 denotes a solid oxide electrolyte of the solid oxide fuel cell stack 57, and reference numeral 56 denotes a cathode of the solid oxide fuel cell stack 57. Reference numeral 58 denotes air for power generation of the solid oxide fuel cell stack 57. Reference numeral 61 denotes an anode exhaust gas of the solid oxide fuel cell stack 57. Reference numeral 60 denotes a recycled anode exhaust gas from the solid oxide fuel cell stack 57 to a reformer 3.

Reference numeral 64 denotes a to-be-ejected anode exhaust gas of the solid oxide fuel cell stack 57. Reference numeral 59 denotes a flow control valve which controls the flow rate of the recycled anode exhaust gas 60. Reference numeral 62 denotes a flow control valve which controls the flow rate of the air 58, reference numeral 63 denotes a cathode exhaust gas of the solid oxide fuel cell stack 57, and reference numerals 74 and 75 denote flow control valves which control the flow rate of a reformed gas 27 rich in hydrogen ejected from the reformer 3. Reference numeral 86 denotes a power adjusting device, reference numeral 87 denotes a load, reference numeral 88 denotes a DC output power generated by the solid oxide fuel cell stack 57, and reference numeral 89 denotes an AC output power at a sending end.

For the sake of convenience, FIG. 2 shows the solid oxide fuel cell stack 57 constituted by a unit cell consisting of a set of the anode 54, the solid oxide electrolyte 55 and the cathode 56. In practical, however, the solid oxide fuel cell stack 57 comprises a plurality of unit cells. Similarly, a polymer electrolyte polymer electrolyte fuel cell stack 9, which is a second fuel cell stack, comprises a plurality of unit cells as described above.

Figure 1:
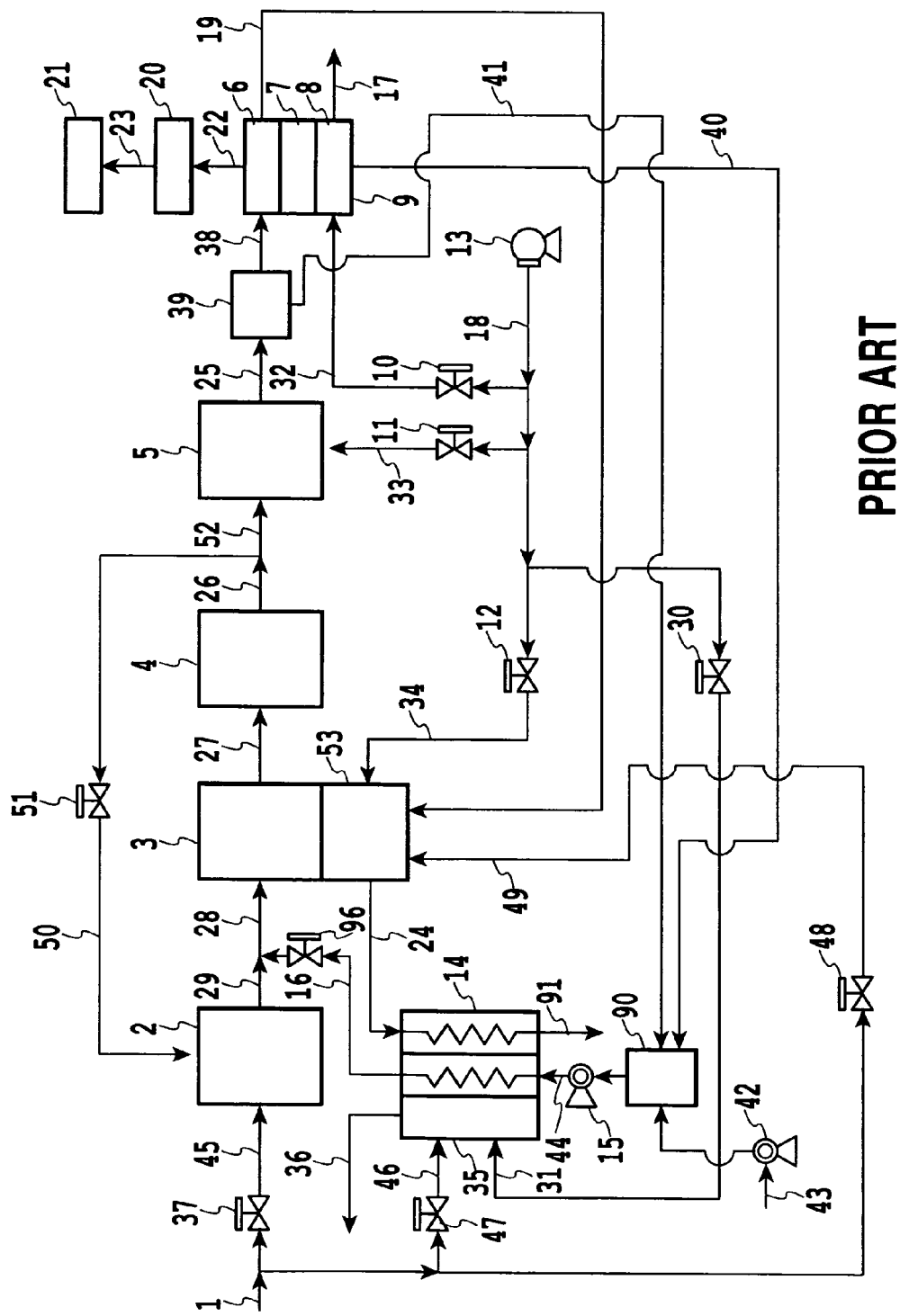
FIG. 1 is a diagram showing a conventional fuel cell power generating system.

As shown in FIG. 2, the fuel cell power generating system according to the embodiment 1 differs from the conventional fuel cell power generating system shown in FIG. 1 in that the solid oxide fuel cell stack 57 is provided near the reformer 3, in addition to the polymer electrolyte fuel cell stack 9. In this configuration, the DC output power 88 generated by the solid oxide fuel cell stack 57 is converted into the AC output power 89 in the power adjusting device 86 and then supplied to the load 87.

Now, an operation of the fuel cell power generating system according to this embodiment will be described with reference to FIG. 2. The amount of a supplied natural gas 45 is set to a value appropriate to the cell current of a DC output power 22 and the cell current of the DC output power 88 by controlling the degree of opening of a flow control valve 37 based on a preset relationship between the cell currents of the DC output power 22 and DC output power 88 and the degree of opening of the flow control valve 37 (i.e. the amount of the supplied natural gas 45). A desulfurized natural gas 29 resulting from desulfurization in the desulfurizer 2 is mixed with the recycled anode exhaust gas 60 containing steam produced by the cell reaction in the solid oxide fuel cell stack 57, and then the mixture gas 28 of steam and the desulfurized natural gas is supplied to the reformer 3. The amount of the recycled anode exhaust gas 60 supplied is set to a value appropriate to the amount of the supplied natural gas 45 by controlling the degree of opening of the flow control valve 59 based on a preset relationship between the degree of opening of the flow control valve 37 (i.e. the amount of the supplied natural gas 45) and the degree of opening of the flow control valve 59 (i.e. the amount of the recycled anode exhaust gas 60 supplied).

In the reformer 3, a steam reforming reaction of hydrocarbon contained in a natural gas is conducted by the action of a reforming catalyst loading the reformer 3, and thus, the reformed gas 27 rich in hydrogen is produced. The steam reforming reaction is an endothermic reaction, and therefore, in order to efficiently produce hydrogen, heat required for the reaction has to be supplied from the outside of the reformer 3 and the temperature of the reformer 3 has to be maintained at 700 to 750 degrees C. Thus, waste heat from the solid oxide fuel cell stack 57 which generates power at 800 to 1000 degrees C. as described later is supplied to the reformer 3 as the heat required for the steam reforming reaction.

Part of the reformed gas 27 rich in hydrogen produced in the reformer 3 is supplied to a CO shift converter 4, and the remaininder thereof is supplied to the anode 54 of the solid oxide fuel cell stack 57. The amount of the reformed gas 27 supplied to the CO shift converter 4 is set to a value appropriate to the direct current of the DC output power 22 by controlling the degree of opening of the flow control valve 74 based on a preset relationship between the direct current of the DC output power 22 and the degree of opening of the flow control valve 74 (i.e. the amount of the reformed gas 27 supplied to the CO shift converter 4). On the other hand, the amount of the reformed gas 27 supplied to the anode 54 of the solid oxide fuel cell stack 57 is set to a value appropriate to the direct current of the DC output power 88 by controlling the degree of opening of the flow control valve 75 based on a preset relationship between the direct current of the DC output power 88 and the degree of opening of the flow control valve 75 (i.e. the amount of the reformed gas 27 supplied to the anode 54).

To the cathode 56 of the solid oxide fuel cell stack 57, the air 58 which is some of air 18 taken in by an air supply blower 13 is supplied. The amount of the air 58 is set to a value appropriate to the amount of the reformed gas 27 supplied to the anode 54 by controlling the degree of opening of the flow control valve 62 based on a preset relationship between the degree of opening of the flow control valve 75 (i.e. the amount of the reformed gas 27 supplied to the anode 54) and the degree of opening of the flow control valve 62 (i.e. the amount of the supplied air 58). Similarly, the a mount of air 32 supplied to the cathode 8 of the polymer electrolyte fuel cell stack 9 is set to a value appropriate to the amount of the reformed gas 27 supplied to the CO shift converter 4 by controlling the degree of opening of a flow control valve 10 based on a preset relationship between the degree of opening of the flow control valve 74 (i.e. the amount of the reformed gas 27 supplied to the CO shift converter 4) and the degree of opening of the flow control valve 10 (i.e. the amount of the supplied air 32).

At the cathode 56 of the solid oxide fuel cell stack 57, by the action of a metal-oxide-based electrode catalyst, oxygen in the air 58 for power generation reacts with electrons to change into oxygen ions through the cathode reaction expressed by the following equation (7).

(Cathode Reaction)

$$1/2 O_2 + 2e^- \rightarrow O^{2-} \qquad (7)$$

Oxygen ions produced at the cathode 56 move in the solid oxide electrolyte 55 of stabilized zirconia (YSZ or the like) and reach the anode 54. At the anode 54, by the action of a metal-based electrode catalyst, such as nickel-YSZ cermet or ruthenium-YSZ cermet, the oxygen ions having moved from the cathode 56 react with hydrogen or carbon monoxide in the reformed gas 27 supplied to the anode 54 (anode reactions expressed by the equation (8) and (9)), and thus, steam or carbon dioxide and electron is produced.

(Anode Reaction)

$$H_2 + O^{2-} \rightarrow H_2O + 2e^- \qquad (8)$$

$$CO + O^{2-} \rightarrow CO_2 + 2e^- \qquad (9)$$

The electrons produced at the anode 54 move through an external circuit (not shown) and reach the cathode 56. The electrons having reached the cathode 56 react with oxygen through the cathode reaction expressed by the equation (7). In the process of the electrons moving through the external circuit, electric energy can be extracted as the DC output power 88.

Bringing together the equations (7) and (8) and the equations (7) and (9), the cell reaction in the solid oxide fuel cell stack 57 can be expressed as a reverse reaction of the electrolysis of water, in which hydrogen and oxygen react with each other to form steam, which is the same as the cell reaction in the polymer electrolyte fuel cell stack 9 and expressed by the equation (6), and a reaction in which carbon monoxide and oxygen react with each other to form carbon dioxide as expressed by the following equation (10), respectively.

(Cell Reaction)

$$CO + 1/2 O_2 \rightarrow CO_2 \qquad (10)$$

The power adjusting device 86 performs voltage conversion and DC/AC conversion on the DC output power 88 generated by the solid oxide fuel cell stack 57 to make it suitable for the load 87 and then supplies the resulting AC output power 89 to the load 87. While FIG. 2 shows an example in which the power adjusting device 86 performs DC/AC conversion, the power adjusting device 86 may perform only voltage conversion and the sending end DC output power may be supplied to the load 87.

The power generating temperature of the solid oxide fuel cell stack 57 is typically 800 to 1000 degrees C., and the power generating temperature is maintained by heat generated by the cell reaction. Thus, the waste heat from the solid oxide fuel cell stack 57 can be used for reaction heat in the steam reforming reaction of hydrocarbon in the reformer 3 as described above.

In practical, in conventional solid oxide fuel cell power generating systems, much heat is produced by the cell reaction in the solid oxide fuel cell stack 57, and in order to maintain the power generating temperature, a great amount of air 58 is supplied to the cathode 56 and used for cooling the solid oxide fuel cell stack 57. The oxygen utilization ratio at the cathode 56 is about 20%.

Therefore, if the amount of the supplied air 58 is changed with the amount of the supplied natural gas 45, and the amount of the waste heat supplied from the solid oxide fuel cell stack 57 to the reformer 3 is controlled, the steam reforming reaction of hydrocarbon can be efficiently achieved in the reformer 3. That is, based on a preset relationship between the degree of opening of the flow control valve 37 (i.e. the amount of the supplied natural gas 45) and a correction of the degree of opening of the flow control valve 62 (i.e. correction of the amount of the supplied air 58), if the amount of the supplied natural gas 45 increases, the degree of opening of the flow control valve 62 is reduced to reduce the amount of the air 58 supplied to the cathode 56, thereby raising the oxygen utilization ratio at the cathode 56 and increasing the amount of the waste heat supplied from the solid oxide fuel cell stack 57 to the reformer 3 while keeping the power generating temperature of the solid oxide fuel cell stack 57 at 800 to 1000 degrees C.

On the other hand, if the amount of the supplied natural gas 45 decreases, the degree of opening of the flow control valve 62 is increased to increase the amount of the supplied air 58, thereby reducing the oxygen utilization ratio at the cathode 56 and decreasing the amount of the waste heat supplied from the solid oxide fuel cell stack 57 to the reformer 3 while keeping the power generating temperature of the solid oxide fuel cell stack 57 at 800 to 1000 degrees C.

In order to provide the steam required for the steam reforming reaction of hydrocarbon in the reformer 3 as described above, some of the anode exhaust gas 61 containing steam produced by the cell reaction at the anode 54 is recycled, the recycled anode exhaust gas 60 is mixed with the desulfurized natural gas 29, and the mixture gas 28 is supplied to the reformer 3. The remainder of the anode exhaust gas 61 is ejected as the to-be-ejected anode exhaust gas 64. The to-be-ejected anode exhaust gas 64 can be used as a heat source for hot-water supply, heating and cooling using an absorption refrigerator, thereby enhancing the total thermal efficiency of the system including electric power and heat utilization. Besides, the cathode exhaust gas 63 can also be used as a heat source for hot-water supply, heating and cooling using an absorption refrigerator, thereby enhancing the total thermal efficiency of the system including electric power and heat utilization.

According to the embodiment 1, since steam contained in the anode exhaust gas 61 from the solid oxide fuel cell stack 57 is used for the steam reforming reaction of hydrocarbon, the carbureter 14 (FIG. 1) for producing steam, which is necessary in the conventional system, is not necessary, and the energy required for vaporizing water can be reduced compared to the conventional system shown in FIG. 1. In addition, since the waste heat from the solid oxide fuel cell stack 57 is used for the steam reforming reaction of hydrocarbon in the reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of the air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 2

Figure 3:
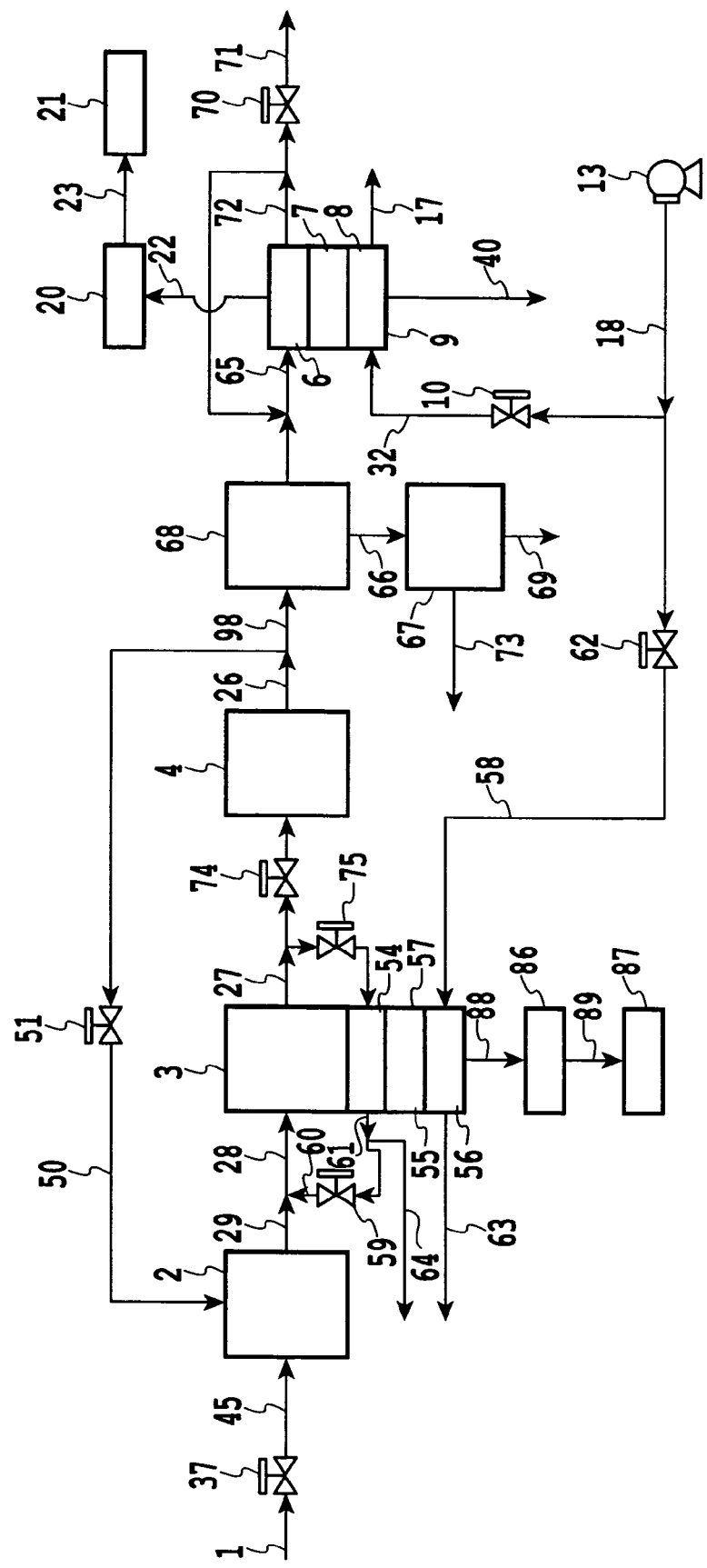
FIG. 3 is a diagram showing an embodiment 2 of the fuel cell power generating system according to the present invention.

FIG. 3 is a diagram showing an embodiment 2 of the fuel cell power generating system according to the present invention. Reference numerals in FIG. 3 will be now described. Reference numeral 68 denotes a hydrogen separator, reference numeral 65 denotes hydrogen separated by the hydrogen separator 68, and reference numeral 66 denotes an exhaust gas from which hydrogen is separated by the hydrogen separator 68. Reference numeral 67 denotes a condenser which condenses moisture in the exhaust gas 66, and reference numeral 69 denotes a dry exhaust gas having a moisture content reduced by the condenser 67. Reference numeral 70 denotes a purge valve, and reference numeral 71 denotes a purge gas. Reference numeral 72 denotes an anode hydrogen exhaust gas containing unreacted hydrogen, reference numeral 73 denotes a condensate produced in the condenser 67, and reference numeral 98 denotes a reformed gas for the hydrogen separator 68.

The fuel cell power generating system according to the embodiment 2 differs from the system according to the embodiment 1 shown in FIG. 2 in that the hydrogen separator 68 and the condenser 67 are provided instead of the CO selective oxidizer 5 and the condenser 39.

Now, an operation of the fuel cell power generating system according to this embodiment will be described with reference to FIG. 3. The reformed gas 98 ejected from a CO shift converter 4 is supplied to the hydrogen separator 68, which has a hydrogen separator membrane, such as a palladium membrane, where hydrogen 65 is separated from the reformed gas 98. At this time, for efficient hydrogen separation, the reformed gas 98 is pressurized as required. Hydrogen 65 is supplied to an anode 6 of a polymer electrolyte fuel cell stack 9 and electrochemically reacts with oxygen in air 32. In this way, power generation by the polymer electrolyte fuel cell stack 9 is conducted.

In order to improve the sending end efficiency of the polymer electrolyte fuel cell stack 9, the anode hydrogen exhaust gas 72 containing unreacted hydrogen is completely recycled to the anode 6 and reused for power generation by the polymer electrolyte fuel cell stack 9. However, the anode hydrogen exhaust gas 72 contains not only hydrogen but also a small amount of impurities, and therefore, the purge valve 70 is intermittently opened to eject the purge gas 71. The exhaust gas 66 has the moisture content thereof condensed by the condenser 67, resulting in the condensate 73, and then is ejected as the dry exhaust gas 69.

As in the embodiment 1, according to this embodiment, since steam contained in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 3

Figure 4:
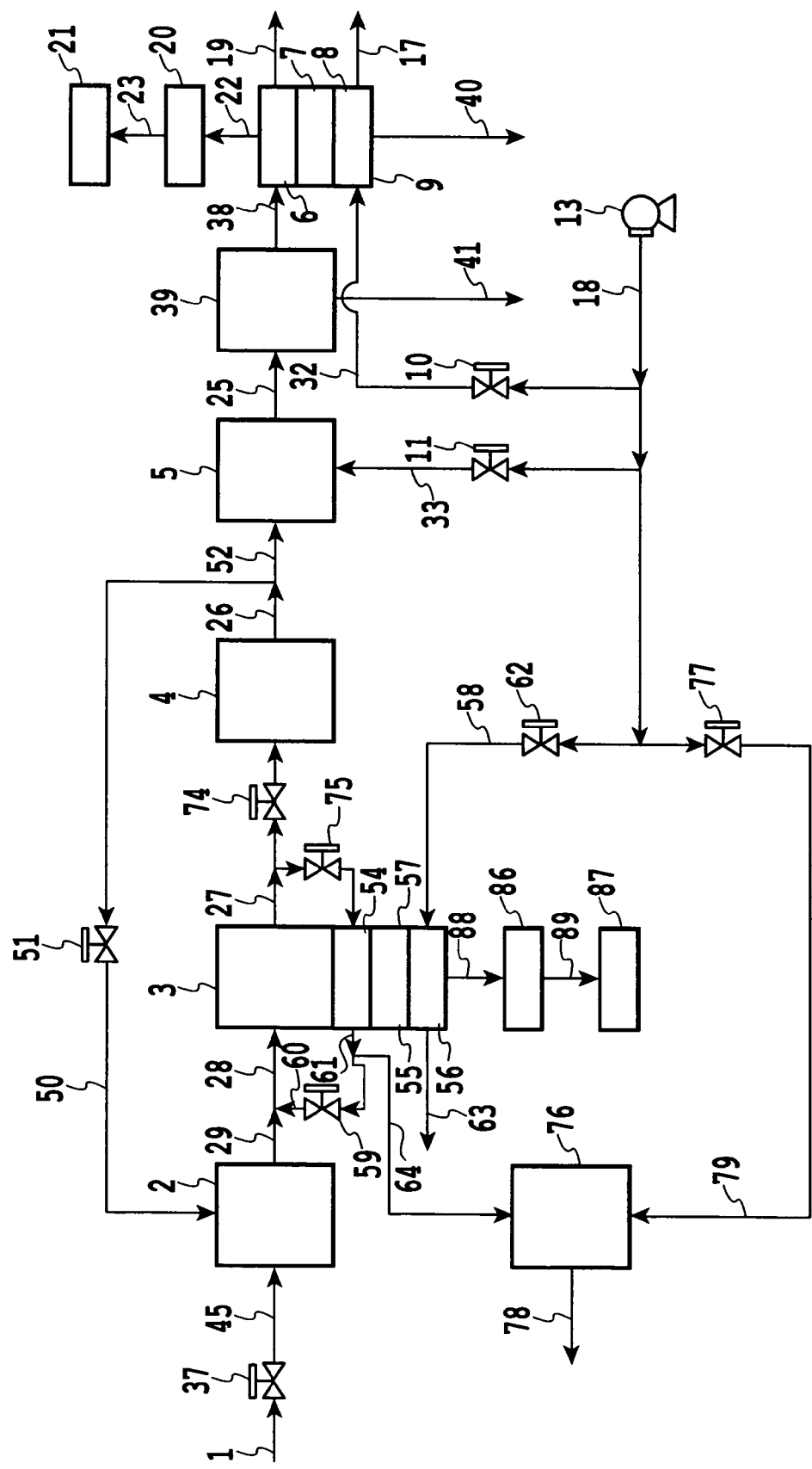
FIG. 4 is a diagram showing an embodiment 3 of the fuel cell power generating system according to the present invention.

FIG. 4 is a diagram showing an embodiment 3 of the fuel cell power generating system according to the present invention. Reference numerals in FIG. 4 will be now described. Reference numeral 76 denotes a combustor, reference numeral 79 denotes air for the combustor 76. Reference numeral 78 denotes an exhaust gas from the combustor 76, reference numeral 77 denotes a flow control valve which controls the flow rate of the air 79.

The fuel cell power generating system according to the embodiment 3 differs from the system according to the embodiment 1 shown in FIG. 2 in that the combustor 76 is provided which receives a to-be-ejected anode exhaust gas 64 and the air 79 to cause combustion.

Now, an operation of the fuel cell power generating system according to this embodiment will be described with reference to FIG. 4. The to-be-ejected anode exhaust gas 64 and the air 79, which is some of air 18 taken in by an air supply blower 13, are supplied to the combustor 76 to cause combustion of unreacted methane, unreacted hydrogen and unreacted carbon monoxide in the to-be-ejected anode exhaust gas 64 with oxygen in the air 79, thereby producing the high-temperature exhaust gas 78. The combustion reactions of hydrogen and carbon monoxide are expressed by the equations (11) and (12), respectively.

(Combustion Reaction of Hydrogen)

$$H_2 + 1/2 O_2 \rightarrow H_2O \tag{11}$$

(Combustion Reaction of Carbon Monoxide)

$$CO + 1/2 O_2 \rightarrow CO_2 \tag{12}$$

The high-temperature exhaust gas 78 can be used as a heat source for hot-water supply, heating and cooling using an absorption refrigerator, thereby enhancing the total thermal efficiency of the system including electric power and heat utilization. The amount of the supplied air 79 is set to a value appropriate to the amount of a reformed gas 27 supplied to an anode 54 of a solid oxide fuel cell stack 57 and the amount of a supplied recycled anode exhaust gas 60 by controlling the degree of opening of the flow control valve 77 based on a preset relationship between the degrees of opening of a flow control valve 75 and a flow control valve 59 (i.e. the amount of the reformed gas 27 supplied to the anode 54 and the amount of the supplied recycled anode exhaust gas 60, respectively) and the degree of opening of the flow control valve 77 (i.e. the amount of the supplied air 79).

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 4

Figure 5:
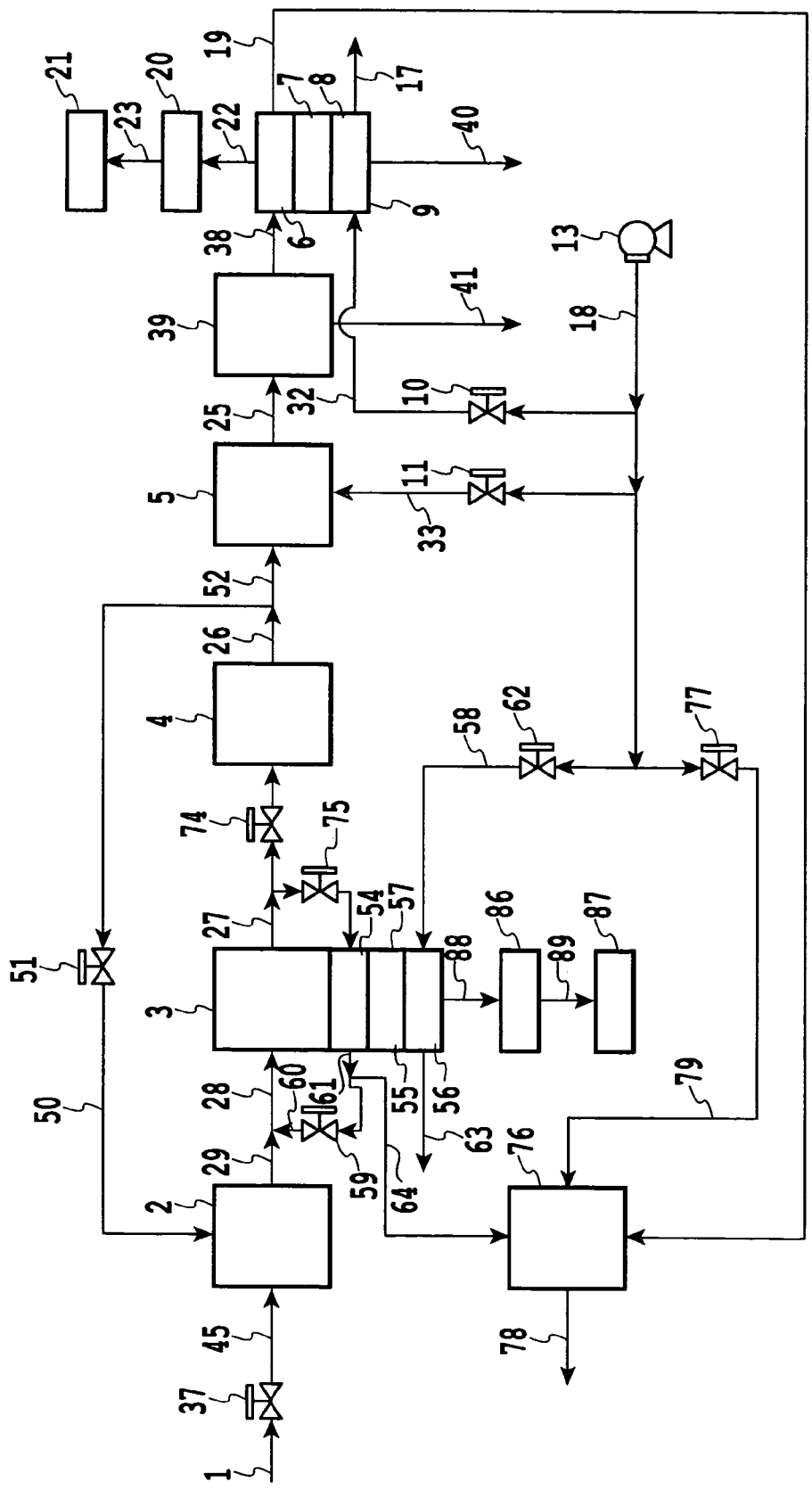
FIG. 5 is a diagram showing an embodiment 4 of the fuel cell power generating system according to the present invention.

FIG. 5 is a diagram showing an embodiment 4 of the fuel cell power generating system according to the present invention.

The fuel cell power generating system according to the embodiment 4 differs from the system according to the embodiment 1 shown in FIG. 2 in that a combustor 76 is provided which receives a to-be-ejected anode exhaust gas 64, an anode exhaust gas 19 and air 79 to cause combustion.

Now, an operation of the fuel cell power generating system according to this embodiment will be described with reference to FIG. 5. The to-be-ejected anode exhaust gas 64, the anode exhaust gas 19 and the air 79 are supplied to the combustor 76 to cause combustion of unreacted methane, unreacted hydrogen and unreacted carbon monoxide in the to-be-ejected anode exhaust gas 64 and unreacted methane and unreacted hydrogen in the anode exhaust gas 19 with oxygen in the air 79, thereby producing a high-temperature exhaust gas 78.

The high-temperature exhaust gas 78 can be used as a heat source for hot-water supply, heating and cooling using an absorption refrigerator, thereby enhancing the total thermal efficiency of the system including electric power and heat utilization. The amount of the supplied air 79 is set to a value appropriate to the amount of a reformed gas 27 supplied to an anode 54 of a solid oxide fuel cell stack 57, the amount of a recycled anode exhaust gas 60 supplied and the amount of the reformed gas 27 supplied to a CO shift converter 4 by controlling the degree of opening of a flow control valve 77 based on a preset relationship between the degrees of opening of a flow control valve 75, a flow control valve 59 and a flow control valve 74 (i.e. the amount of the reformed gas 27 supplied to the anode 54, the amount of the recycled anode exhaust gas 60 supplied and the amount of the reformed gas 27 supplied to the CO shift converter 4, respectively) and the degree of opening of the flow control valve 77 (i.e. the amount of the supplied air 79).

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 5

Figure 6:
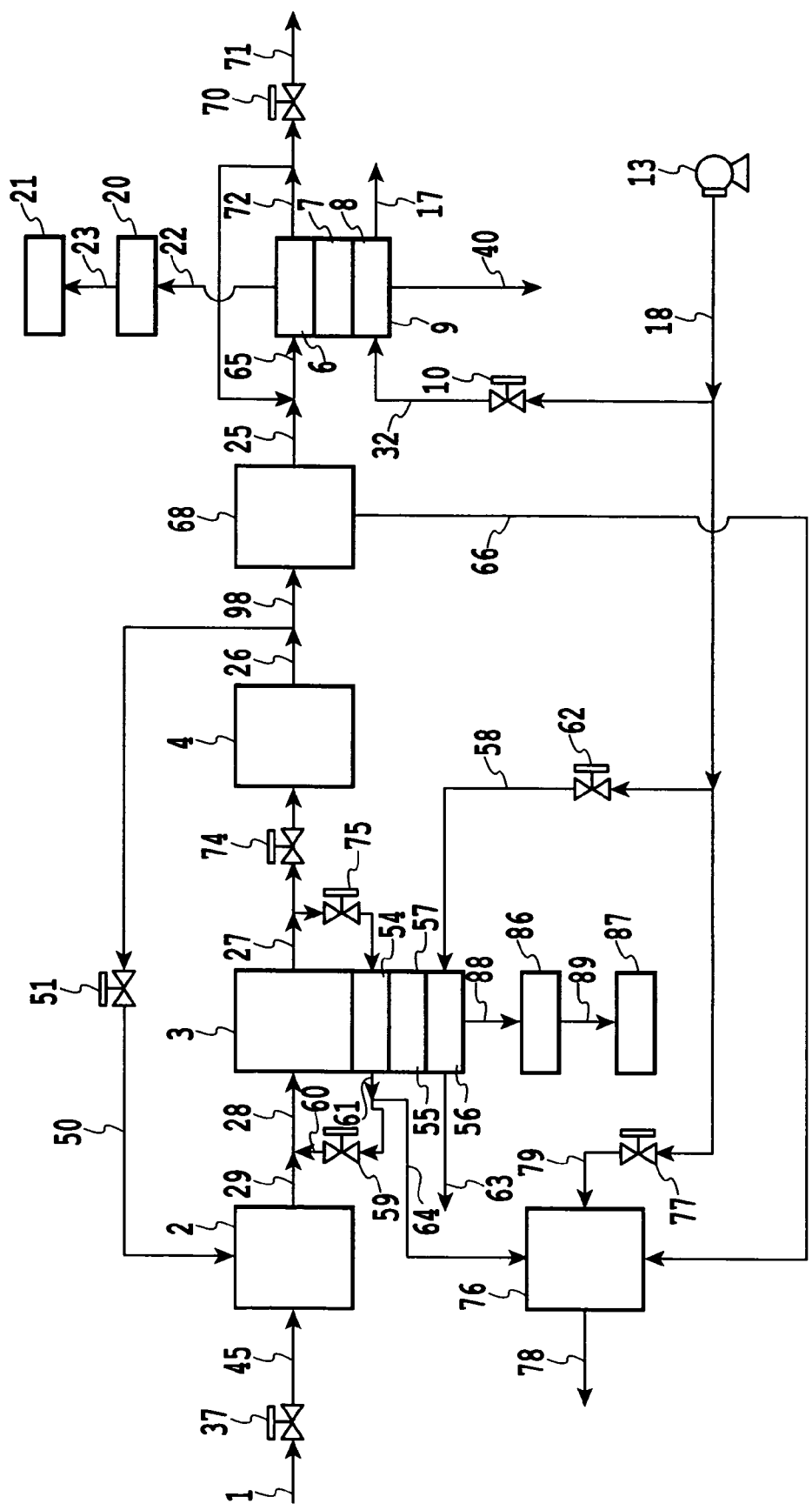
FIG. 6 is a diagram showing an embodiment 5 of the fuel cell power generating system according to the present invention.

FIG. 6 is a diagram showing an embodiment 5 of the fuel cell power generating system according to the present invention.

The fuel cell power generating system according to the embodiment 5 differs from the system according to the embodiment 2 shown in FIG. 3 in that the condenser 67 is omitted and a combustor 76 is provided which receives a to-be-ejected anode exhaust gas 64, an exhaust gas 66 from which hydrogen is separated in a hydrogen separator 68 and air 79 to cause combustion.

Now, an operation of the fuel cell power generating system according to this embodiment will be described with reference to FIG. 6. The to-be-ejected anode exhaust gas 64, the exhaust gas 66 and the air 79 are supplied to the combustor 76 to cause combustion of unreacted methane, unreacted hydrogen and unreacted carbon monoxide in the to-be-ejected anode exhaust gas 64 and unreacted methane and hydrogen in the exhaust gas 66 with oxygen in the air 79, thereby producing a high-temperature exhaust gas 78.

The high-temperature exhaust gas 78 can be used as a heat source for hot-water supply, heating and cooling using an absorption refrigerator, thereby enhancing the total thermal efficiency of the system including electric power and heat utilization. The amount of the supplied air 79 is set to a value appropriate to the amount of a reformed gas 27 supplied to an anode 54 of a solid oxide fuel cell stack 57, the amount of a recycled anode exhaust gas 60 supplied and the amount of the reformed gas 27 supplied to a CO shift converter 4 by controlling the degree of opening of a flow control valve 77 based on a preset relationship between the degrees of opening of a flow control valve 75, a flow control valve 59 and a flow control valve 74 (i.e. the amount of the reformed gas 27 supplied to the anode 54, the amount of the recycled anode exhaust gas 60 supplied and the amount of the reformed gas 27 supplied to the CO shift converter 4, respectively) and the degree of opening of the flow control valve 77 (i.e. the amount of the supplied air 79).

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional fuel cell power generating systems using a solid oxide fuel cell stack. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 6

Figure 7:
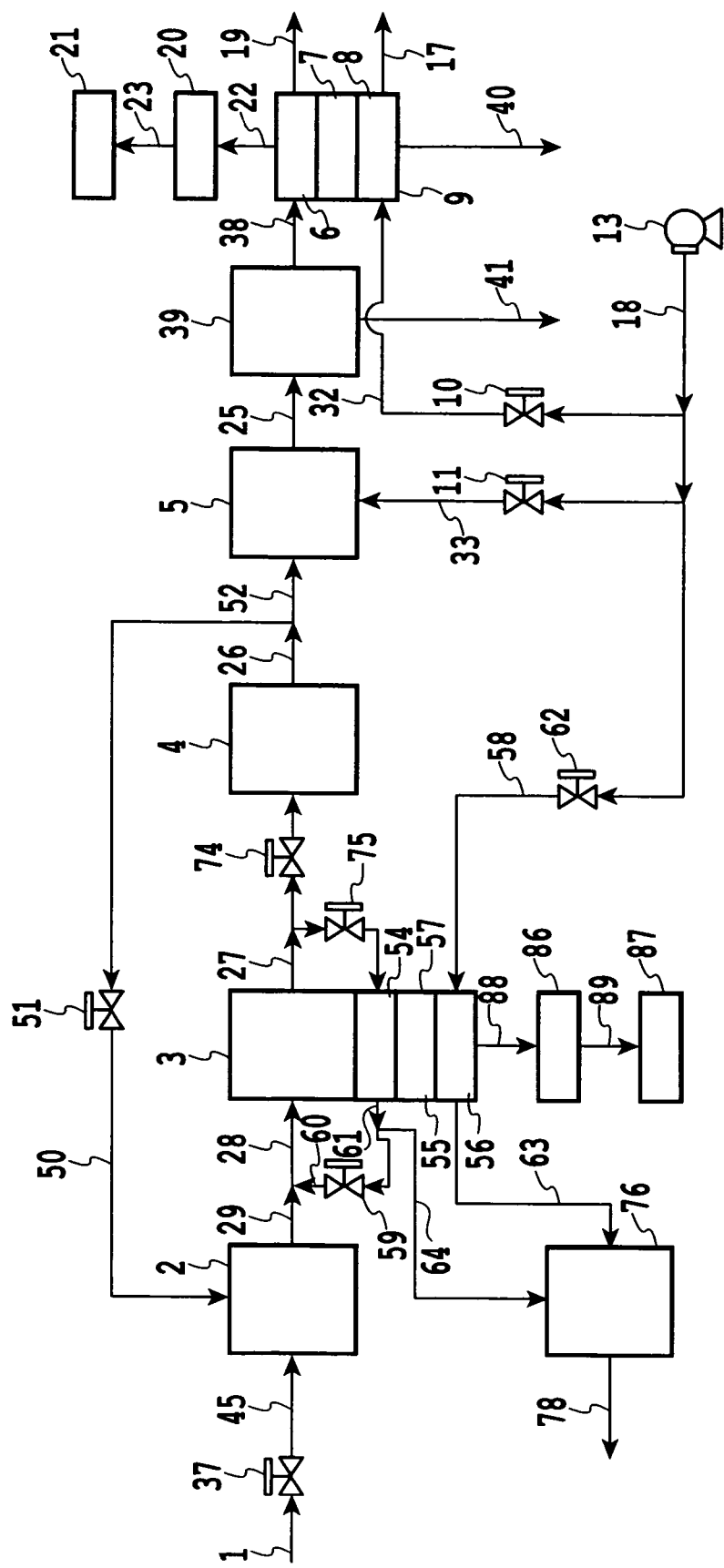
FIG. 7 is a diagram showing an embodiment 6 of the fuel cell power generating system according to the present invention.

FIG. 7 is a diagram showing an embodiment 6 of the fuel cell power generating system according to the present invention.

The fuel cell power generating system according to the embodiment 6 differs from the system according to the embodiment 1 shown in FIG. 2 in that a combustor 76 is provided which receives a to-be-ejected anode exhaust gas 64 and a cathode exhaust gas 63 to cause combustion.

Now, an operation of the fuel cell power generating system according to this embodiment will be described with reference to FIG. 7. The to-be-ejected anode exhaust gas 64 and the cathode exhaust gas 63 are supplied to the combustor 76 to cause combustion of unreacted methane, unreacted hydrogen and unreacted carbon monoxide in the to-be-ejected anode exhaust gas 64 with unreacted oxygen in the cathode exhaust gas 63, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization.

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from a solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 3 in which the cathode exhaust gas 63, instead of air 79, is supplied to the combustor 76. The embodiments 4 and 5 can be modified in the same manner to provide the same advantage as this embodiment.

Embodiment 7

Figure 8:
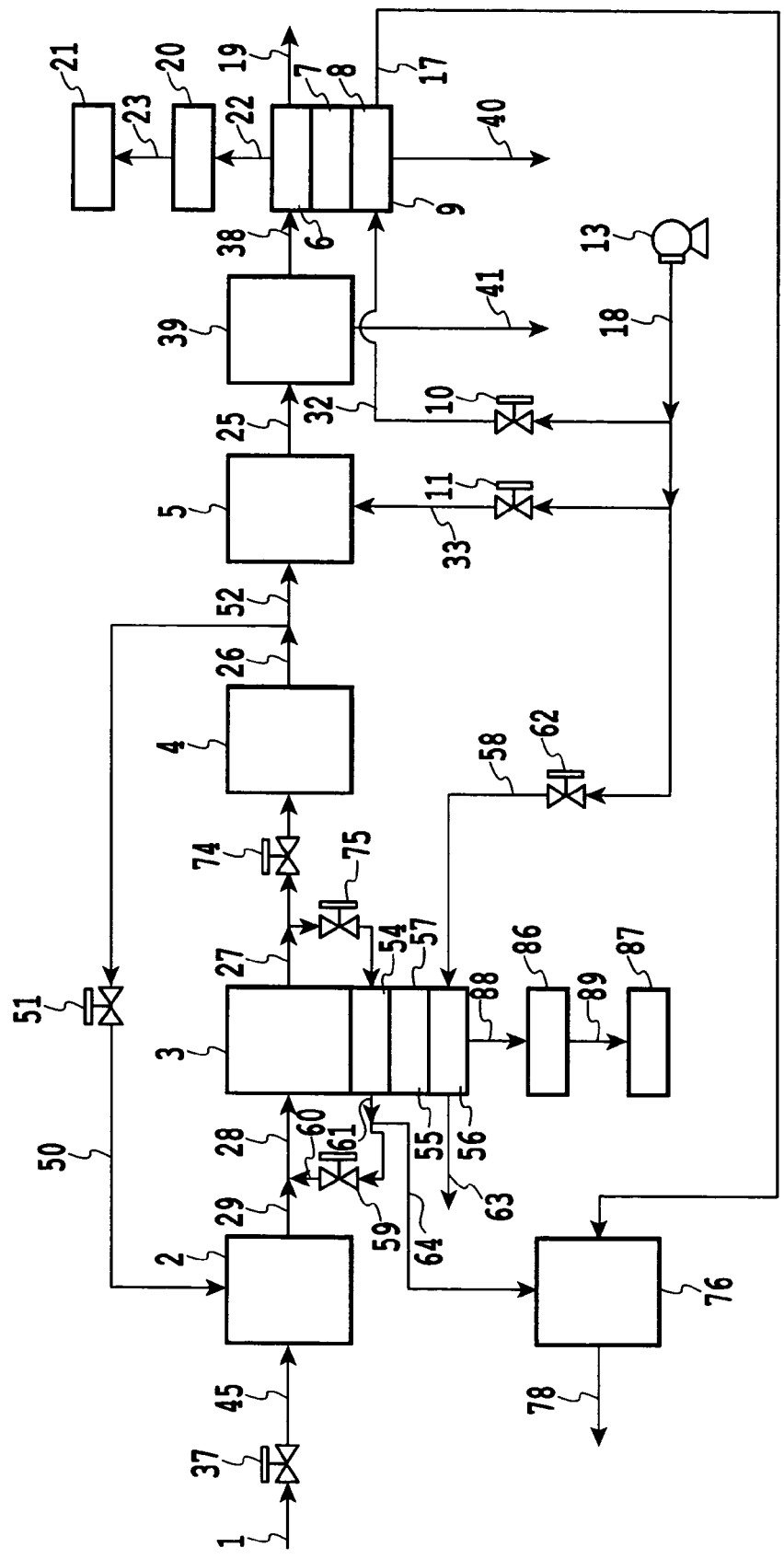
FIG. 8 is a diagram showing an embodiment 7 of the fuel cell power generating system according to the present invention.

FIG. 8 is a diagram showing an embodiment 7 of the fuel cell power generating system according to the present invention.

The fuel cell power generating system according to the embodiment 7 differs from the system according to the embodiment 1 shown in FIG. 2 in that a combustor 76 is provided which receives a to-be-ejected anode exhaust gas 64 and a cathode exhaust gas 17 to cause combustion.

Now, an operation of the fuel cell power generating system according to this embodiment will be described with reference to FIG. 8. The to-be-ejected anode exhaust gas 64 and the cathode exhaust gas 17 are supplied to the combustor 76 to cause combustion of unreacted methane, unreacted hydrogen and unreacted carbon monoxide in the to-be-ejected anode exhaust gas 64 with unreacted oxygen in the cathode exhaust gas 17, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization.

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from a solid oxide fuel cell stack 57 is used for the steam reforming reaction of hydrocarbon in a reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 3 in which the cathode exhaust gas 17 from the polymer electrolyte fuel cell stack 9, instead of air 79, is supplied to the combustor 76. The embodiments 4 and 5 can be modified in the same manner to provide the same advantage as this embodiment.

Embodiment 8

Figure 9:
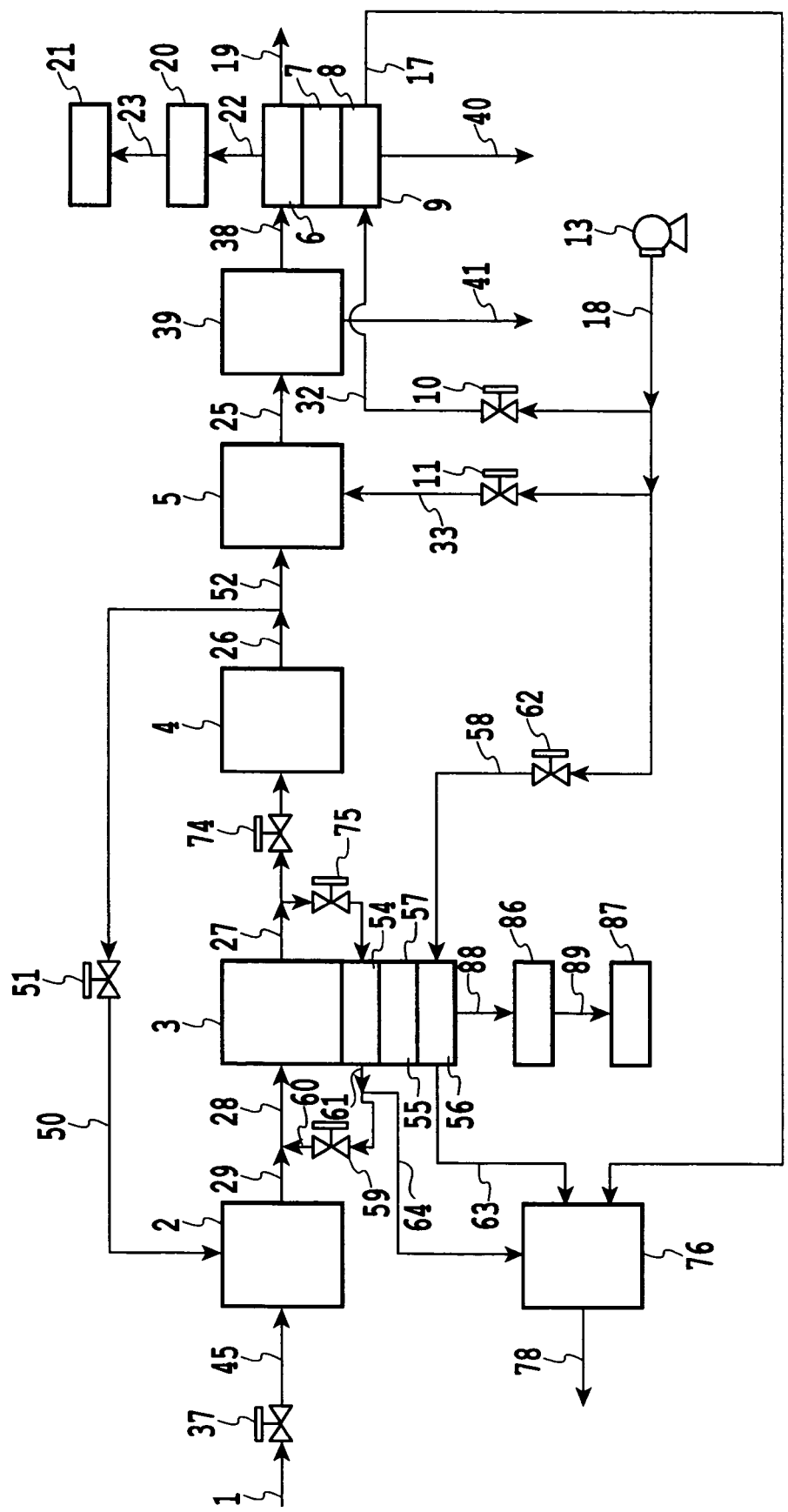
FIG. 9 is a diagram showing an embodiment 8 of the fuel cell power generating system according to the present invention.

FIG. 9 is a diagram showing an embodiment 8 of the fuel cell power generating system according to the present invention.

The fuel cell power generating system according to the embodiment 8 differs from the system according to the embodiment 1 shown in FIG. 2 in that a combustor 76 is provided which receives a to-be-ejected anode exhaust gas 64, a cathode exhaust gas 63 and a cathode exhaust gas 17 to cause combustion.

Now, an operation of the fuel cell power generating system according to this embodiment will be described with reference to FIG. 9. The to-be-ejected anode exhaust gas 64, the cathode exhaust gas 63 and the cathode exhaust gas 17 are supplied to the combustor 76 to cause combustion of unreacted methane, unreacted hydrogen and unreacted carbon monoxide in the to-be-ejected anode exhaust gas 64 with unreacted oxygen in the cathode exhaust gas 63 and the cathode exhaust gas 17, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization.

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from a solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 3 in which the cathode exhaust gas 63 and the cathode exhaust gas 17, instead of air 79, are supplied to the combustor 76. The embodiments 4 and 5 can be modified in the same manner to provide the same advantage as this embodiment.

Embodiment 9

Figure 10:
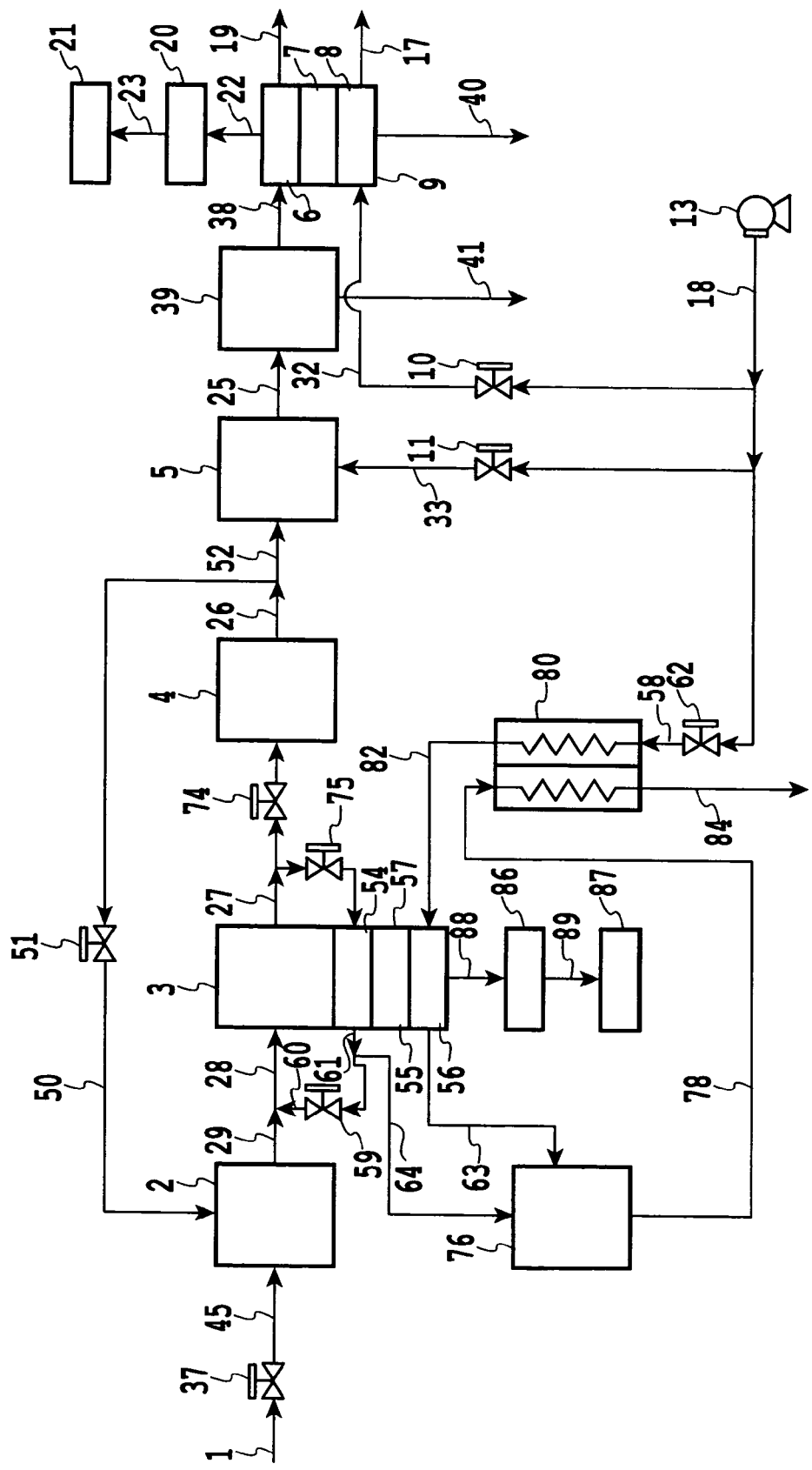
FIG. 10 is a diagram showing an embodiment 9 of the fuel cell power generating system according to the present invention.

FIG. 10 is a diagram showing an embodiment 9 of the fuel cell power generating system according to the present invention. Reference numerals in FIG. 10 will be now described. Reference numeral 80 denotes an air preheater for a solid oxide fuel cell stack 57, reference numeral 82 denotes air for the solid oxide fuel cell stack 57 which is increased in temperature by the air preheater 80, and reference numeral 84 denotes an exhaust gas from the air preheater 80.

The fuel cell power generating system according to the embodiment 9 differs from the system according to the embodiment 1 shown in FIG. 2 in that there are provided a combustor 76 which receives a to-be-ejected anode exhaust gas 64 and a cathode exhaust gas 63 to cause combustion and the air preheater 80 which receives an exhaust gas 78 and air 58 and increases the temperature of the air 58 by heat exchange between the exhaust gas 78 and the air 58.

Now, an operation of the fuel cell power generating system according to this embodiment will be described with reference to FIG. 10. In the air preheater 80, the temperature of the air 58 is increased by heat exchange between the high temperature exhaust gas 78 and the air 58. Air 82, which has been increased in temperature, is supplied to a cathode 56 of a solid oxide fuel cell stack 57 and used for power generation by the solid oxide fuel cell stack 57. The exhaust gas 78 having experienced heat exchange with the air 58 in the air preheater 80 is ejected as the exhaust gas 84.

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. In addition, since the exhaust gas 78 can be used for increasing the temperature of the air 58, the energy required for temperature-increase and supply of the air 58 can be reduced. Therefore, the sending end efficiency of the solid oxide fuel cell stack 57 can also be improved. As a result, the sending end efficiency of the entire system is enhanced, and the sending end output power of the entire system is increased.

This embodiment is a modification of the embodiment 6 in which the air preheater 80 is additionally provided which causes heat exchange between the exhaust gas 78 and the air 58. The embodiments 3, 4, 5, 7 and 8 can be modified in the same manner to provide the same advantage as this embodiment.

Embodiment 10

Figure 11:
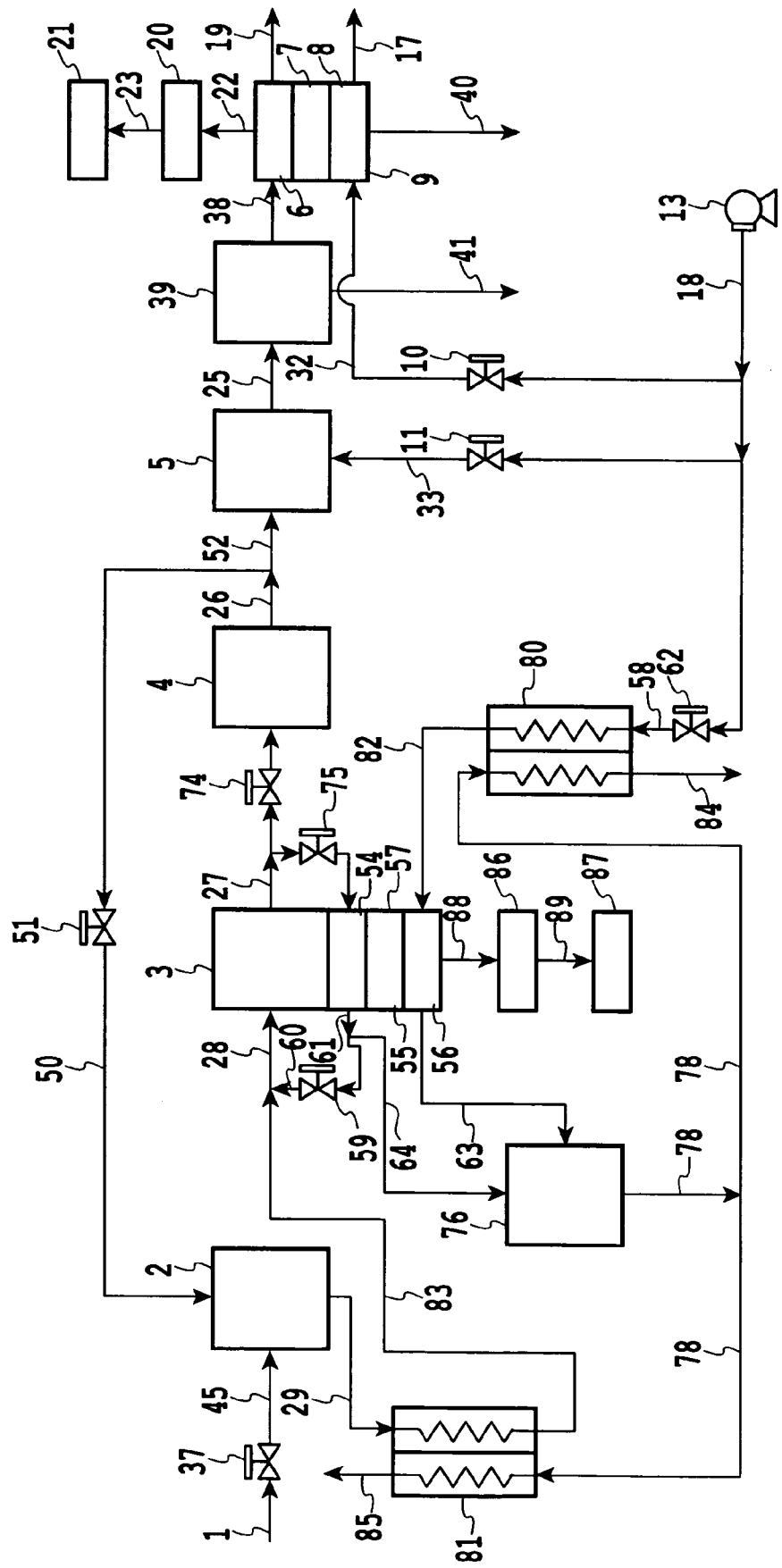
FIG. 11 is a diagram showing an embodiment 10 of the fuel cell power generating system according to the present invention.

FIG. 11 is a diagram showing an embodiment 10 of the fuel cell power generating system according to the present invention. Reference numerals in FIG. 11 will be now described. Reference numeral 81 denotes a fuel preheater, reference numeral 83 denotes a desulfurized natural gas having a temperature increased by the fuel preheater 81, and reference numeral 85 denotes an exhaust gas from the fuel preheater 81.

The fuel cell power generating system according to the embodiment 10 differs from the system according to the embodiment 1 shown in FIG. 2 in that there are provided a combustor 76 which receives a to-be-ejected anode exhaust gas 64 and a cathode exhaust gas 63 to cause combustion, an air preheater 80 which receives an exhaust gas 78 and air 58 and increases the temperature of the air 58 by heat exchange between the exhaust gas 78 and the air 58, and the fuel preheater 81 which receives the exhaust gas 78 and a desulfurized natural gas 29, which is a fuel, and increases the temperature of the desulfurized natural gas 29 by heat exchange between the exhaust gas 78 and the desulfurized natural gas 29.

Now, an operation of the fuel cell power generating system according to this embodiment will be described with reference to FIG. 11. In the air preheater 80, the temperature of the air 58 is increased by heat exchange between some of the high-temperature exhaust gas 78 and the air 58. Air 82, which has been increased in temperature, is supplied to a cathode 56 of a solid oxide fuel cell stack 57 and used for power generation by the solid oxide fuel cell stack 57. The exhaust gas 78 having experienced heat exchange with the air 58 in the air preheater 80 is ejected as the exhaust gas 84.

Besides, in the fuel preheater 81, the temperature of the desulfurized natural gas 29 is increased by heat exchange between the remainder of the high temperature exhaust gas 78 and the desulfurized natural gas 29. The desulfurized natural gas 83, which has been increased in temperature, is mixed with a recycled anode exhaust gas 60, and the resulting mixture gas 28 of steam and the desulfurized natural gas is supplied to a reformer 3. The exhaust gas 78 having experienced heat exchange with the desulfurized natural gas 29 in the fuel preheater 81 is ejected as the exhaust gas 85.

As in the embodiment 1, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. In addition, since the exhaust gas 78 can be used for increasing the temperature of the air 58, the energy required for temperature-increase and supply of the air 58 can be reduced. Therefore, the sending end efficiency of the solid oxide fuel cell stack 57 can also be improved.

Furthermore, since the exhaust gas 78 is used for increasing the temperature of the desulfurized natural gas 29, which is a fuel, the energy required for increasing the temperature of the desulfurized natural gas 29 can also be reduced, and thus, the sending end efficiency of the solid oxide fuel cell stack 57 can be further improved. As a result, the sending end efficiency of the entire system is enhanced, and the sending end output power of the entire system is increased.

This embodiment is a modification of the embodiment 6 in which there are additionally provided the air preheater 80 which causes heat exchange between the exhaust gas 78 and the air 58 and the fuel preheater 81 which causes heat exchange between the exhaust gas 78 and the desulfurized natural gas 29. The embodiments 3, 4, 5, 7 and 8 can be modified in the same manner to provide the same advantage as this embodiment.

In the embodiments 1 to 10 of the present invention shown in FIGS. 2 to 11, respectively, there is provided only one reformer 3. However, two reformers can be used. That is, there can be used a first stage pre-reformer, which primarily causes a steam reforming reaction of hydrocarbons in the natural gas which have two or more carbon atoms and are susceptible to thermal decomposition at a relatively low temperature, and a second stage stack reformer, which primarily causes a steam reforming reaction of methane, which is less susceptible to thermal decomposition.

Embodiment 11

Figure 12:
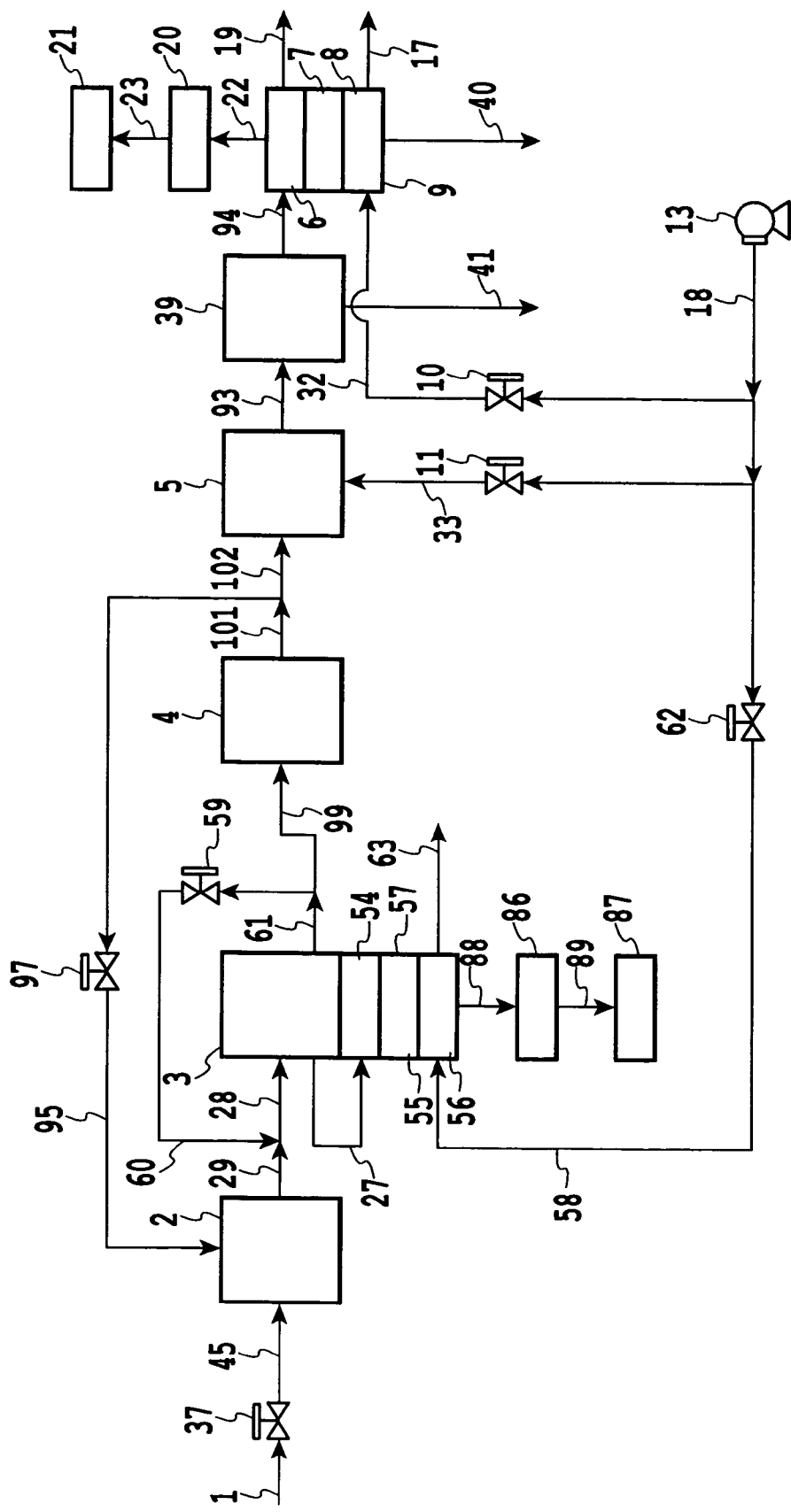
FIG. 12 is a diagram showing an embodiment 11 of the fuel cell power generating system according to the present invention.

FIG. 12 is a diagram showing an embodiment 11 of the fuel cell power generating system according to the present invention. Reference numerals in FIG. 12 will be now described. Reference numeral 99 denotes an anode exhaust gas for a CO shift converter 4 of a solid oxide fuel cell stack 57, reference numeral 101 denotes an anode exhaust gas of the solid oxide fuel cell stack 57, which is reduced in CO concentration to 1% or lower. Reference numeral 102 denotes an anode exhaust gas of the solid oxide fuel cell stack 57, which is intended for a CO selective oxidizer 5, and reference numeral 93 denotes an anode exhaust gas of the solid oxide fuel cell stack 57, which is reduced in CO concentration to about 10 ppm. Reference numeral 94 denotes an anode exhaust gas of the solid oxide fuel cell stack 57, from which unreacted steam has been removed by condensation. Reference numeral 95 denotes an anode exhaust gas recycled from the solid oxide fuel cell stack 57 to a desulfurizer 2, and reference numeral 97 denotes a flow control valve which controls the flow rate of the anode exhaust gas 95.

The fuel cell power generating system according to the embodiment 11 differs from the system according to the embodiment 1 shown in FIG. 2 in that the anode exhaust gas 99, instead of the reformed gas 27, is supplied to the CO shift converter 4.

Now, an operation of the fuel cell power generating system according to this embodiment will be described with reference to FIG. 12.

In order to provide hydrogen required for the desulfurizer 2 to produce hydrogen sulfide, some of the anode exhaust gas 101 of the solid oxide fuel cell stack 57, which contains unreacted hydrogen and has been reduced in CO concentration to 1% or lower, is recycled to the desulfurizer 2 as the recycled anode exhaust gas 95. The amount of the recycled anode exhaust gas 95 supplied is set to a value appropriate to the amount of a supplied natural gas 45 by controlling the degree of opening of the flow control valve 97 based on a preset relationship between the degree of opening of a flow control valve 37 (i.e. the amount of the supplied natural gas 45) and the degree of opening of the flow control valve 97 (i.e. the amount of the anode exhaust gas 95 supplied).

A desulfurized natural gas 29 resulting from desulfurization in the desulfurizer 2 is mixed with a recycled anode exhaust gas 60 containing steam produced by the cell reaction in the solid oxide fuel cell stack 57, and then the resulting mixture gas 28 of steam and the desulfurized natural gas is supplied to a reformer 3. The amount of the recycled anode exhaust gas 60 supplied is set to a value appropriate to the amount of the supplied natural gas 45 by controlling the degree of opening of a flow control valve 59 based on a preset relationship between the degree of opening of the flow control valve 37 (i.e. the amount of the supplied natural gas 45) and the degree of opening of the flow control valve 59 (i.e. the amount of the recycled anode exhaust gas 60 supplied). In the reformer 3, a steam reforming reaction of hydrocarbon contained in a natural gas is conducted by the action of a reforming catalyst loading the reformer 3, and thus, the reformed gas 27 rich in hydrogen is produced. The steam reforming reaction is an endothermic reaction, and therefore, in order to efficiently produce hydrogen, heat required for the reaction has to be supplied from the outside of the reformer 3 and the temperature of the reformer 3 has to be maintained at 700 to 750 degrees C. Thus, waste heat from the solid oxide fuel cell stack 57 which generates power at 800 to 1000 degrees C. as described later is supplied to the reformer 3 as the heat required for the steam reforming reaction.

The reformed gas 27 rich in hydrogen produced in the reformer 3 is supplied to an anode 54 of the solid oxide fuel cell stack 57 and used for power generation by the solid oxide fuel cell stack 57.

In order to provide the steam required for the steam reforming reaction of hydrocarbon in the reformer 3 as described above, some of an anode exhaust gas 61 containing steam produced by the cell reaction at the anode 54 is recycled, the recycled anode exhaust gas 60 is mixed with the desulfurized natural gas 29, and the mixture gas 28 is supplied to the reformer 3. The remainder of the anode exhaust gas 61 is supplied to the CO shift converter 4 as the anode exhaust gas 99. A cathode exhaust gas 63 can be used as a heat source for hot-water supply, heating and cooling using an absorption refrigerator, thereby enhancing the total thermal efficiency of the system including electric power and heat utilization.

The anode exhaust gas 99 contains carbon monoxide, which causes deterioration of the electrode catalyst at an anode 6 of a polymer electrolyte fuel cell stack 9. Therefore, the CO shift converter 4 causes the water shift reaction expressed by the equation (2) to reduce the CO concentration of the anode exhaust gas 99 to 1% or lower and ejects the anode exhaust gas 101 therefrom.

Part of the anode exhaust gas 101, which has been reduced in CO concentration to 1% or lower, is recycled to the desulfurizer 2 as the anode exhaust gas 95 as described above. The remainder of the anode exhaust gas 101 is supplied, as the anode exhaust gas 102, to the CO selective oxidizer 5 to reduce the CO concentration thereof to about 10 ppm. This is because if an anode exhaust gas 101 having a CO concentration of 100 ppm or higher is supplied to the anode 6 of the polymer electrolyte fuel cell stack 9, it causes deterioration of the electrode catalyst. The CO selective oxidizer 5 is loaded with a precious metal catalyst, such as platinum-based catalyst or ruthenium-based catalyst, serving as a CO selective oxidizing catalyst. In addition, air 33 which is some of air 18 taken in by an air supply blower 13 is supplied to the CO selective oxidizer 5. The CO selective oxidizer 5 causes carbon monoxide contained in the anode exhaust gas 102 to react with oxygen in the air 33 to convert carbon monoxide into carbon dioxide through the CO selective oxidizing reaction expressed by the equation (3), which is an exothermic reaction, thereby reducing the CO concentration of the anode exhaust gas 102 to about 10 ppm. Then, the CO selective oxidizer 5 ejects the anode exhaust gas 93.

Unreacted steam contained in the anode exhaust gas 93 having the CO concentration reduced to about 10 ppm is cooled to a temperature of 100 degrees C. or lower and thereby collected as a condensate 41 in a condenser 39. The anode exhaust gas 94, which results from condensation of the unreacted steam in the condenser 39, is supplied to the anode 6 of the polymer electrolyte fuel cell stack 9.

At the anode 6 of the polymer electrolyte fuel cell stack 9, by the action of a platinum-based electrode catalyst, about 80% of hydrogen contained in the anode exhaust gas 94 resulting from condensation of the unreacted steam is changed into hydrogen ions and electrons through the anode reaction expressed by the equation (4).

According to this embodiment, since steam contained in the anode exhaust gas 61 from the solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in the reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 12

Figure 13:
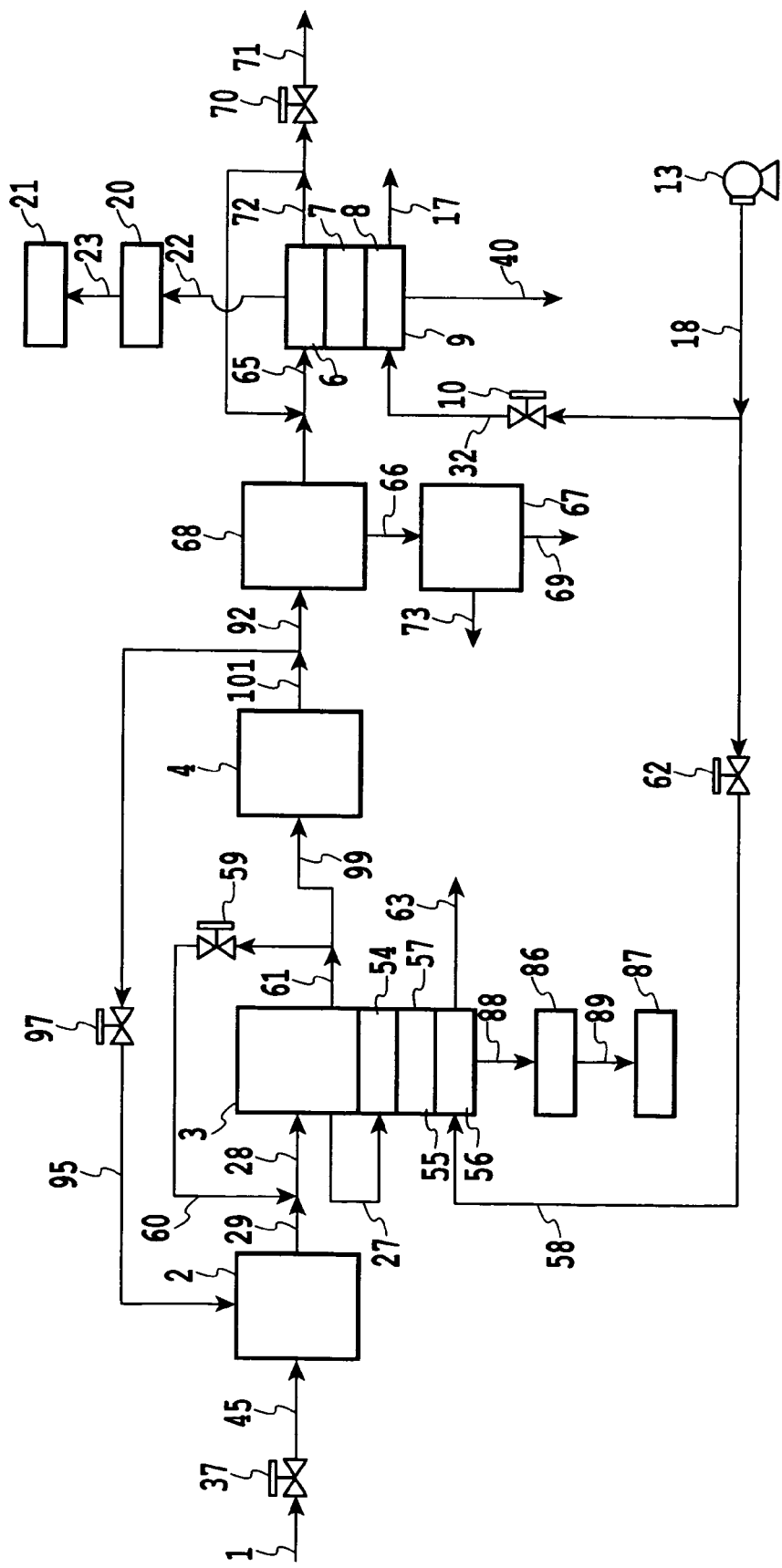
FIG. 13 is a diagram showing an embodiment 12 of the fuel cell power generating system according to the present invention.

FIG. 13 is a diagram showing an embodiment 12 of the fuel cell power generating system according to the present invention. Reference numeral 92 in FIG. 13 denotes an anode exhaust gas of a solid oxide fuel cell stack 57, which is intended for a hydrogen separator 68.

The fuel cell power generating system according to the embodiment 12 differs from the system according to the embodiment 11 shown in FIG. 12 in that the hydrogen separator 68 and a condenser 67 are provided instead of the CO selective oxidizer 5 and the condenser 39.

Now, an operation of the fuel cell power generating system according to this embodiment will be described with reference to FIG. 13. The anode exhaust gas 92 is supplied to the hydrogen separator 68, which has a hydrogen separator membrane, such as a palladium membrane, where hydrogen 65 is separated from the anode exhaust gas 92. At this time, for efficient hydrogen separation, the anode exhaust gas 92 is pressurized as required. Hydrogen 65 is supplied to an anode 6 of a polymer electrolyte fuel cell stack 9 and electrochemically reacts with oxygen in air 32. In this way, power generation by the polymer electrolyte fuel cell stack 9 is conducted.

In order to improve the sending end efficiency of the polymer electrolyte fuel cell stack 9, an anode hydrogen exhaust gas 72 containing unreacted hydrogen is completely recycled to the anode 6 and reused for power generation. However, the anode hydrogen exhaust gas 72 of the polymer electrolyte fuel cell stack 9 contains not only hydrogen but also a small amount of impurities, and therefore, a purge valve 70 is intermittently opened to eject a purge gas 71. An exhaust gas 66 has the moisture content thereof condensed by the condenser 67, resulting in a condensate 73, and then is ejected as a dry exhaust gas 69.

As in the embodiment 11, according to this embodiment, since steam contained in an anode exhaust gas 61 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 13

Figure 14:
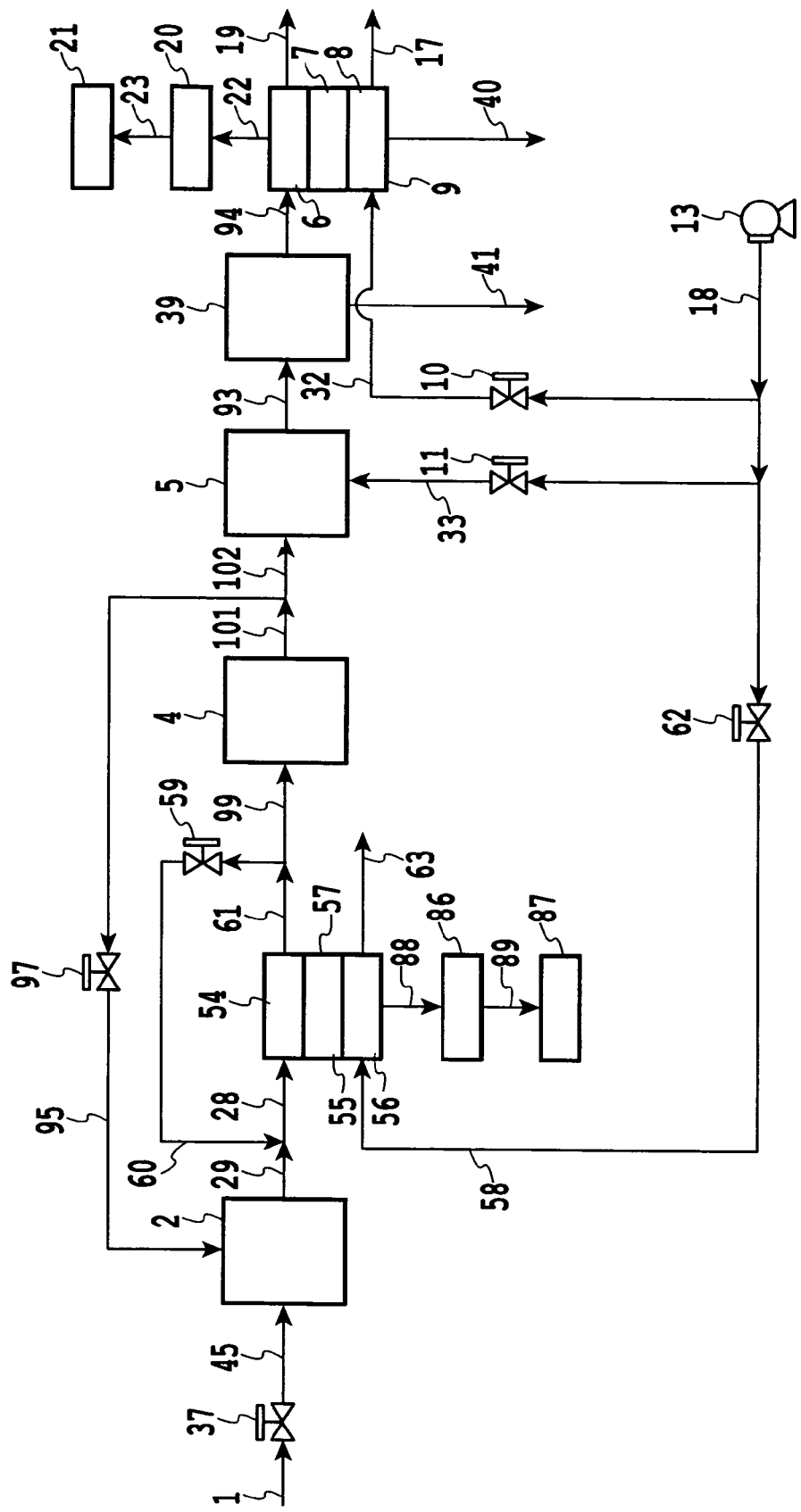
FIG. 14 is a diagram showing an embodiment 13 of the fuel cell power generating system according to the present invention.

FIG. 14 is a diagram showing an embodiment 13 of the fuel cell power generating system according to the present invention.

The fuel cell power generating system according to the embodiment 13 differs from the system according to the embodiment 11 shown in FIG. 12 in that the reformer 3 is omitted.

Now, an operation of the fuel cell power generating system according to this embodiment will be described with reference to FIG. 14. A desulfurized natural gas 29 resulting from desulfurization in a desulfurizer 2 is mixed with a recycled anode exhaust gas 60 containing steam produced by the cell reaction in a solid oxide fuel cell stack 57, and the resulting mixture gas 28 of steam and the desulfurized natural gas is supplied to an anode 54 of the solid oxide fuel cell stack 57. At the anode 54, by the action of an anode catalyst, as team reforming reaction of hydrocarbon (primarily methane) contained in a natural gas is achieved to produce a reformed gas containing hydrogen. Hydrogen and carbon monoxide in the reformed gas produced at the anode 54 are consumed there by the anode reactions (8) and (9), respectively, and thus, power generation by the solid oxide fuel cell stack 57 is achieved.

The steam reforming reaction of hydrocarbon is an endothermic reaction. Heat generated by the solid oxide fuel cell stack 57 is used for the steam reforming reaction of hydrocarbon at the anode 54. The power generating temperature of the solid oxide fuel cell stack 57 is typically 800 degrees C. to 1000 degrees C. and maintained by the heat generated by the cell reaction. Thus, the heat generated by the solid oxide fuel cell stack 57 can be used for the steam reforming reaction of hydrocarbon at the anode 54 as described above.

In order to provide the steam required for the steam reforming reaction of hydrocarbon at the anode 54 as described above, some of an anode exhaust gas 61 of the solid oxide fuel cell stack 57 containing steam produced by the cell reaction at the anode 54 is recycled, the recycled anode exhaust gas 60 is mixed with the desulfurized natural gas 29, and then, the resulting mixture gas 28 is supplied to the anode 54. The remainder of the anode exhaust gas 61 is supplied to a CO shift converter 4 as an anode exhaust gas 99 of the solid oxide fuel cell stack 57.

As in the embodiment 11, according to this embodiment, since steam contained in the anode exhaust gas 61 from the solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the generated heat in the solid oxide fuel cell stack 57 is used for the steam reforming reaction of hydrocarbon at the anode 54, the energy externally supplied for the steam reforming reaction can be reduced. Thus, the sending end efficiency of the polymer electrolyte fuel cell stack 9 can be improved.

In addition, since the generated heat in the solid oxide fuel cell stack 57 is used for the steam reforming reaction of hydrocarbon at the anode 54, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 14

Figure 15:
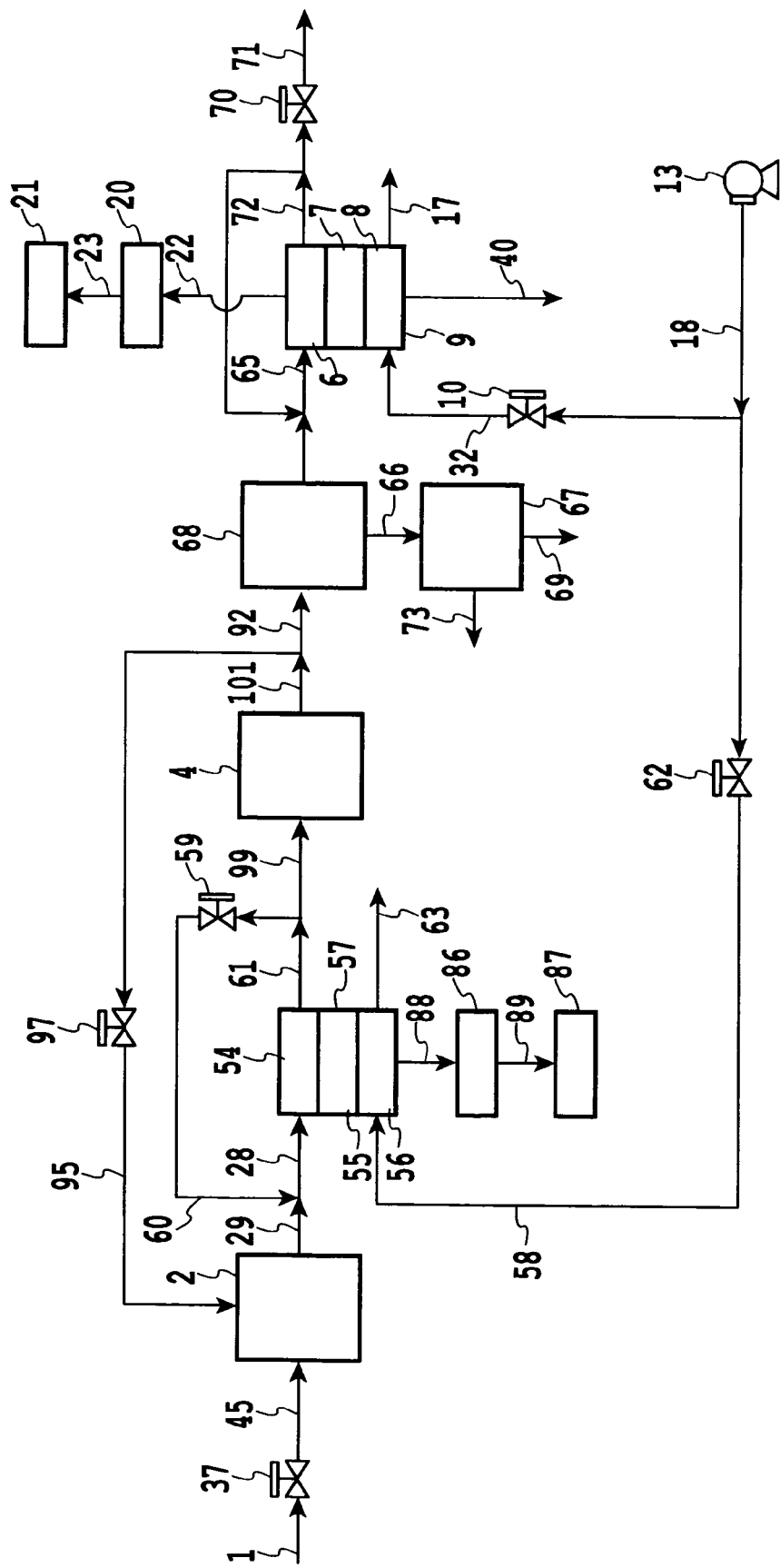
FIG. 15 is a diagram showing an embodiment 14 of the fuel cell power generating system according to the present invention.

FIG. 15 is a diagram showing an embodiment 14 of the fuel cell power generating system according to the present invention.

The fuel cell power generating system according to the embodiment 14 differs from the system according to the embodiment 11 shown in FIG. 12 in that the reformer 3 is omitted and a hydrogen separator 68 and a condenser 67 are provided instead of the CO selective oxidizer 5 and the condenser 39.

Now, an operation of the fuel cell power generating system according to this embodiment will be described with reference to FIG. 15. In order to provide the steam required for the steam reforming reaction of hydrocarbon at an anode 54 as described above, some of an anode exhaust gas 61 of a solid oxide fuel cell stack 57 containing steam produced by the cell reaction at an anode 54 is recycled, the recycled anode exhaust gas 60 is mixed with a desulfurized natural gas 29, and then, the resulting mixture gas 28 is supplied to the anode 54. The remainder of the anode exhaust gas 61 is supplied to the hydrogen separator 68 as an anode exhaust gas 92 of the solid oxide fuel cell stack 57. The hydrogen separator 68 separates hydrogen 65 from the anode exhaust gas 92 supplied thereto and ejects the resulting gas.

As in the embodiment 11, according to this embodiment, since steam contained in the anode exhaust gas 61 from the solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the generated heat in the solid oxide fuel cell stack 57 is used for the steam reforming reaction of hydrocarbon at the anode 54, the energy externally supplied for the steam reforming reaction can be reduced. Thus, the sending end efficiency of a polymer electrolyte fuel cell stack 9 can be improved.

In addition, since the generated heat in the solid oxide fuel cell stack 57 is used for the steam reforming reaction of hydrocarbon at the anode 54, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

Embodiment 15

Figure 16:
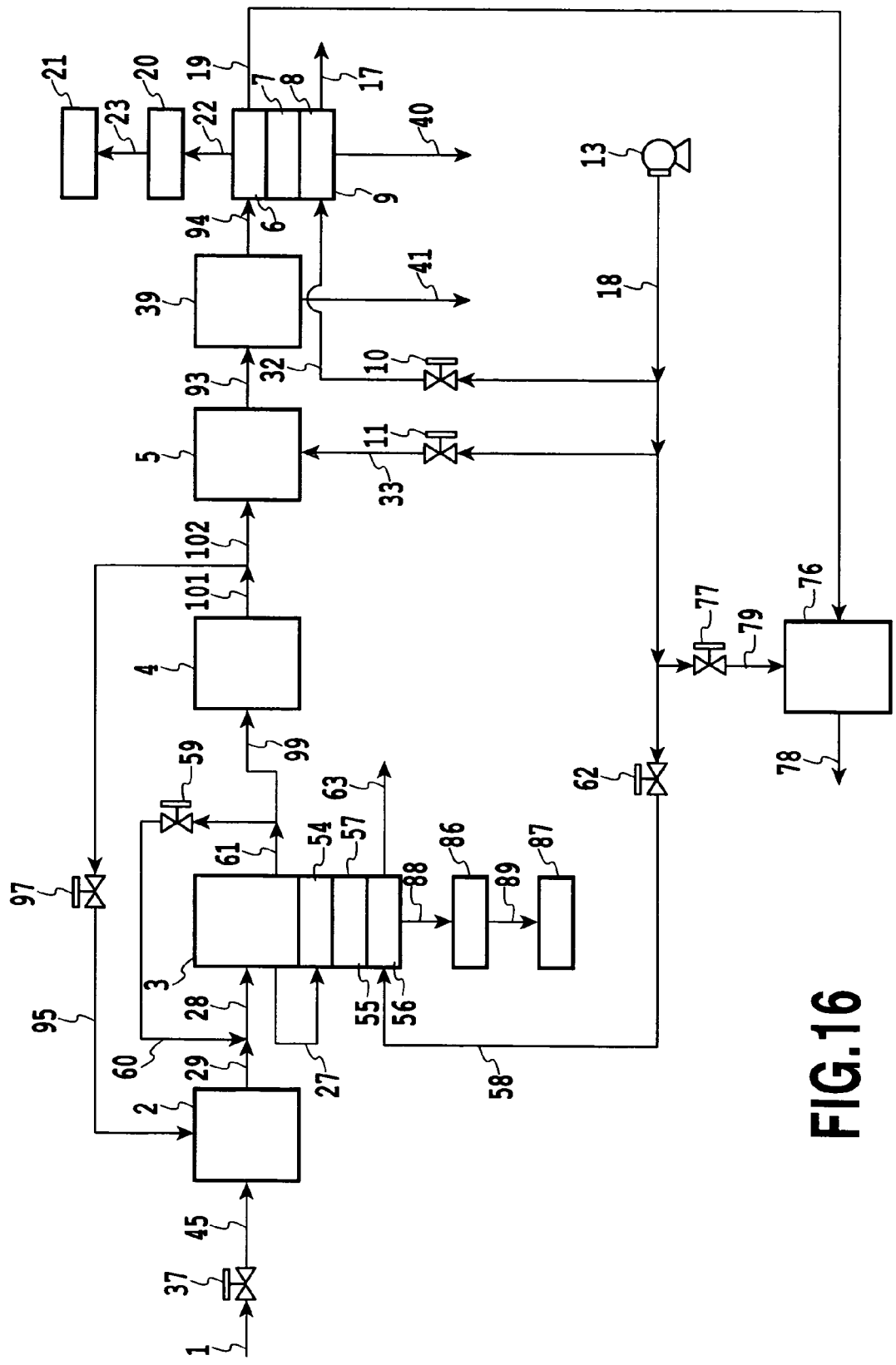
FIG. 16 is a diagram showing an embodiment 15 of the fuel cell power generating system according to the present invention.

FIG. 16 is a diagram showing an embodiment 15 of the fuel cell power generating system according to the present invention.

The fuel cell power generating system according to the embodiment 15 differs from the system according to the embodiment 11 shown in FIG. 12 in that a combustor 76 is provided which receives an anode exhaust gas 19 of a polymer electrolyte fuel cell stack 9 and air 79 to cause combustion.

Now, an operation of the fuel cell power generating system according to this embodiment will be described with reference to FIG. 16. The anode exhaust gas 19 and the air 79, which is some of air 18 taken in by an air supply blower 13, are supplied to the combustor 76 to cause combustion of unreacted methane and unreacted hydrogen in the anode exhaust gas 19 with oxygen in the air 79, thereby producing a high-temperature exhaust gas 78. The combustion reaction of hydrogen is expressed by the equation (11).

The high-temperature exhaust gas 78 can be used as a heat source for hot-water supply, heating and cooling using an absorption refrigerator, thereby enhancing the total thermal efficiency of the system including electric power and heat utilization. The amount of the supplied air 79 is set to a value appropriate to the amount of a supplied natural gas 45 by controlling the degree of opening of a flow control valve 77 based on a preset relationship between the degree of opening of a flow control valve 37 (i.e. the amount of the supplied natural gas 45) and the degree of opening of the flow control valve 77 (i.e. the amount of the supplied air 79).

As in the embodiment 11, according to this embodiment, since steam contained in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of the polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is equivalent to the embodiment 11 to which the combustor 76 is added. The combustor 76 receives the anode exhaust gas 19 and the air 79 to cause combustion.

The same addition or modification can be made to the embodiment 13, resulting the same advantage as this embodiment.

Embodiment 16

Figure 17:
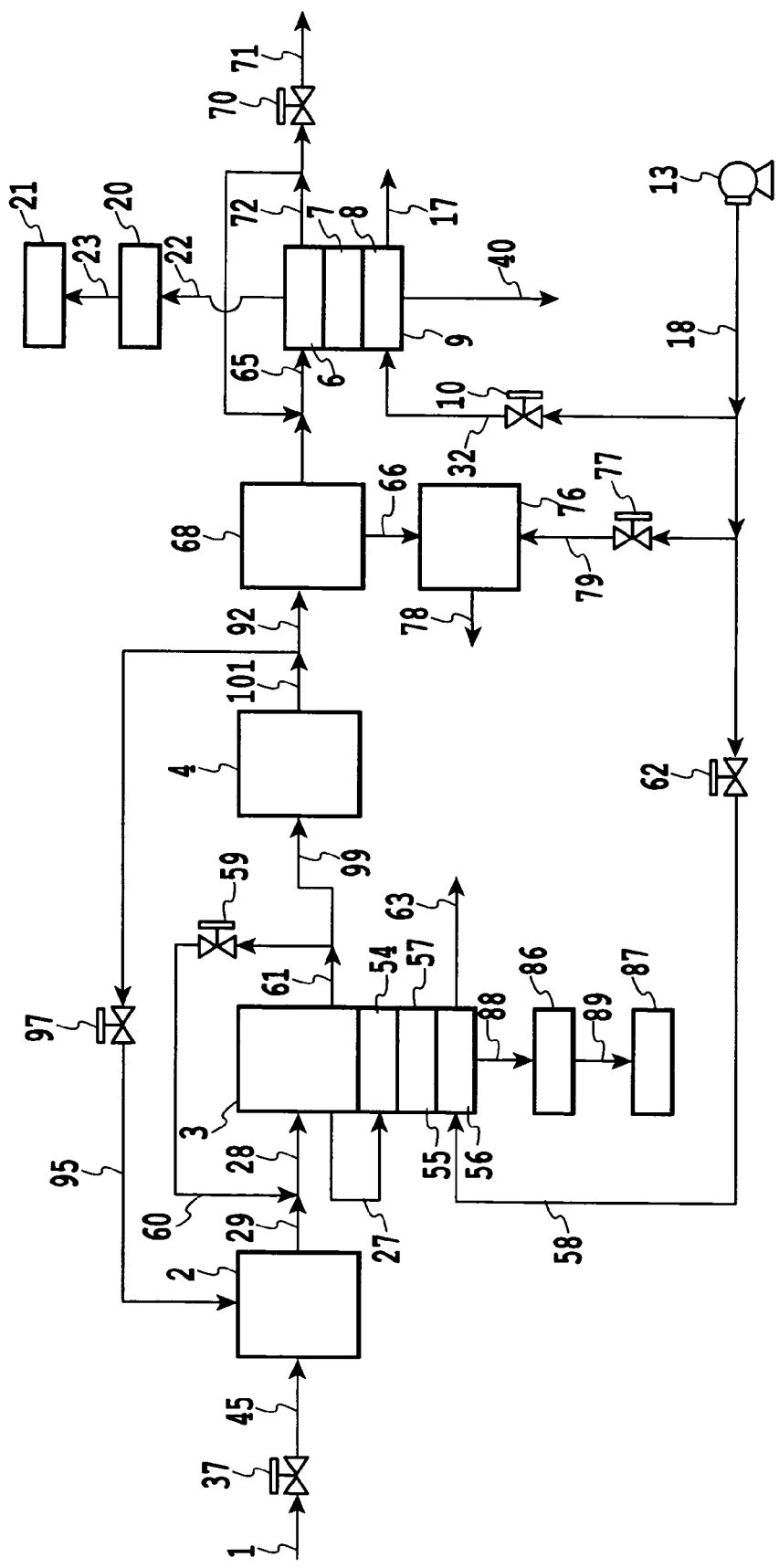
FIG. 17 is a diagram showing an embodiment 16 of the fuel cell power generating system according to the present invention.

FIG. 17 is a diagram showing an embodiment 16 of the fuel cell power generating system according to the present invention.

The fuel cell power generating system according to the embodiment 16 differs from the system according to the embodiment 12 shown in FIG. 13 in that the condenser 67 is omitted and a combustor 76 is provided which receives an exhaust gas 66 of a hydrogen separator 68 and air 79 to cause combustion.

Now, an operation of the fuel cell power generating system according to this embodiment will be described with reference to FIG. 17. The exhaust gas 66 of the hydrogen separator 68 and the air 79 is supplied to the combustor 76 to cause combustion of unreacted methane and hydrogen in the exhaust gas 66 with oxygen in the air 79, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization. The amount of the supplied air 79 is set to a value appropriate to the amount of a supplied natural gas 45 by controlling the degree of opening of a flow control valve 77 based on a preset relationship between the degree of opening of a flow control valve 37 (i.e. the amount of the supplied natural gas 45) and the degree of opening of the flow control valve 77 (i.e. the amount of the supplied air 79).

As in the embodiment 11, according to this embodiment, since steam in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 12 in which the combustor 76 is additionally provided. The combustor 76 receives the exhaust gas 66 and the air 79 to cause combustion. The embodiment 14 can be modified in the same manner to provide the same advantage as this embodiment.

Embodiment 17

Figure 18:
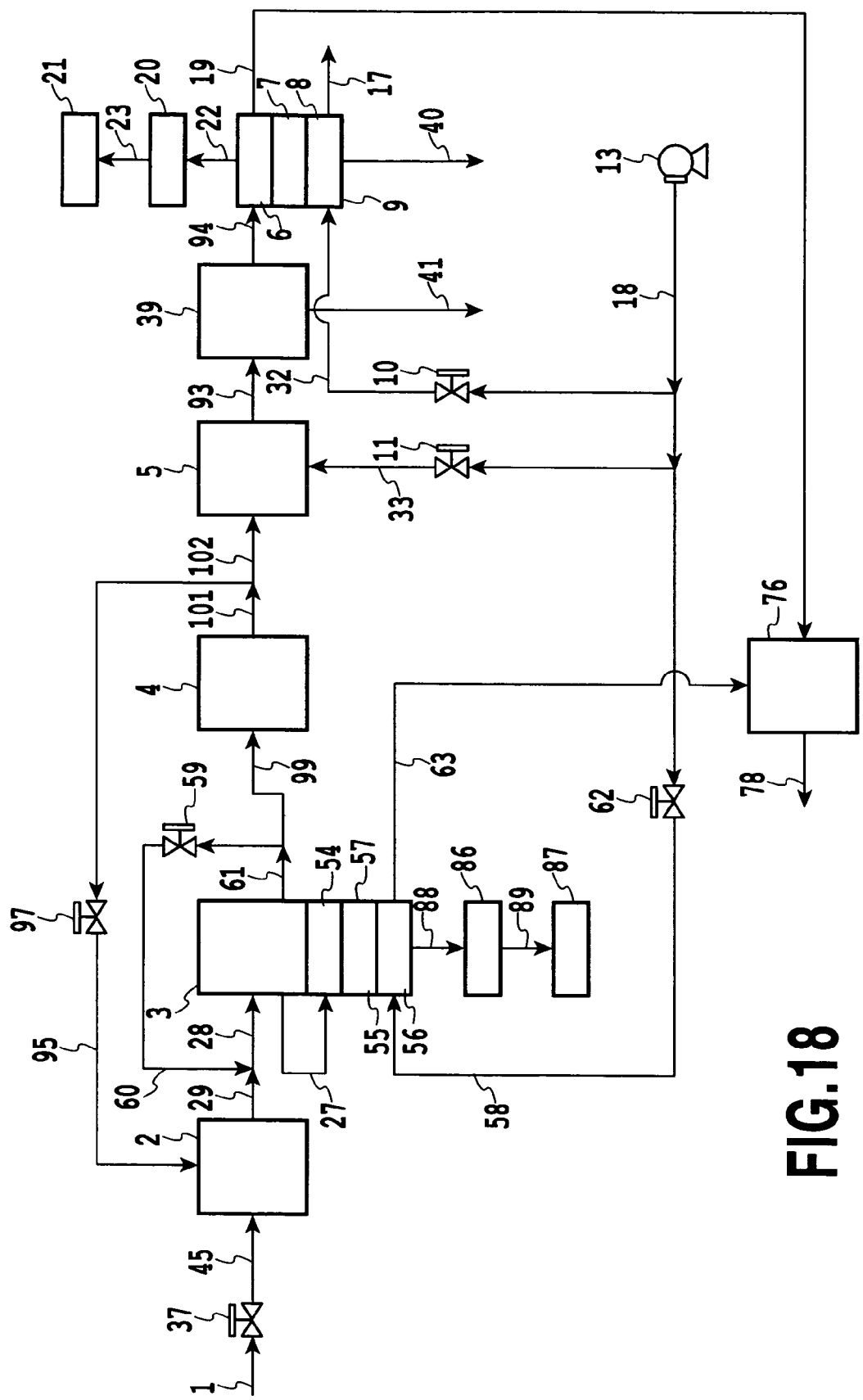
FIG. 18 is a diagram showing an embodiment 17 of the fuel cell power generating system according to the present invention.

FIG. 18 is a diagram showing an embodiment 17 of the fuel cell power generating system according to the present invention.

The fuel cell power generating system according to the embodiment 17 differs from the system according to the embodiment 11 shown in FIG. 12 in that a combustor 76 is provided which receives an anode exhaust gas 19 and a cathode exhaust gas 63 to cause combustion.

Now, an operation of the fuel cell power generating system according to this embodiment will be described with reference to FIG. 18. The anode exhaust gas 19 and the cathode exhaust gas 63 are supplied to the combustor 76 to cause combustion of unreacted methane and unreacted hydrogen in the anode exhaust gas 19 with unreacted oxygen in the cathode exhaust gas 63, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization.

As in the embodiment 11, according to this embodiment, since steam in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 15 in which the cathode exhaust gas 63, instead of the air 79, is supplied to the combustor 76. The embodiment 16 can be modified in the same manner to provide the same advantage as this embodiment.

Embodiment 18

Figure 19:
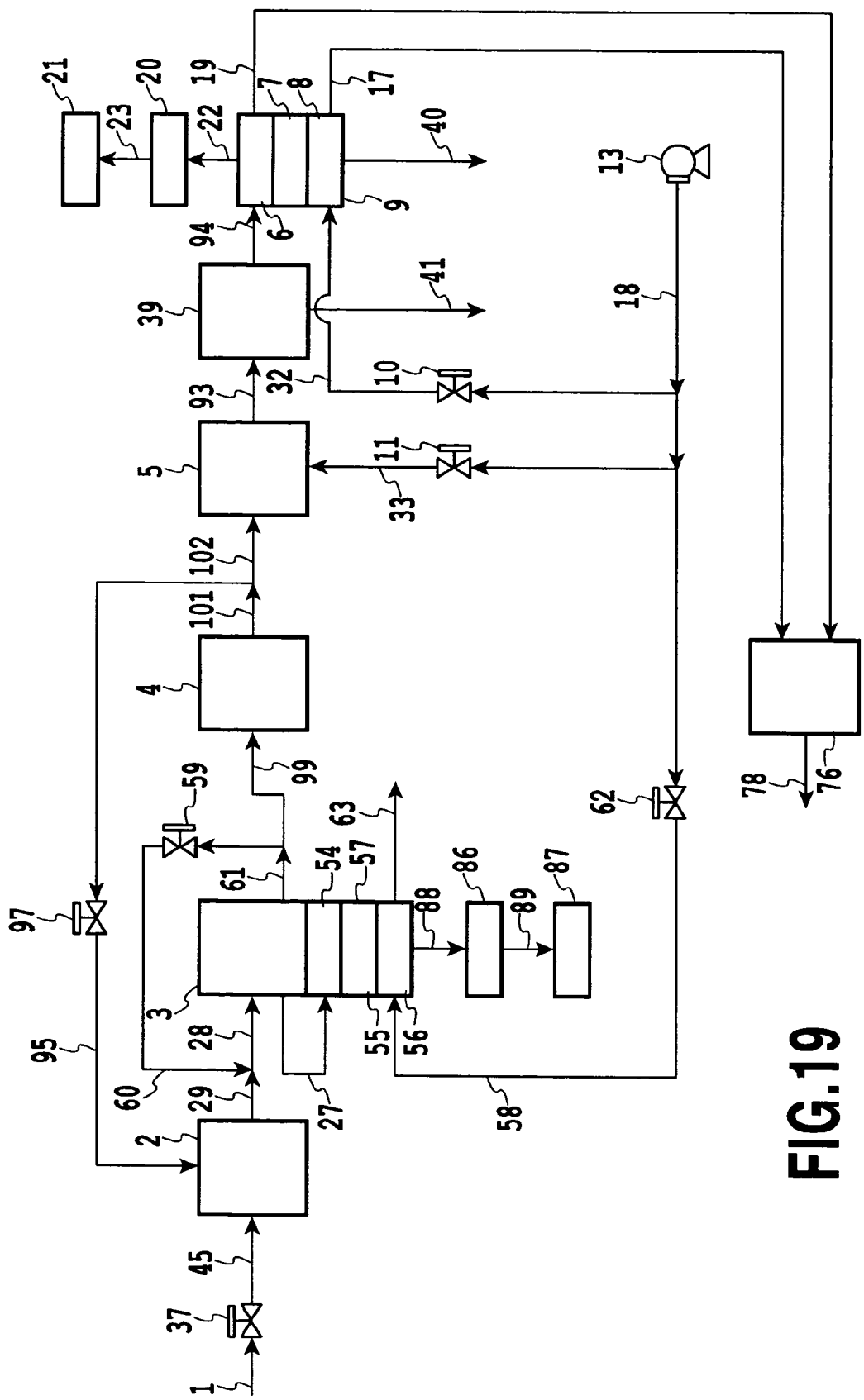
FIG. 19 is a diagram showing an embodiment 18 of the fuel cell power generating system according to the present invention.

FIG. 19 is a diagram showing an embodiment 18 of the fuel cell power generating system according to the present invention.

The fuel cell power generating system according to the embodiment 18 differs from the system according to the embodiment 11 shown in FIG. 12 in that a combustor 76 is provided which receives an anode exhaust gas 19 and a cathode exhaust gas 17 to cause combustion.

Now, an operation of the fuel cell power generating system according to this embodiment will be described with reference to FIG. 19. The anode exhaust gas 19 and the cathode exhaust gas 17 are supplied to the combustor 76 to cause combustion of unreacted methane and unreacted hydrogen in the anode exhaust gas 19 with unreacted oxygen in the cathode exhaust gas 17, thereby producing a high-temperature exhaust gas 78. The high-temperature exhaust gas 78 can be used as a heat source for hot-water supply, heating and cooling using an absorption refrigerator, thereby enhancing the total thermal efficiency of the system including electric power and heat utilization.

As in the embodiment 11, according to this embodiment, since steam in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 15 in which the cathode exhaust gas 17, instead of the air 79, is supplied to the combustor 76. The embodiment 16 can be modified in the same manner to provide the same advantage as this embodiment.

Embodiment 19

Figure 20:
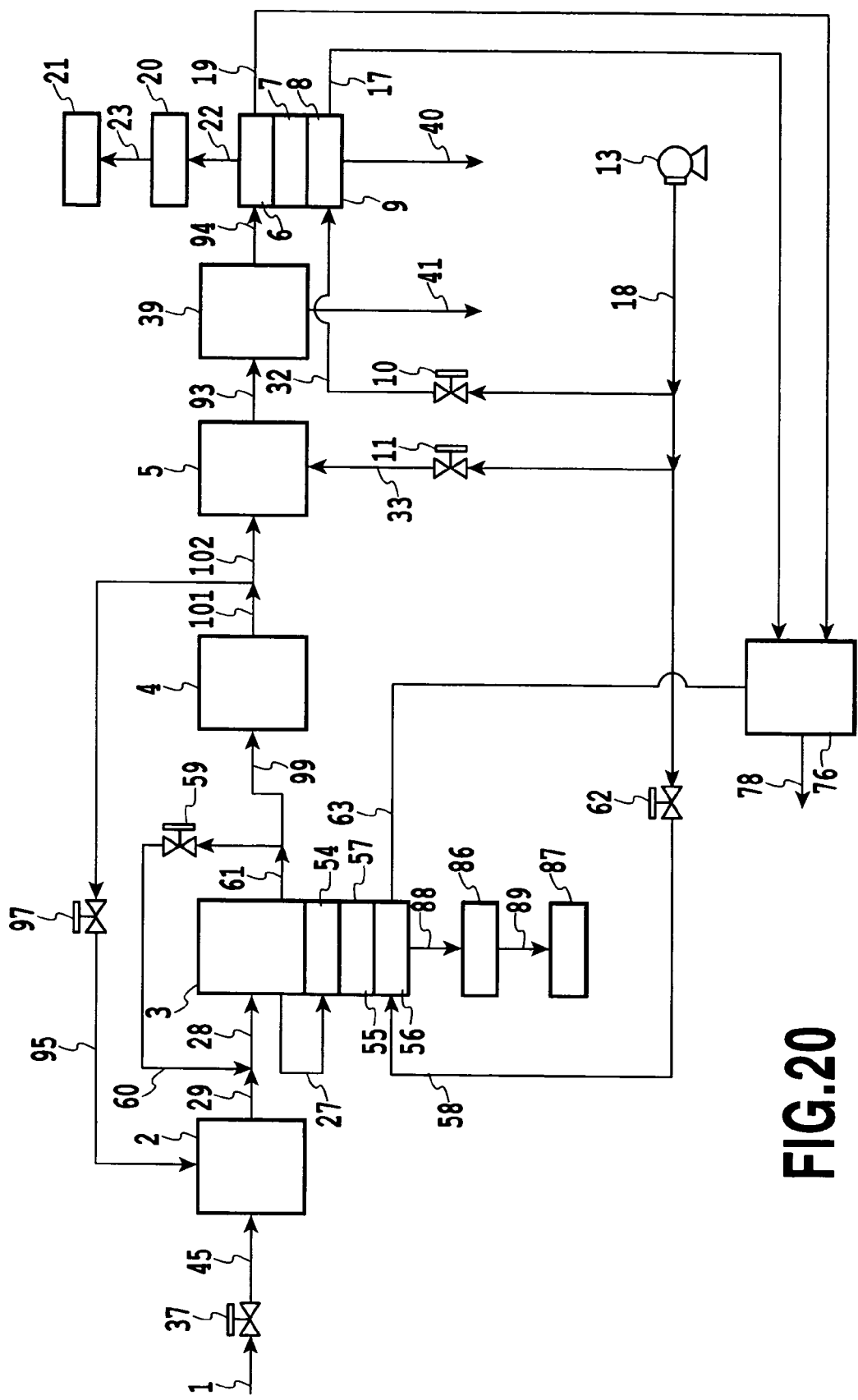
FIG. 20 is a diagram showing an embodiment 19 of the fuel cell power generating system according to the present invention.

FIG. 20 is a diagram showing an embodiment 19 of the fuel cell power generating system according to the present invention.

The fuel cell power generating system according to the embodiment 19 differs from the system according-to the embodiment 11 shown in FIG. 12 in that a combustor 76 is provided which receives an anode exhaust gas 19, a cathode exhaust gas 17 and a cathode exhaust gas 63 to cause combustion.

Now, an operation of the fuel cell power generating system according to this embodiment will be described with reference to FIG. 20. The anode exhaust gas 19, the cathode exhaust gas 17 and the cathode exhaust gas 63 are supplied to the combustor 76 to cause combustion of unreacted methane and unreacted hydrogen in the anode exhaust gas 19 with unreacted oxygen in the cathode exhaust gas 17 and the cathode exhaust gas 63, thereby producing a high-temperature exhaust gas 78. The high-temperature exhaust gas 78 can be used as a heat source for hot-water supply, heating and cooling using an absorption refrigerator, there by enhancing the total thermal efficiency of the system including electric power and heat utilization.

As in the embodiment 11, according to this embodiment, since steam in an anode exhaust gas 61 from a solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. Thus, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 15 in which the cathode exhaust gas 17 and 63, instead of the air 79, is supplied to the combustor 76. The embodiment 16 can be modified in the same manner to provide the same advantage as this embodiment.

Embodiment 20

Figure 21:
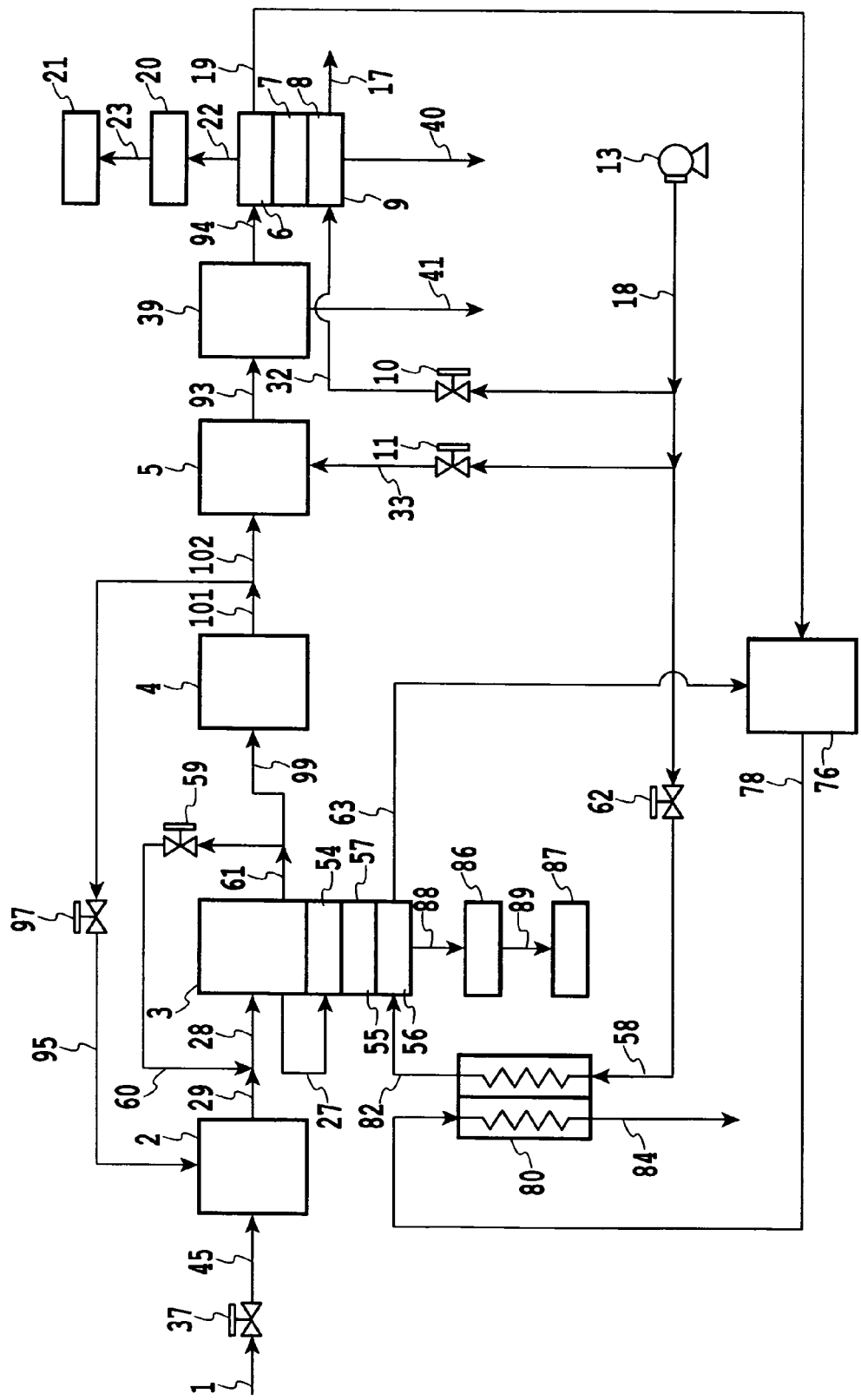
FIG. 21 is a diagram showing an embodiment 20 of the fuel cell power generating system according to the present invention.

FIG. 21 is a diagram showing an embodiment 20 of the fuel cell power generating system according to the present invention.

The fuel cell power generating system according to the embodiment 20 differs from the system according to the embodiment 11 shown in FIG. 12 in that there are provided a combustor 76 which receives an anode exhaust gas 19 and a cathode exhaust gas 63 to cause combustion and an air preheater 80 which receives an exhaust gas 78 of the combustor 76 and air 58 and increases the temperature of the air 58 by heat exchange between the exhaust gas 78 and the air 58.

Now, an operation of the fuel cell power generating system according to this embodiment will be described with reference to FIG. 21. In the air preheater 80, the temperature of the air 58 is increased by heat exchange between the high temperature exhaust gas 78 and the air 58. Air 82, which has been increased in temperature, is supplied to a cathode 56 of a solid oxide fuel cell stack 57 and used for power generation by the solid oxide fuel cell stack 57. The exhaust gas 78 having experienced heat exchange with the air 58 in the air preheater 80 is ejected as an exhaust gas 84.

As in the embodiment 11, according to this embodiment, since steam in an anode exhaust gas 61 from the solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. In addition, the exhaust gas 78 can be used for increasing the temperature of the air 58. Therefore, the energy required for temperature-increase and supply of the air 58 can be reduced, and accordingly, the sending end efficiency of the solid oxide fuel cell stack 57 can also be improved. As a result, the sending end efficiency of the entire system is enhanced, and the sending end output power of the entire system is increased.

This embodiment is a modification of the embodiment 17 in which the air preheater 80 which causes heat exchange between the exhaust gas 78 and the air 58 is additionally provided. The same addition can be made to the embodiments 15, 16, 18 and 19 to provide the same advantage as this embodiment.

Embodiment 21

Figure 22:
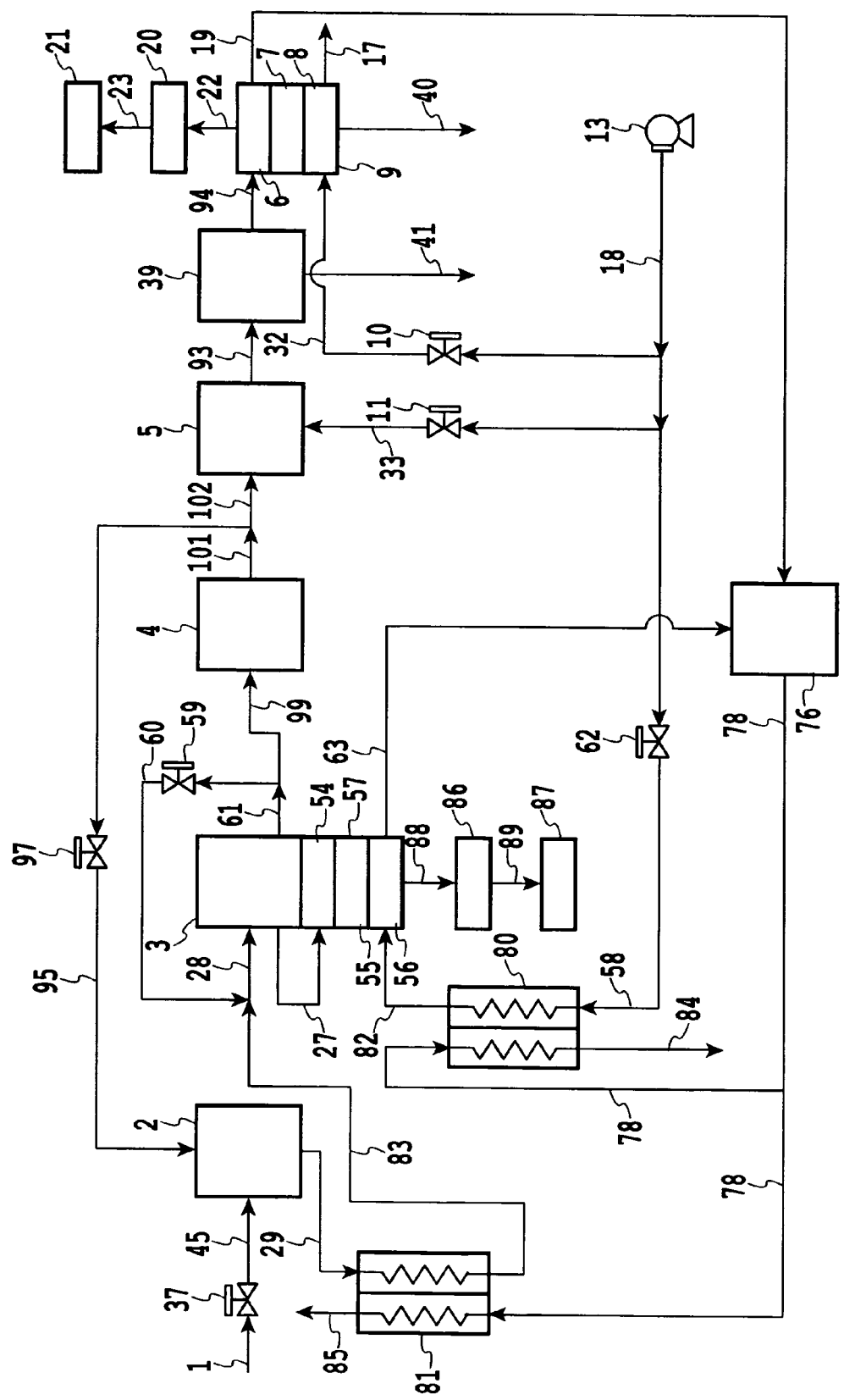
FIG. 22 is a diagram showing an embodiment 21 of the fuel cell power generating system according to the present invention.

FIG. 22 is a diagram showing an embodiment 21 of the fuel cell power generating system according to the present invention.

The fuel cell power generating system according to the embodiment 21 differs from the system according to the embodiment 11 shown in FIG. 12 in that there are provided a combustor 76 which receives an anode exhaust gas 19 and a cathode exhaust gas 63 to cause combustion, an air preheater 80 which receives an exhaust gas 78 of the combustor 76 and air 58 and increases the temperature of the air 58 by heat exchange between the exhaust gas 78 and the air 58, and a fuel preheater 81 which receives the exhaust gas 78 and a desulfurized natural gas 29 and increases the temperature of the desulfurized natural gas 29 by heat exchange between the exhaust gas 78 and the desulfurized natural gas 29.

Now, an operation of the fuel cell power generating system according to this embodiment will be described with reference to FIG. 22. In the air preheater 80, the temperature of the air 58 is increased by heat exchange between some of the high temperature exhaust gas 78 and the air 58. Air 82, which has been increased in temperature, is supplied to a cathode 56 of a solid oxide fuel cell stack 57 and used for power generation by the solid oxide fuel cell stack 57. The exhaust gas 78 having experienced heat exchange with the air 58 in the air preheater 80 is ejected as an exhaust gas 84.

Besides, in the fuel preheater 81, the temperature of the desulfurized natural gas 29 is increased by heat exchange between the remainder of the high temperature exhaust gas 78 of the combustor and the desulfurized natural gas 29. A desulfurized natural gas 83, which has been increased in temperature, is mixed with a recycled anode exhaust gas 60, and the resulting mixture gas 28 of steam and the desulfurized natural gas is supplied to a reformer 3. The exhaust gas 78 having experienced heat exchange with the desulfurized natural gas 29 in the fuel preheater 81 is ejected as an exhaust gas 85.

As in the embodiment 11, according to this embodiment, since steam in an anode exhaust gas 61 from the solid oxide fuel cell stack 57 is used for the steam reforming reaction of hydrocarbon, the carbureter 14 (FIG. 1) for producing steam is not necessary, and the energy required for vaporizing water can be reduced compared to the conventional system shown in FIG. 1. In addition, since the waste heat from the solid oxide fuel cell stack 57 is used for the steam reforming reaction of hydrocarbon in a reformer 3, the energy externally supplied for the steam reforming reaction can be reduced. Thus, the sending end efficiency of a polymer electrolyte fuel cell stack 9 can be improved.

In addition, since the waste heat from the solid oxide fuel cell stack 57 is used for the steam reforming reaction of hydrocarbon in the reformer 3, the amount of air 58 required for cooling can be reduced compared to conventional solid oxide fuel cell power generating systems. In addition, the exhaust gas 78 of the combustor 76 can be used for increasing the temperature of the air 58. Therefore, the energy required for temperature-increase and supply of the air 58 can be reduced, and accordingly, the sending end efficiency of the solid oxide fuel cell stack 57 can also be improved.

Furthermore, since the exhaust gas 78 of the combustor 76 is used for increasing the temperature of the desulfurized natural gas 29, the energy required for increasing the temperature of the desulfurized natural gas 29 can also be reduced, and thus, the sending end efficiency of the solid oxide fuel cell stack 57 can be further improved. As a result, the sending end efficiency of the entire system is enhanced, and the sending end output power of the entire system is increased.

This embodiment is a modification of the embodiment 17 in which the air preheater 80 and the fuel preheater 81 are additionally provided. The air preheater 80 causes heat exchange between the exhaust gas 78 and the air 58, and the fuel preheater 81 causes heat exchange between the exhaust gas 78 and the desulfurized natural gas 29. The same addition can be made to the embodiments 15, 16, 18 and 19 to provide the same advantage as this embodiment.

In the embodiments 11, 12 and 15 to 21 of the present invention shown in FIGS. 12, 13 and 16 to 22, respectively, there is provided only one reformer 3. However, two reformers can be used. That is, instead of the reformer 3, there can be used a first stage pre-reformer which primarily causes a steam reforming reaction of hydrocarbons in the natural gas which have two or more carbon atoms and are susceptible to thermal decomposition at a relatively low temperature, and a second stage stack reformer which primarily causes a steam reforming reaction of methane, which is less susceptible to thermal decomposition. Besides, in the embodiments of the present invention shown in FIGS. 14 and 15, a pre-reformer which primarily causes a steam reforming reaction of hydrocarbons in the natural gas which have two or more carbon atoms and are susceptible to thermal decomposition at a relatively low temperature may be provided between the desulfurizer 2 and the solid oxide fuel cell stack 57.

Method of Controlling Fuel Cell Power Generating System

Figure 23:
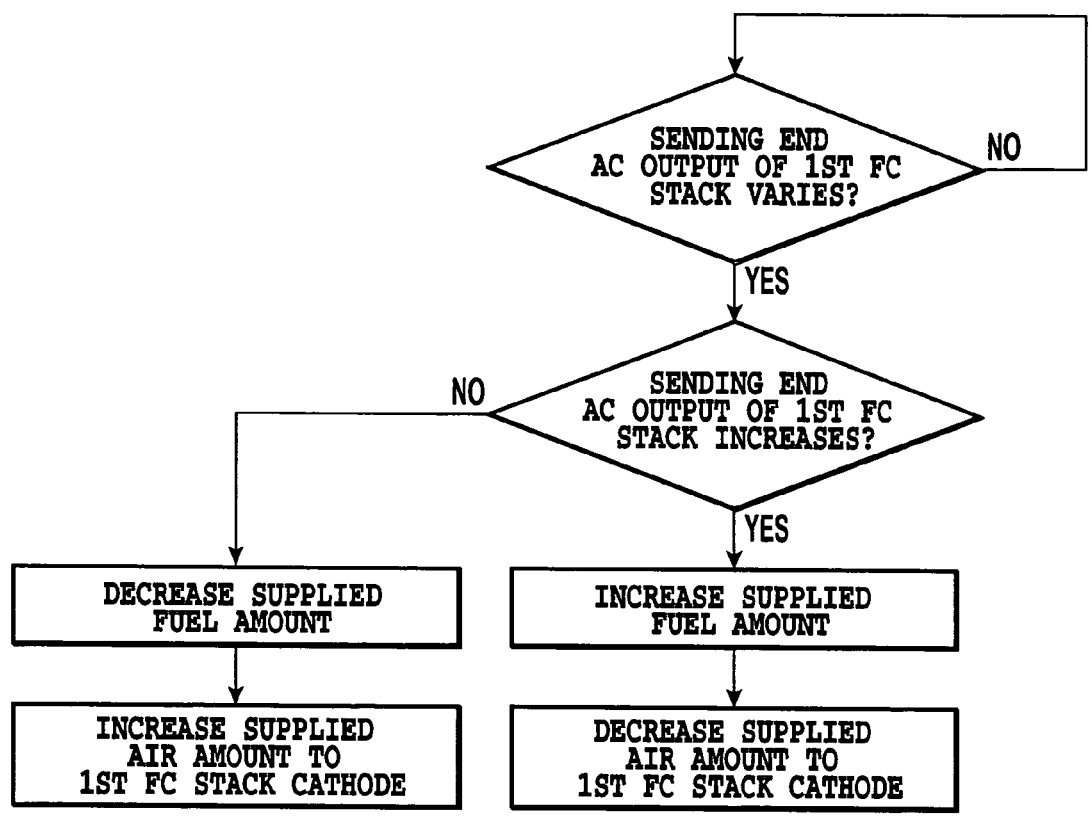
FIG. 23 is a system flow diagram showing an example of a method of controlling the fuel cell power generating system according to the present invention.
Figure 24:
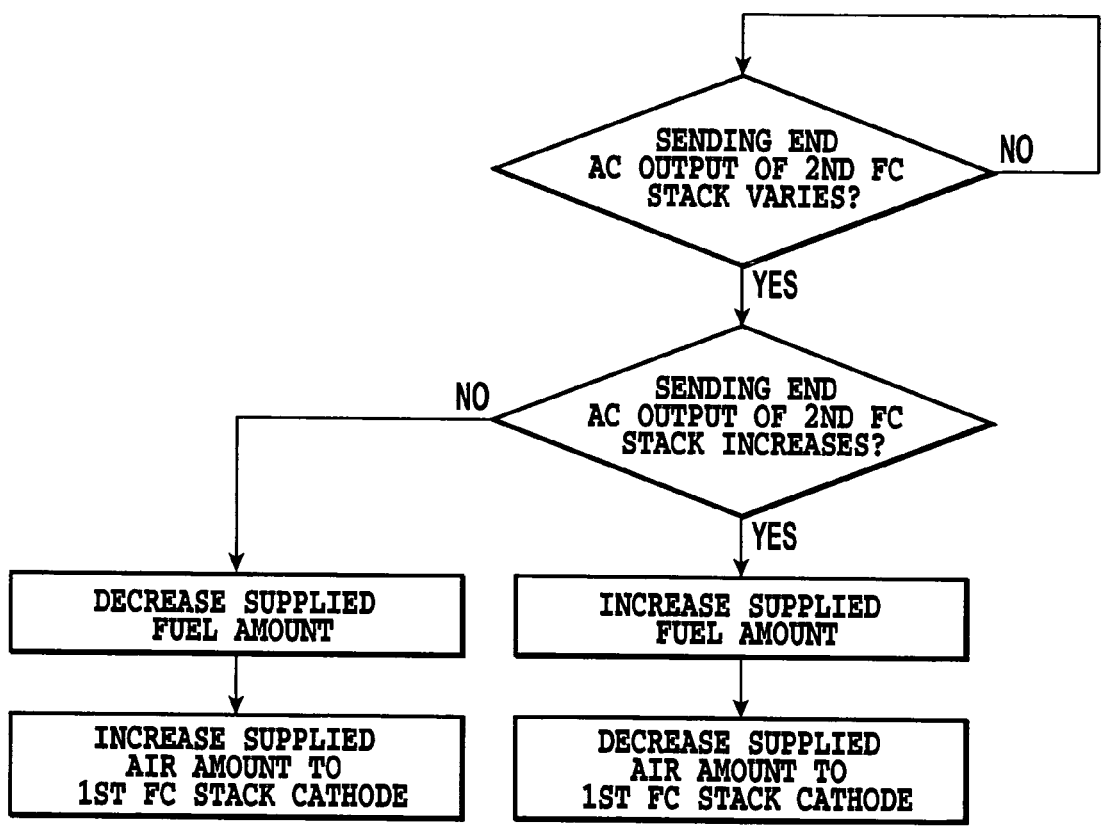
FIG. 24 is a system flow diagram showing another example of the method of controlling the fuel cell power generating system according to the present invention.

FIGS. 23 and 24 are system flow diagrams showing methods of controlling a fuel cell power generating system according to the present invention. An example is described in which a control method of the present invention in the fuel cell power generating system of the embodiment 1 as shown in FIG. 2.

According to the method of controlling the fuel cell power generating system according to the present invention shown in FIG. 23, if an AC output power 89 of a first fuel cell stack (1st FC Stack), that is, a solid oxide fuel cell stack 57 increases with increase of a load 87, a flow control valve 37 is opened to increase the amount of a supplied fuel (natural gas 45), and a flow control valve 62 is closed to decrease the amount of air supplied to a cathode of the first fuel cell stack (air 58 to a cathode 56 of the solid oxide fuel cell stack 57), thereby raising the oxygen utilization ratio at a cathode 56.

On the other hand, if the AC output power 89 of the solid oxide fuel cell stack 57 decreases with decrease of the load 87, the flow control valve 37 is closed to decrease the amount of the supplied fuel (natural gas 45), and the flow control valve 62 is opened to increase the amount of air supplied to the cathode of the first fuel cell stack (air 58 to the cathode 56 of the solid oxide fuel cell stack 57).

Thus, when the AC output power 89 of the solid oxide fuel cell stack 57 increases, more heat is required for the steam reforming reaction (endothermic reaction) of hydrocarbon, which is a component of the natural gas, in the reformer 3. Here, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, the waste heat supplied from the solid oxide fuel dell stack 57 to a reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and a polymer electrolyte fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, according to the control method shown in FIG. 24, if an AC output power 23 of a second fuel cell stack(2nd FC Stack), that is, a polymer electrolyte fuel cell stack 9 increases with increase of a load 21, the flow control valve 37 is opened to increase the amount of the supplied fuel (natural gas 45), and the flow control valve 62 is closed to decrease the amount of the air supplied to the cathode of the first fuel cell stack (air 58 to the cathode 56 of the solid oxide fuel cell stack 57), thereby raising the oxygen utilization ratio at the cathode 56.

On the other hand, if the AC output power 23 of the polymer electrolyte fuel cell stack 9 decreases with decrease of the load 21, the flow control valve 37 is closed to decrease the amount of the supplied fuel (natural gas 45), and the flow control valve 62 is opened to increase the amount of the air supplied to the cathode of the first fuel cell stack (air 58 to the cathode 56 of the solid oxide fuel cell stack 57), thereby reducing the oxygen utilization ratio at the cathode 56.

The amount of air 32 supplied to a cathode 8 of the polymer electrolyte fuel cell stack 9 can be arbitrarily controlled. That is, the amount of the air 32 supplied to the cathode 8 may be increased or decreased with the AC output power 23 of the polymer electrolyte fuel cell stack 9 so that the oxygen utilization ratio at the cathode 8 is kept constant. Alternatively, the amount of the air 32 supplied to the cathode 8 may be kept constant so that the oxygen utilization ratio at the cathode 8 may vary.

Thus, when the AC output power 23 of the polymer electrolyte fuel cell stack 9 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Now, effects provided when the control methods shown in FIGS. 23 and 24 are implemented in the fuel cell power generating system according to the embodiment 1 to decrease the amount of the supplied air 58 will be described specifically.

Figure 25:
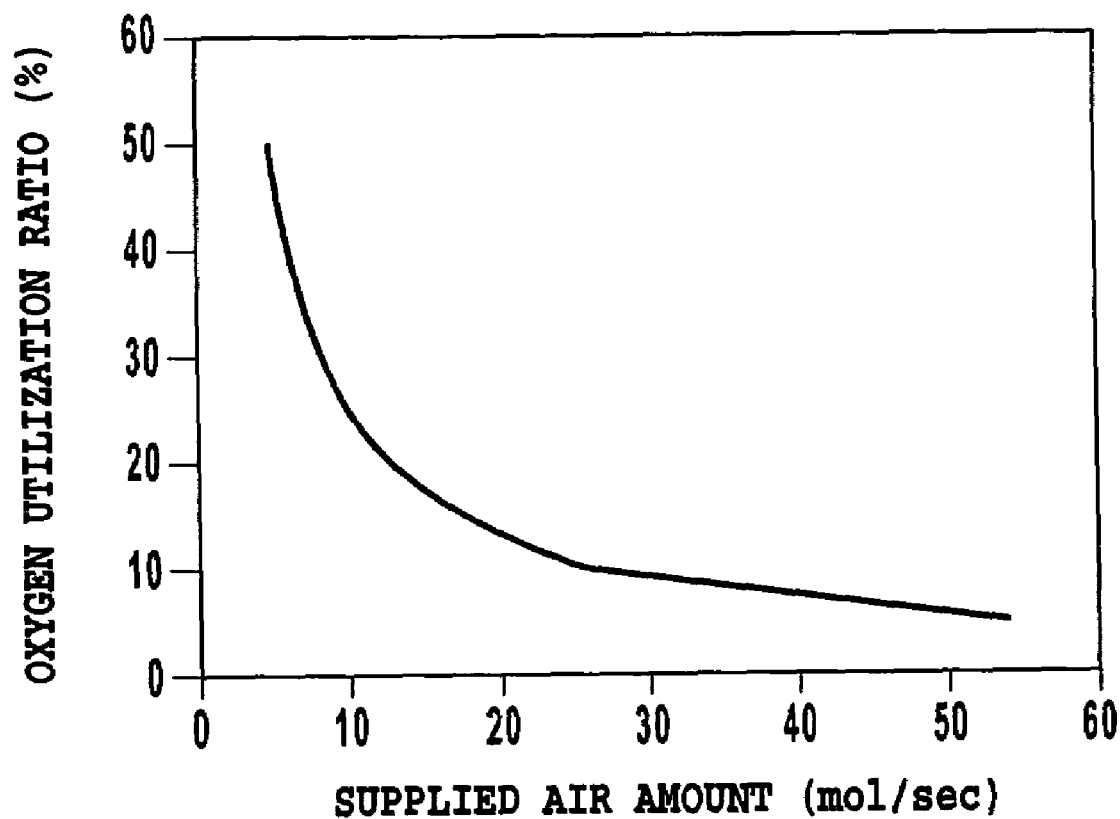
FIG. 25 is a characteristic diagram showing a relationship between the amount of air supplied to a cathode of a solid oxide fuel cell stack and the oxygen utilization ratio.
Figure 26:
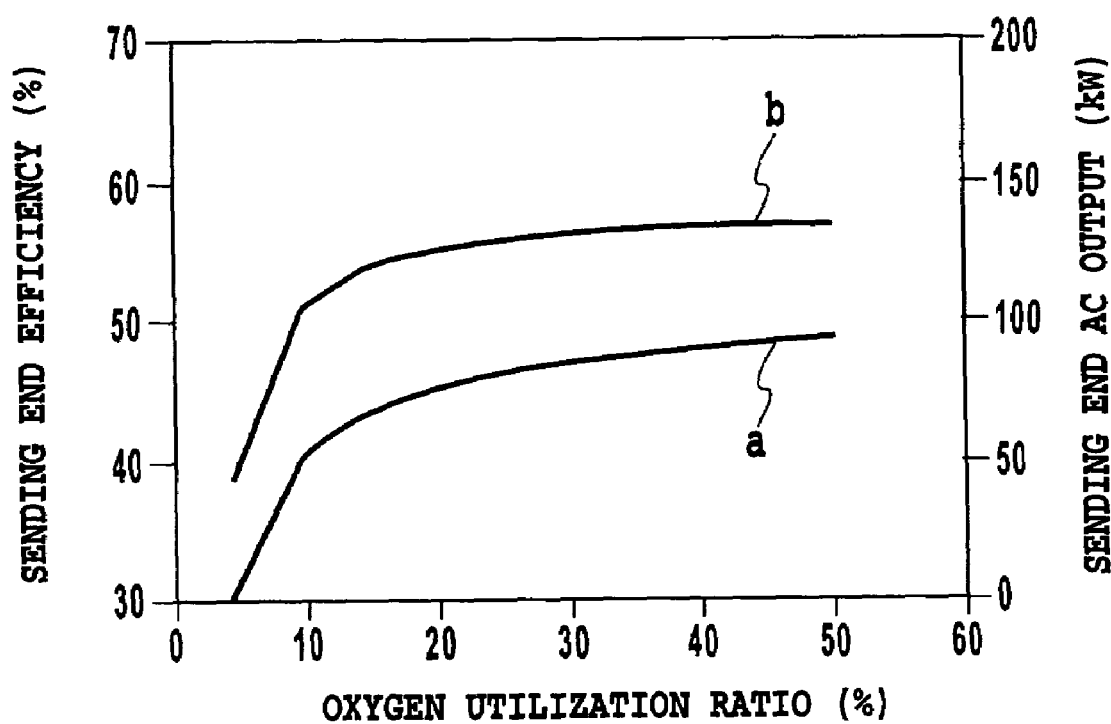
FIG. 26 is a characteristic diagram showing the sending end AC output power of the solid oxide fuel cell stack and the sending end efficiency of the entire system with respect to the oxygen utilization ratio.

FIGS. 25 and 26 are characteristic diagrams showing an effect provided in the case where the control method shown in FIG. 24 is implemented.

FIG. 25 shows a relationship between the amount of the air 58 for power generation supplied to the cathode 56 of the solid oxide solid oxide fuel cell stack 57 (horizontal axis) and the oxygen utilization ratio at the cathode 56 of the solid oxide fuel cell stack 57 (vertical axis). The AC output power 89 at the sending end of the solid oxide fuel cell stack 57 is 100 kW, and the maximum temperature of the solid oxide fuel cell stack 57 is 1000 degrees C.

As can be seen from FIG. 25, when the amount of the supplied air 58 decreases, the oxygen utilization ratio at the cathode 56 of the solid oxide fuel cell stack 57 increases on an inverse proportional basis.

FIG. 26 shows a relationship between the AC output power 23 at the sending end of the polymer electrolyte fuel cell stack 9 (right-side vertical axis) and the oxygen utilization ratio at the cathode 56 (horizontal axis) and a relationship between the sending end efficiency of the entire system (left-side vertical axis) and the oxygen utilization ratio at the cathode 56 (horizontal axis). The AC output power 89 at the sending end of the solid oxide fuel cell stack 57 is 100 kW, the maximum temperature of the solid oxide fuel cell stack 57 is 1000 degrees C., the fuel utilization ratio at the cathode 54 of the solid oxide fuel cell stack 57 is 80%, and the fuel utilization at the anode 6 of the polymer electrolyte fuel cell stack 9 is 85%.

The AC output power 89 denotes by "a" is a maximum AC output power at the sending end of the polymer electrolyte fuel cell stack 9 which can be generated using hydrogen produced by a steam reforming reaction of a fuel (natural gas, the same in the following) using the waste heat of the solid oxide fuel cell stack 57. The sending end efficiency denoted by "b" is a system sending end efficiency of the entire power generating system comprising the solid oxide fuel cell stack 57 and the polymer electrolyte fuel cell stack 9.

As can be seen from FIG. 26, if the oxygen utilization ratio at the cathode 56 of the solid oxide fuel cell stack 57 is raised by decreasing the amount of the air 58 supplied to the cathode 56, the AC output power 23 denoted by "a" increases and the sending end efficiency of the entire system denoted by "b" also increases. However, it can also be seen that as the oxygen utilization ratio is raised, the AC output power 23 and the sending end efficiency of the entire system each come close to a constant value. Since the rising curves of the two are of substantially the same profile, it can be concluded that the increase of the AC output power 23 causes the sending end efficiency of the entire system to increase.

If the oxygen utilization ratio is low, a great amount of air 58 is supplied to the cathode 56 of the solid oxide fuel cell stack 57. Therefore, a great amount of waste heat of the solid oxide fuel cell stack 57 is used for preheating the air 58, and the solid oxide fuel cell stack 57 is cooled by the air 58 more effectively. On the other hand, if the oxygen utilization ratio is high, a small amount of air 58 is supplied to the cathode 56. Therefore, the amount of the waste heat of the solid oxide fuel cell stack 57 used for preheating the air 58 is reduced, and the solid oxide fuel cell stack 57 is cooled by the air 58 less effectively.

As a result, if the oxygen utilization ratio is raised, the waste heat of the solid oxide fuel cell stack 57, which would otherwise be used for preheating the air 58 to be supplied to the cathode 56 of the solid oxide fuel cell stack 57 or wasted via cooling by the air 58, can be efficiently used for producing hydrogen, which is required for power generation by the polymer electrolyte fuel cell stack 9. Thus, the system sending end efficiency increases. However, as the oxygen utilization ratio increases, the effect of the efficient utilization of the waste heat of the solid oxide fuel cell stack 57 on the increase of the sending end efficiency of the entire system decreases.

In the case shown in FIGS. 25 and 26, raising the oxygen utilization ratio can provide a high sending end efficiency of the entire system of 55% or higher.

Figure 27:
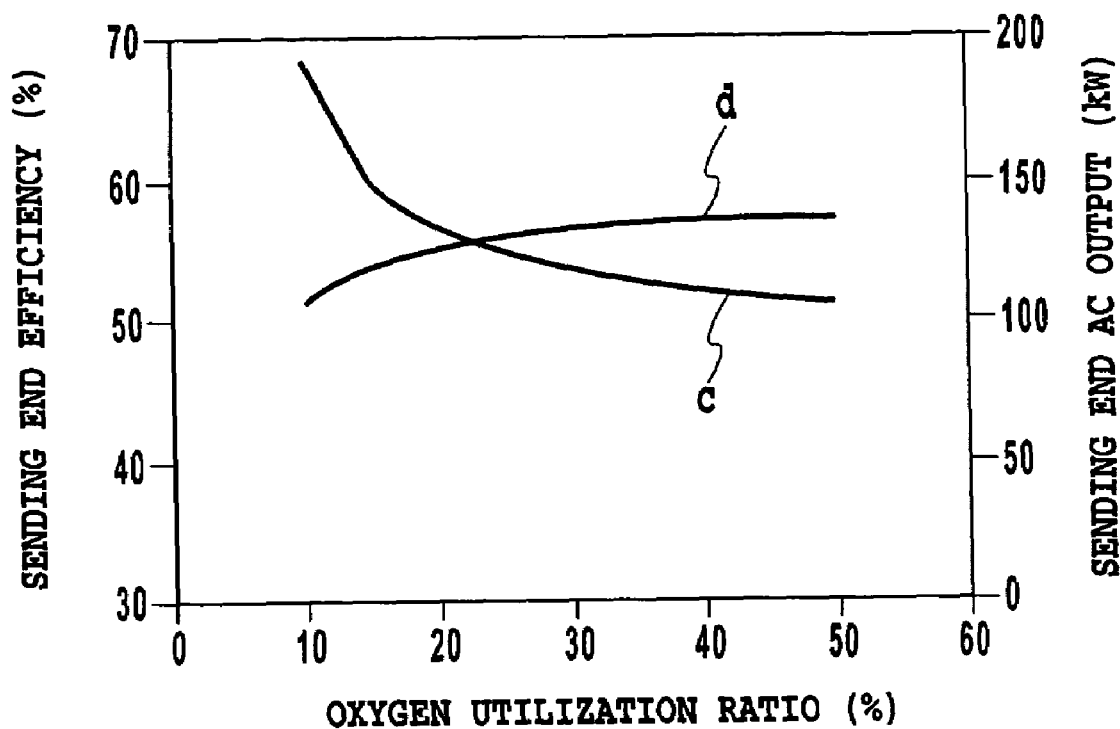
FIG. 27 is a characteristic diagram showing the sending end AC output power of the polymer electrolyte fuel cell stack and the sending end efficiency of the entire system with respect to the oxygen utilization ratio.

FIG. 27 is a characteristic diagram showing an effect provided when the control method shown in FIG. 23 is implemented to decrease the amount of the supplied air 58. Here, the relationship between the amount of the power generating air 58 supplied to the cathode 56 of the solid oxide fuel cell stack 57 and the oxygen utilization ratio at the cathode 56 is the same as that shown in FIG. 25, assuming that the AC output power 23 at the sending end of the polymer electrolyte fuel cell stack 9 is 100 kW, and the maximum temperature of the solid oxide fuel cell stack 57 is 1000 degrees C. If the amount of the supplied air 58 decreases, the oxygen utilization ratio at the cathode 56 of the solid oxide fuel cell stack 57 increases on an inverse proportional basis.

FIG. 27 shows a relationship between the AC output power 89 at the sending end of the solid oxide fuel cell stack 57 (right-side vertical axis) and the oxygen utilization ratio at the cathode 56 (horizontal axis) and a relationship between the sending end efficiency of the entire system (left-side vertical axis) and the oxygen utilization ratio (horizontal axis) at the cathode 56. The AC output power 23 at the sending end of the polymer electrolyte fuel cell stack 9 is 100 kW, the maximum temperature of the solid oxide fuel cell stack 57 is 1000 degrees C., the fuel utilization ratio at the anode 54 of the solid oxide fuel cell stack 57 is 80%, and the fuel utilization at the anode 26 of the polymer electrolyte fuel cell stack 9 is 85%.

The AC output power 89 denotes by "c" is a minimum AC output power at the sending end of the solid oxide fuel cell stack 57 with which hydrogen required for power generation of the polymer electrolyte fuel cell stack 9 can be generated by a steam reforming reaction of a fuel using waste heat. The sending end efficiency denoted by "d" is a system sending end efficiency of the entire power generating system comprising the solid oxide fuel cell stack 57 and the polymer electrolyte fuel cell stack 9.

As can be seen from FIG. 27, if the oxygen utilization ratio at the cathode 56 is raised by decreasing the amount of the air 58 supplied to the cathode 56 of the solid oxide fuel cell stack 57, the AC output power 89 denoted by "c" decreases and the sending end efficiency of the entire system denoted by "d" increases. However, it can also be seen that as the oxygen utilization ratio increases, the AC output power 89 and the sending end efficiency of the entire system each come close to a constant value.

If the oxygen utilization ratio is low, a great amount of air 58 is supplied to the cathode 56 of the solid oxide fuel cell stack 57. Therefore, a great amount of waste heat of the solid oxide fuel cell stack 57 is used for preheating the air 58, and the solid oxide fuel cell stack 57 is cooled by the air 58 more effectively. Therefore, the AC output power 89 of the solid oxide fuel cell stack 57 increases, the AC output power 89 being required for producing hydrogen by a steam reforming reaction of a fuel using waste heat, the hydrogen being required for power generation of the polymer electrolyte fuel cell stack 9. On the other hand, if the oxygen utilization ratio is high, a small amount of air 58 is supplied to the cathode 56. Therefore, the amount of the waste heat of the solid oxide fuel cell stack 57 used for preheating the air 58 is reduced, and the solid oxide fuel cell stack 57 is cooled by the air 58 less effectively.

Thus, if the oxygen utilization ratio is raised, the waste heat of the solid oxide fuel cell stack 57, which would otherwise be used for preheating the air 58 to be supplied to the cathode 56 of the solid oxide fuel cell stack 57 or wasted via cooling by the air 58, can be efficiently used for producing hydrogen, which is required for power generation by the polymer electrolyte fuel cell stack 9. As a result, the AC output power 89 of the solid oxide fuel cell stack 57 decreases, the AC output power 89 being required for producing hydrogen by a steam reforming reaction of a fuel using waste heat, the hydrogen being required for power generation of the polymer electrolyte fuel cell stack 9.

The sending end efficiency of the entire system denoted by "d" in FIG. 27 increases when the oxygen utilization ratio increases and the AC output power 89 at the sending end of the solid oxide fuel cell stack 57 decreases. However, the increase is not significant. The increase of the sending end efficiency of the entire system is caused by a voltage of the polymer electrolyte fuel cell stack 9 higher than a voltage of the solid oxide fuel cell stack 57. However, the effect of the voltage difference on the sending end efficiency of the entire system is less significant than the effect of the efficient utilization of the waste heat described with reference to FIG. 26, and thus, the increase of the sending end efficiency is reduced.

In the case shown in FIG. 27 also, raising the oxygen utilization ratio can provide a high sending end efficiency of the entire system of 55% or higher.

Figure 28:
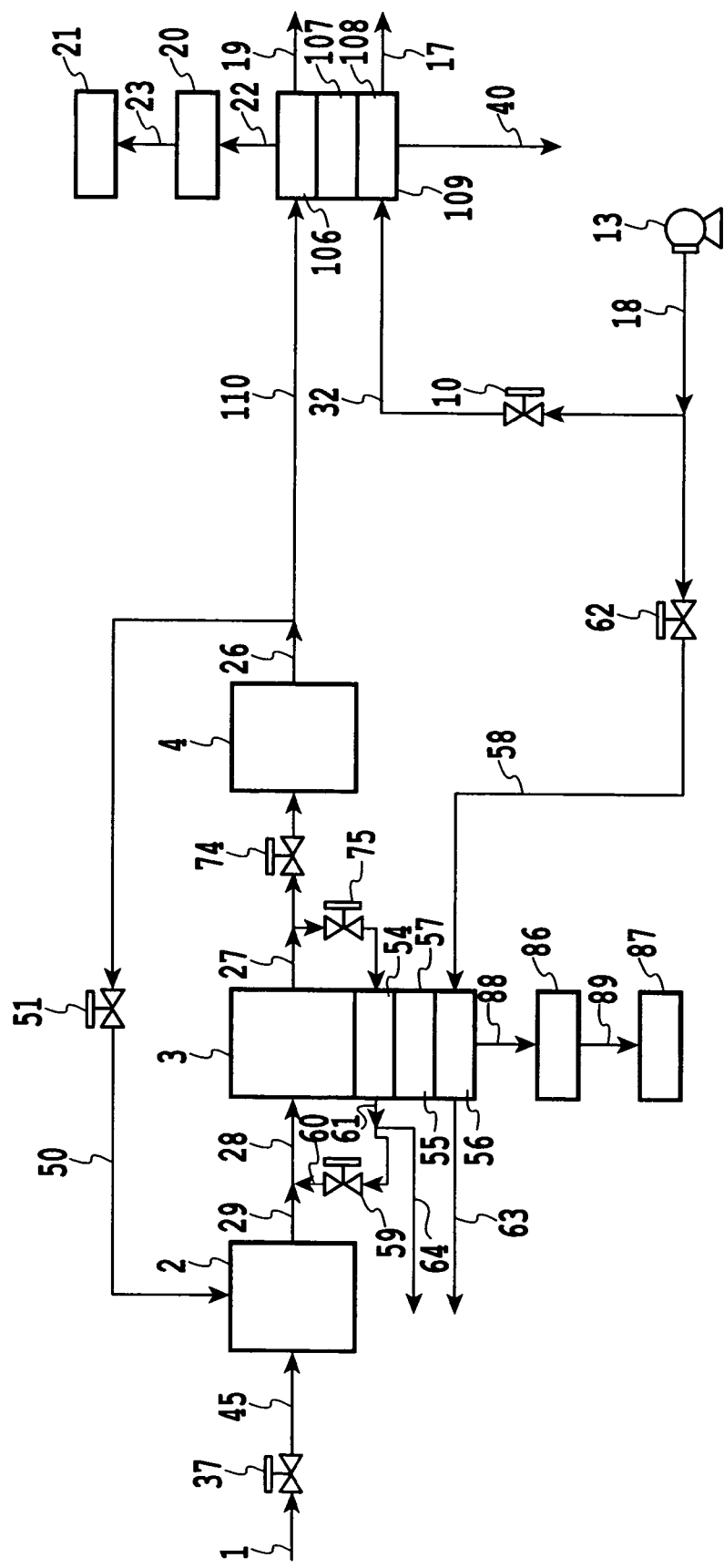
FIG. 28 is a diagram showing an alternative embodiment of the fuel cell power generating system to which the control methods according to the present invention are effectively applied.
Figure 29:
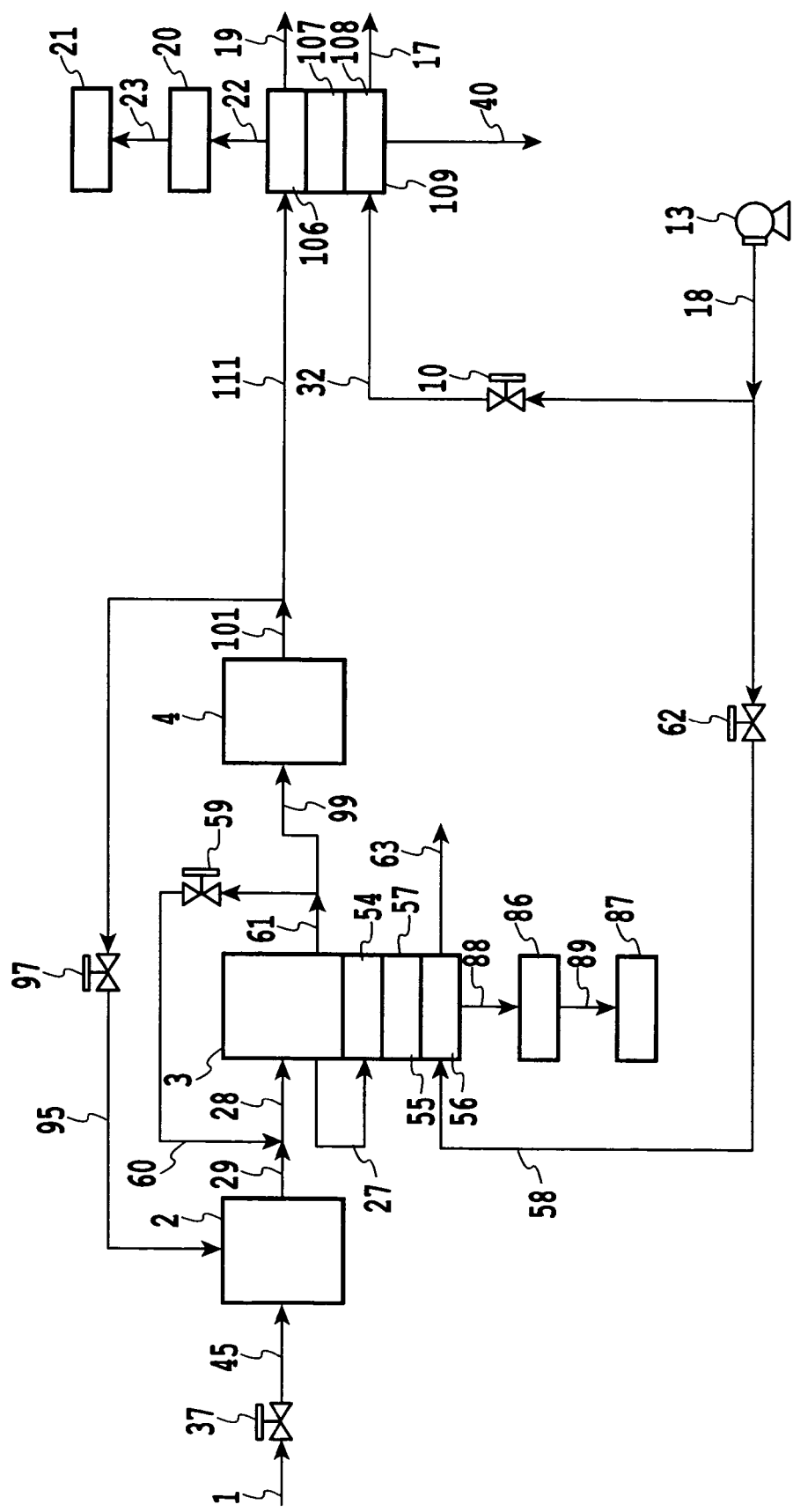
FIG. 29 is a diagram showing an alternative embodiment of the fuel cell power generating system to which the control methods according to the present invention are effectively applied.
Figure 30:
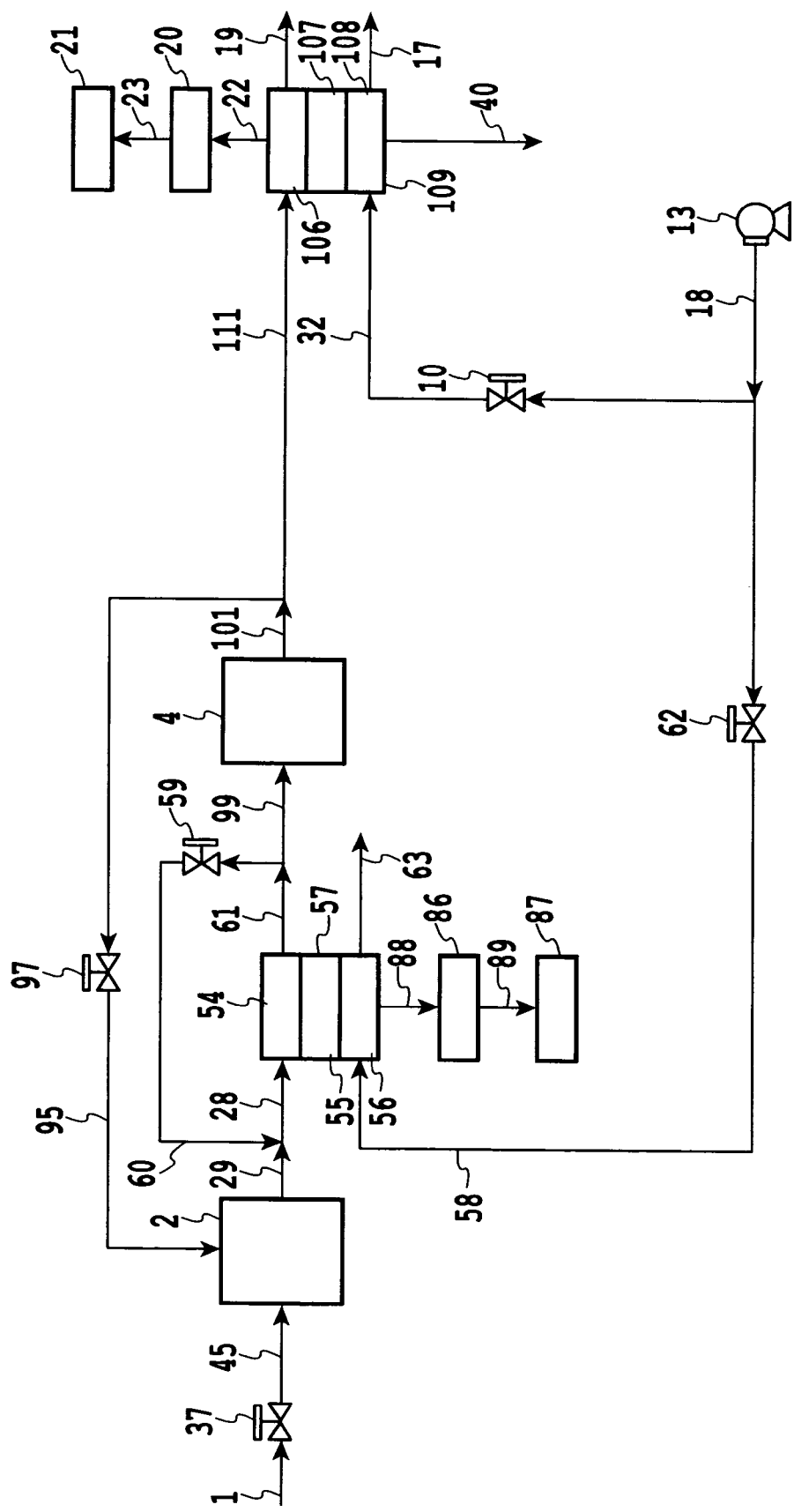
FIG. 30 is a diagram showing an alternative embodiment of the fuel cell power generating system to which the control methods according to the present invention are effectively applied.

The method of controlling the fuel cell power generating system according to the present invention can be effectively applied not only to the fuel cell power generating system according to the embodiment 1 (FIG. 2) but also to the fuel cell power generating systems according to the embodiments 2 (FIG. 3) and 11 to 14 (FIGS. 12 to 15, respectively). Furthermore, it can be effectively applied to alternative embodiments of the fuel cell power generating system, the configurations of which are shown in FIGS. 28 to 30.

In the following, examples in which the control methods according to the present invention are applied to the furl cell power generating systems according to the embodiments mentioned above will be described.

Examples in which the control methods according to the present invention are applied to the fuel cell power generating system according to the embodiment 2 shown in FIG. 3 will be described.

In the case where the control method according to the present invention shown in FIG. 23 is applied to the fuel cell power generating system according to the embodiment 2, when the AC output power 89 of the solid oxide fuel cell stack 57 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, in the case where the control method according to the present invention shown in FIG. 24 is applied to the fuel cell power generating system according to the embodiment 2, when the AC output power 23 of the polymer electrolyte fuel cell stack 9 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Now, examples in which the control methods according to the present invention are applied to the fuel cell power generating system according to the embodiment 11 shown in FIG. 12 will be described.

In the case where the control method according to the present invention shown in FIG. 23 is applied to the fuel cell power generating system according to the embodiment 11, when the AC output power 89 of the solid oxide fuel cell stack 57 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, in the case where the control method according to the present invention shown in FIG. 24 is applied to the fuel cell power generating system according to the embodiment 11, when the AC output power 23 of the polymer electrolyte fuel cell stack 9 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the-reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Now, examples in which the control methods according to the present invention are applied to the fuel cell power generating system according to the embodiment 12 shown in FIG. 13 will be described.

In the case where the control method according to the present invention shown in FIG. 23 is applied to the fuel cell power generating system according to the embodiment 12, when the AC output power 89 of the solid oxide fuel cell stack 57 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, the waste heat supplied from the solid oxide fuel cell stack 57 to there former 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, in the case where the control method according to the present invention shown in FIG. 24 is applied to the fuel cell power generating system according to the embodiment 12, when the AC output power 23 of the polymer electrolyte fuel cell stack 9 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Now, examples in which the control methods according to the present invention are applied to the fuel cell power generating system according to the embodiment 13 shown in FIG. 14 will be described.

In the case where the control method according to the present invention shown in FIG. 23 is applied to the fuel cell power generating system according to the embodiment 13, when the AC output power 89 of the solid oxide fuel cell stack 57 increases, and more heat is required for the steam reforming reaction of hydrocarbon, which is a component of the natural gas, at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, predetermined amounts of hydrogen and carbon monoxide can be stably produced at the anode 54 while keeping the temperature of the solid oxide fuel cell stack 57 within a predetermined temperature range. As a result, deterioration of the solid oxide fuel cell stack 57 due to temperature increase thereof is suppressed, and the life of the solid oxide fuel cell stack 57 and the system reliability can be prevented from being reduced.

Furthermore, in the case where the control method according to the present invention shown in FIG. 24 is applied to the fuel cell power generating system according to the embodiment 13, when the AC output power 23 of the polymer electrolyte fuel cell stack 9 increases, and more heat is required for the steam reforming reaction of hydrocarbon, which is a component of the natural gas, at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. Therefore, predetermined amounts of hydrogen and carbon monoxide can be produced at the anode 54 while keeping the temperature of the solid oxide fuel cell stack 57 within a predetermined temperature range. As a result, deterioration of the solid oxide fuel cell stack 57 due to temperature in crease thereof is suppressed, and the life of the solid oxide fuel cell stack 57 and the system reliability can be prevented from being reduced.

Now, examples in which the control methods according to the present invention are applied to the fuel cell power generating system according to the embodiment 14 shown in FIG. 15 will be described.

In the case where the control method according to the present invention shown in FIG. 23 is applied to the fuel cell power generating system according to the embodiment 14, when the AC output power 89 of the solid oxide fuel cell stack 57 increases, and more heat is required for the steam reforming reaction of hydrocarbon, which is a component of the natural gas., at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, predetermined amounts of hydrogen and carbon monoxide can be stably produced at the anode 54 while keeping the temperature of the solid oxide fuel cell stack 57 within a predetermined temperature range. As a result, deterioration of the solid oxide fuel cell stack 57 due to temperature increase thereof is suppressed, and the life of the solid oxide fuel cell stack 57 and the system reliability can be prevented from being reduced.

Furthermore, in the case where the control method according to the present invention shown in FIG. 24 is applied to the fuel cell power generating system according to the embodiment 14, when the AC output power 23 of the polymer electrolyte fuel cell stack 9 increases, and more heat is required for the steam reforming reaction of hydrocarbon, which is a component of the natural gas, at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the polymer electrolyte fuel cell stack 9 can generate a predetermined AC output power with high efficiency at their respective sending ends, and decreases of the power and sending end efficiency of the entire system can be suppressed.

On the other hand, when the AC output power 23 of the polymer electrolyte fuel cell stack 9 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. Therefore, predetermined amounts of hydrogen and carbon monoxide can be produced at the anode 54 while keeping the temperature of the solid oxide fuel cell stack 57 within a predetermined temperature range. As a result, deterioration of the solid oxide fuel cell stack 57 due to temperature increase thereof is suppressed, and the life of the solid oxide fuel cell stack 57 and the system reliability can be prevented from being reduced.

FIG. 28 shows a system configuration of an alternative embodiment of the fuel cell power generating system to which the control methods according to the present invention are effectively applied. Reference numeral 109 denotes a phosphoric acid fuel cell stack, and the phosphoric acid fuel cell stack 109 comprises an anode 106, a phosphoric acid electrolyte 107 and a cathode 108. For the sake of convenience, FIG. 28 shows the phosphoric acid fuel cell stack 109 constituted by a unit cell consisting of a set of the anode 106, the phosphoric acid electrolyte 107 and the cathode 108. In practical, however, the phosphoric acid fuel cell stack 109 comprises a plurality of unit cells. Reference numeral 110 denotes a reformed gas for the phosphoric acid fuel cell stack 109.

The fuel cell power generating system according to this alternative embodiment shown in FIG. 28 differs from the fuel cell power generating system according to the embodiment 1 (FIG. 2) in that the CO selective oxidizer 5 and the condenser 39 are omitted and the phosphoric acid fuel cell stack 109 is used as the second fuel cell stack, instead of the polymer electrolyte fuel cell stack 9. That is, the system according to this alternative embodiment is the fuel cell power generating system modified in such a manner that the phosphoric acid fuel cell stack 109 is used as the second fuel cell stack, and the reformed gas 26 ejected from the CO shift converter 4 is supplied to the anode 106 of the phosphoric acid fuel cell stack 109 as it is as a reformed gas 110.

Now, an operation of this fuel cell power generating system will be described with reference to FIG. 28. Part of the reformed gas 26 having the CO concentration reduced to 1% or lower produced in the CO shift converter 4 is supplied to the anode 106 of the phosphoric acid fuel cell stack 109, which is the second fuel cell stack, as the reformed gas 110 for the phosphoric acid fuel cell stack 109. On the other hand, air 32 which is some of air 18 taken in by an air supply blower 13 is supplied to the cathode 108 of the phosphoric acid fuel cell stack 109. The amount of the supplied air 32 is set to a value appropriate to the cell current of a DC output power 22 by controlling the degree of opening of a flow control valve 10 based on a preset relationship between the cell current of the DC output power 22 of the phosphoric acid fuel cell stack 109 and the degree of opening of the flow control valve 10 (i.e. the amount of the supplied air 32). The power generating temperature of the phosphoric acid fuel cell stack 109 is typically 190 degrees C., and is maintained by the heat generated by the cell reaction.

At the anode 106 of the phosphoric acid fuel cell stack 109, by the action of a platinum-based electrode catalyst, about 80% of hydrogen contained in the reformed gas 110 for the phosphoric acid fuel cell stack 109 is changed into hydrogen ions and electrons through the anode reaction expressed by the equation (4), as in the case of the polymer electrolyte fuel cell stack 9.

The hydrogen ions produced at the anode 106 move in the phosphoric acid electrolyte 107 and reach the cathode 108. On the other hand, the electrons produced at the anode 106 move through an external circuit (not shown) and reach the cathode 108. In the process of the electrons moving through the external circuit, electric energy can be extracted as the DC output power 22.

At the cathode 108 of the phosphoric acid fuel cell stack. 109, by the action of the platinum-based electrode catalyst, the hydrogen ions having moved from the anode 106 to the cathode 108 through the phosphoric acid electrolyte 107, the electrons having moved from the anode 106 to the cathode 108 through the external circuit, and the oxygen in the air 32 supplied to the cathode 108 react with each other to form steam, the reaction being the cathode reaction expressed by the equation (5).

Bringing together the equations (4) and (5), the cell reaction in the phosphoric acid fuel cell stack 109 can be expressed as a reverse reaction of the electrolysis of water expressed by the equation (6), in which hydrogen and oxygen react with each other to form steam.

The DC output power 22 generated by the phosphoric acid fuel cell stack 109 is subjected to voltage conversion and DC/AC conversion appropriate to a load 21 in a power adjusting device 20 and then supplied to the load 21 as an AC output power 23. In FIG. 28, the power adjusting device 20 performs DC/AC conversion. However, the power adjusting device 20 may perform only voltage conversion and the DC output power at the sending end may be supplied to the load 21.

The air 32 is ejected as a cathode exhaust gas 17 of the phosphoric acid fuel cell stack 109 after some of oxygen therein is consumed at the cathode 108 by the cathode reaction expressed by the equation (5). On the other hand, the reformed gas 110 for the phosphoric acid fuel cell stack 109 is ejected as an anode exhaust gas 19 of the phosphoric acid fuel cell stack 109 after about 80% of hydrogen therein is consumed at the anode 106 by the anode reaction expressed by the equation (4).

In the case where the control method according to the present invention shown in FIG. 23 is applied to the fuel cell stack according to this alternative embodiment, when the AC output power 89 of the solid oxide fuel cell stack 57 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cells tack 57 increases. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, in the case where the control method according to the present invention shown in FIG. 24 is applied to the fuel cell power generating system according to this alternative embodiment, when the AC output power 23 of the phosphoric acid fuel cell stack 109 increases with increase of the load 21, the flow control valve 37 is opened to increase the amount of the supplied fuel (natural gas 45), and the flow control valve 62 is closed to decrease the amount of the air supplied to the cathode of the first fuel cell stack (air 58 to the cathode 56 of the solid oxide fuel cell stack 57), thereby raising the oxygen utilization ratio at the cathode 56.

On the other hand, when the AC output power 23 of the phosphoric acid fuel cell stack 109 decreases with decrease of the load 21, the flow control valve 37 is closed to decrease the amount of the supplied fuel (natural gas 45), and the flow control valve 62 is opened to increase the amount of the air supplied to the cathode of the first fuel cell stack (air 58 to the cathode 56 of the solid oxide fuel cell stack 57), thereby reducing the oxygen utilization ratio at the cathode 56.

The amount of the air 32 supplied to the cathode 108 of the phosphoric acid fuel cell stack 109 can be arbitrarily controlled. That is, the amount of the air 32 supplied to the cathode 108 may be increased or decreased with the AC output power 23 of the phosphoric acid fuel cell stack 109 so that the oxygen utilization ratio at the cathode 108 is kept constant. Alternatively, the amount of the air 32 supplied to the cathode 108 may be kept constant so that the oxygen utilization ratio at the cathode 108 may vary.

Thus, when the AC output power 23 of the phosphoric acid fuel cell stack 109 increases, more heat is required for the steam reforming reaction of hydrocarbon in the reformer 3, which is a component of the natural gas. Here, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 23 of the phosphoric acid fuel cell stack 109 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

FIG. 29 shows a system configuration of an alternative embodiment of the fuel cell power generating system to which the control methods according to the present invention are effectively applied. The system according to this alternative embodiment shown in FIG. 29 is the fuel cell power generating system according to the embodiment 11 (FIG. 12) modified in the same manner as in FIG. 28 described above. Reference numeral 111 denotes an anode exhaust gas for the phosphoric acid fuel cell stack 109.

The fuel cell power generating system according to this alternative embodiment of shown in FIG. 29 differs from the fuel cell power generating system shown in FIG. 12 in that the CO selective oxidizer 5 and the condenser 39 are omitted, and the phosphoric acid fuel cell stack 109 is used as the second fuel cell stack, instead of the polymer electrolyte fuel cell stack 9.

Now, an operation of the fuel cell power generating system according to this alternative embodiment will be described with reference to FIG. 29. Part of the anode exhaust gas 101 of the solid oxide fuel cell stack 57 which is produced in the CO shift converter 4 and has the CO concentration reduced to 1% or lower is supplied to the anode 106 of the phosphoric acid fuel cell stack 109, which is the second fuel cell stack, as the anode exhaust gas 111 for the phosphoric acid fuel cell stack 109.

In the case where the control method according to the present invention shown in FIG. 23 is applied to the fuel cell stack according to this alternative embodiment, when the AC output power 89 of the solid oxide fuel cell stack 57 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

Furthermore, in the case where the control method according to the present invention shown in FIG. 24 is applied to the fuel cell power generating system according to this alternative embodiment, when the AC output power 23 of the phosphoric acid fuel cell stack 109 increases, and more heat is required for the steam reforming reaction of hydrocarbon in the reformer 3, which is a component of the natural gas, air cooling of the solid oxide fuel cell stack 57 is suppressed by decreasing the amount of the air 58 supplied to the cathode 56 of the solid oxide fuel cell stack 57. Therefore, the waste heat supplied from the solid oxide fuel cell stack 57 to the reformer 3 can be increased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 23 of the phosphoric acid fuel cell stack 109 decreases, less heat is required for the steam reforming reaction of hydrocarbon in the reformer 3, which is a component of the natural gas. Here, air cooling of the solid oxide fuel cell stack 57 is promoted by increasing the amount of the air 58 supplied to the cathode 56 of the solid oxide fuel cell stack 57. Therefore, the waste heat supplied from the solid oxide fuel cell stack 57 to the reformer 3 can be decreased, and thus, predetermined amounts of hydrogen and carbon monoxide can be stably produced in the reformer 3 while keeping the temperatures of the reformer 3 and the solid oxide fuel cell stack 57 within a predetermined temperature range. As a result, deteriorations of a reforming catalyst of the reformer 3 and the solid oxide fuel cell stack 57 due to temperature increase of the reformer 3 and the solid oxide fuel cell stack 57 are suppressed, and the lives of the reformer 3 and the solid oxide fuel cell stack 57 and the system reliability can be prevented from being reduced.

FIG. 30 shows a system configuration of an alternative embodiment of the fuel cell power generating system to which the control methods according to the present invention are effectively applied. The system according to this alternative embodiment shown in FIG. 30 is the fuel cell power generating system according to the embodiment 13 (FIG. 14) modified in the same manner as in FIG. 28 described above.

The fuel cell power generating system according to this alternative embodiment of shown in FIG. 30 differs from the fuel cell power generating system shown in FIG. 14 in that the CO selective oxidizer 5 and the condenser 39 are omitted, and the phosphoric acid fuel cell stack 109 is used as the second fuel cell stack, instead of the polymer electrolyte fuel cell stack 9. The operation of the fuel cell power generating system according to this alternative embodiment is the same as that of the fuel cell power generating system shown in FIG. 29.

In the case where the control method according to the present invention shown in FIG. 23 is applied to the fuel cell power generating system according to this alternative embodiment, when the AC output power 89 of the solid oxide fuel cell stack 57 increases, and more heat is required for the steam reforming reaction of hydrocarbon, which is a component of the natural gas, at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. In addition, the heat generated by the solid oxide fuel cell stack 57 increases because the amount of the power generated by the solid oxide fuel cell stack 57 increases. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 89 of the solid oxide fuel cell stack 57 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. In addition, the heat generated by the solid oxide fuel cell stack 57 decreases because the amount of the power generated by the solid oxide fuel cell stack 57 decreases. Therefore, predetermined amounts of hydrogen and carbon monoxide can be stably produced at the anode 54 while keeping the temperature of the solid oxide fuel cell stack 57 within a predetermined temperature range. As a result, deterioration of the solid oxide fuel cell stack 57 due to temperature increase thereof is suppressed, and the life of the solid oxide fuel cell stack 57 and the system reliability can be prevented from being reduced.

Furthermore, in the case where the control method according to the present invention shown in FIG. 24 is applied to the fuel cell power generating system according to this alternative embodiment, when the AC output power 23 of the phosphoric acid fuel cell stack 109 increases, and more heat is required for the steam reforming reaction of hydrocarbon, which is a component of the natural gas, at the anode 54 of the solid oxide fuel cell stack 57, air cooling of the solid oxide fuel cell stack 57 is suppressed by decreasing the amount of the air 58 supplied to the cathode 56 of the solid oxide fuel cell stack 57. Therefore, predetermined amounts of hydrogen and carbon monoxide can be stably produced at the anode 54 while keeping the temperature of the solid oxide fuel cell stack 57 within a predetermined temperature range. As a result, the solid oxide fuel cell stack 57 and the phosphoric acid fuel cell stack 109 can generate a predetermined AC output power with high efficiency at their respective sending ends, and decreases of the power and sending end efficiency of the entire system can be suppressed.

On the other hand, when the AC output power 23 of the phosphoric acid fuel cell stack 109 decreases, less heat is required for the steam reforming reaction of hydrocarbon, which is a component of the natural gas, at the anode 54 of the solid oxide fuel cell stack 57. Here, air cooling of the solid oxide fuel cell stack 57 is promoted by increasing the amount of the air 58 supplied to the cathode 56 of the solid oxide fuel cell stack 57. Therefore, predetermined amounts of hydrogen and carbon monoxide can be produced at the anode 54 while keeping the temperature of the solid oxide fuel cell stack 57 within a predetermined temperature range. As a result, deterioration of the solid oxide fuel cell stack 57 due to temperature increase thereof is suppressed, and the life of the solid oxide fuel cell stack 57 and the system reliability can be prevented from being reduced.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A fuel cell power generating system for generating power by electrochemical reaction of hydrogen with oxygen, comprising:
   reforming means for producing a reformed gas containing hydrogen by a steam reforming reaction of a fuel;
   a first power generating means adjacently located to the reforming means whose temperature is maintained in a predetermined range, for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, a flow control valve being controlled so as to reduce the amount of said waste heat if an amount of said reformed gas produced increases and so as to increase the amount of said waste heat if the amount of said reformed gas produced decreases;
   converting means for converting carbon monoxide in said reformed gas into carbon dioxide and hydrogen by reaction of said carbon monoxide with steam;
   oxidizing means for converting carbon monoxide ejected from said converting means into carbon dioxide by oxidation; and
   second power generating means for generating power by electrochemical reaction of hydrogen ejected from said oxidizing means with oxygen,
   wherein an anode exhaust gas containing unreacted hydrogen from the first power generating means is supplied to the second power generating means through said converting means and said oxidizing means,
   a flow control valve being controlled such that an amount of air supplied to said first power generating means is controlled so as to be decreased if an amount of said fuel supplied to the reforming means increases and so as to be increased if the amount of said fuel supplied decreases.

2. The fuel cell power generating system as claimed in claim 1, wherein said fuel cell power generating system comprises:
   means for determining whether an output power of a first power generating means increases or decreases; and
   means for decreasing an amount of air supplied to said first power generating means when said output power of said first power generating means increases, or increasing said amount of said air when said output power of said first power generating means decreases.

3. The fuel cell power generating system as claimed in claim 1, wherein said fuel cell power generating system comprises:
   means for determining whether an output power of a second power generating means increases or decreases; and
   means for decreasing an amount of air supplied to a first power generating means when said output power of said second power generating means increases, or increasing said amount of said air when said output power of said second power generating means decreases.

4. A method of controlling a fuel cell power generating system as claimed in claim 1, comprising the steps of:
   determining whether an output power of a first power generating means increases or decreases; and
   decreasing an amount of air supplied to said first power generating means when said output power of said first power generating means increases, or increasing said amount of said air when said output power of said first power generating means decreases.

5. A method of controlling a fuel cell power generating system as claimed in claim 1, comprising the steps of:
   determining whether an output power of a second power generating means increases or decreases; and
   decreasing an amount of air supplied to a first power generating means when said output power of said second power generating means increases, or increasing said amount of said air when said output power of said second power generating means decreases.

6. A fuel cell power generating system for generating power by an electrochemical reaction of hydrogen with oxygen, comprising:
   reforming means for producing a reformed gas containing hydrogen by a steam reforming reaction of a fuel;
   adjacent said reforming means, a first power generating means for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, a flow control valve being controlled so as to reduce the amount of said waste heat if an amount of said reformed gas produced increases and so as to increase the amount of said waste heat if the amount of said reformed gas produced decreases;
   converting means for converting carbon monoxide in said reformed gas into carbon dioxide and hydrogen by reaction of said carbon monoxide with steam; and
   second power generating means for generating power by electrochemical reaction of hydrogen ejected from said converting means with oxygen,
   a flow control valve being controlled such that an amount of air supplied to said first power generating means is controlled so as to be decreased if an amount of said fuel supplied to the reforming means increases and so as to be increased if the amount of said fuel gas supplied decreases.

7. The fuel cell power generating system as claimed in claim 6, wherein said fuel cell power generating system comprises:
   means for determining whether an output power of a first power generating means increases or decreases; and
   means for decreasing an amount of air supplied to said first power generating means when said output power of said first power generating means increases, or increasing said amount of said air when said output power of said first power generating means decreases.

8. The fuel cell power generating system as claimed in claim 6, wherein said fuel cell power generating system comprises:
means for determining whether an output power of a second power generating means increases or decreases; and
means for decreasing an amount of air supplied to a first power generating means when said output power of said second power generating means increases, or increasing said amount of said air when said output power of said second power generating means decreases.

9. A method of controlling a fuel cell power generating system as claimed in claim 6, comprising the steps of:
determining whether an output power of a first power generating means increases or decreases; and
decreasing an amount of air supplied to said first power generating means when said output power of said first power generating means increases, or increasing said amount of said air when said output power of said first power generating means decreases.

10. A method of controlling a fuel cell power generating system as claimed in claim 6, comprising the steps of:
determining whether an output power of a second power generating means increases or decreases; and
decreasing an amount of air supplied to a first power generating means when said output power of said second power generating means increases, or increasing said amount of said air when said output power of said second power generating means decreases.

11. A fuel cell power generating system for generating power by an electrochemical reaction of hydrogen with oxygen, comprising:
reforming means for producing a reformed gas containing hydrogen by a steam reforming reaction of a fuel;
adjacent said reforming means, a first power generating means for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, a flow control valve being controlled so as to reduce the amount of said waste heat if an amount of said reformed gas produced increases and so as to increase the amount of said waste heat if the amount of said reformed gas produced decreases;
converting means for converting carbon monoxide in said reformed gas into carbon dioxide and hydrogen by reaction of said carbon monoxide with steam;
separating means for separating hydrogen from an emission of said converting means; and
second power generating means for generating power by electrochemical reaction of the separated hydrogen with oxygen,
a flow control valve being controlled such that an amount of air supplied to said first power generating means is controlled so as to be decreased if an amount of said fuel supplied to the reforming means increases and so as to be increased if the amount of said fuel supplied decreases.

12. The fuel cell power generating system as claimed in claim 11, wherein said fuel cell power generating system comprises:
means for determining whether an output power of a first power generating means increases or decreases; and
means for decreasing an amount of air supplied to said first power generating means when said output power of said first power generating means increases, or increasing said amount of said air when said output power of said first power generating means decreases.

13. The fuel cell power generating system as claimed in claim 11, wherein said fuel cell power generating system comprises:
means for determining whether an output power of a second power generating means increases or decreases; and
means for decreasing an amount of air supplied to a first power generating means when said output power of said second power generating means increases, or increasing said amount of said air when said output power of said second power generating means decreases.

14. A method of controlling a fuel cell power generating system as claimed in claim 11, comprising the steps of:
determining whether an output power of a first power generating means increases or decreases; and
decreasing an amount of air supplied to said first power generating means when said output power of said first power generating means increases, or increasing said amount of said air when said output power of said first power generating means decreases.

15. A method of controlling a fuel cell power generating system as claimed in claim 11, comprising the steps of:
determining whether an output power of a second power generating means increases or decreases; and
decreasing an amount of air supplied to a first power generating means when said output power of said second power generating means increases, or increasing said amount of said air when said output power of said second power generating means decreases.

16. A fuel cell power generating system for generating power by an electrochemical reaction of hydrogen with oxygen, comprising:
reforming means for producing a reformed gas containing hydrogen by a steam reforming reaction of a fuel;
a first power generating means adjacently located to the reforming means whose temperature is maintained in a predetermined range, for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, an amount of said waste heat being controlled so as to be reduced if an amount of said reformed gas supplied increases and so as to be increased if the amount of said reformed gas supplied decreases;
converting means for converting carbon monoxide in said emission into carbon dioxide and hydrogen by reaction of said carbon monoxide with steam;
oxidizing means for converting carbon monoxide ejected from said converting means into carbon dioxide by oxidation; and
second power generating means for generating power by electrochemical reaction of hydrogen ejected from said oxidizing means with oxygen,
wherein an anode exhaust gas containing unreacted hydrogen from the first power generating means is supplied to the second power generating means through said converting means and said oxidizing means,
a flow control valve being controlled such that an amount of air supplied to said first power generating means is controlled so as to be decreased if an amount of said fuel supplied to the reforming means increases and so as to be increased if the amount of said fuel supplied decreases.

17. The fuel cell power generating system as claimed in claim 16, wherein said fuel cell power generating system comprises:
means for determining whether an output power of a first power generating means increases or decreases; and
means for decreasing an amount of air supplied to said first power generating means when said output power of said first power generating means increases, or increasing said amount of said air when said output power of said first power generating means decreases.

18. The fuel cell power generating system as claimed in claim 16, wherein said fuel cell power generating system comprises:
means for determining whether an output power of a second power generating means increases or decreases; and
means for decreasing an amount of air supplied to a first power generating means when said output power of said second power generating means increases, or increasing said amount of said air when said output power of said second power generating means decreases.

19. A method of controlling a fuel cell power generating system as claimed in claim 16, comprising the steps of:
determining whether an output power of a first power generating means increases or decreases; and
decreasing an amount of air supplied to said first power generating means when said output power of said first power generating means increases, or increasing said amount of said air when said output power of said first power generating means decreases.

20. A method of controlling a fuel cell power generating system as claimed in claim 16, comprising the steps of:
determining whether an output power of a second power generating means increases or decreases; and
decreasing an amount of air supplied to a first power generating means when said output power of said second power generating means increases, or increasing said amount of said air when said output power of said second power generating means decreases.

21. A fuel cell power generating system for generating power by an electrochemical reaction of hydrogen with oxygen, comprising:
reforming means for producing a reformed gas containing hydrogen by a steam reforming reaction of a fuel;
a first power generating means adjacently located to the reforming means whose temperature is maintained in a predetermined range, for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, a flow control valve being controlled so as to reduce the amount of said waste heat if an amount of said reformed gas produced increases and so as to increase the amount of said waste heat if the amount of said reformed gas produced decreases;
converting means for converting carbon monoxide in said emission into carbon dioxide and hydrogen by reaction of said carbon monoxide with steam; and
second power generating means for generating power by electrochemical reaction of hydrogen ejected from said converting means with oxygen,
wherein an anode exhaust gas containing unreacted hydrogen from the first power generating means is supplied to the second power generating means through said converting means,
a flow control valve being controlled such that an amount of air supplied to said first power generating means is controlled so as to be decreased if an amount of said fuel supplied to the reforming means increases and so as to be increased if the amount of said fuel supplied decreases.

22. The fuel cell power generating system as claimed in claim 21, wherein said fuel cell power generating system comprises:
means for determining whether an output power of a first power generating means increases or decreases; and
means for decreasing an amount of air supplied to said first power generating means when said output power of said first power generating means increases, or increasing said amount of said air when said output power of said first power generating means decreases.

23. The fuel cell power generating system as claimed in claim 21, wherein said fuel cell power generating system comprises:
means for determining whether an output power of a second power generating means increases or decreases; and
means for decreasing an amount of air supplied to a first power generating means when said output power of said second power generating means increases, or increasing said amount of said air when said output power of said second power generating means decreases.

24. A method of controlling a fuel cell power generating system as claimed in claim 21, comprising the steps of:
determining whether an output power of a first power generating means increases or decreases; and
decreasing an amount of air supplied to said first power generating means when said output power of said first power generating means increases, or increasing said amount of said air when said output power of said first power generating means decreases.

25. A method of controlling a fuel cell power generating system as claimed in claim 21, comprising the steps of:
determining whether an output power of a second power generating means increases or decreases; and
decreasing an amount of air supplied to a first power generating means when said output power of said second power generating means increases, or increasing said amount of said air when said output power of said second power generating means decreases.

26. A fuel cell power generating system for generating power by electrochemical reaction of hydrogen with oxygen, comprising:
reforming means for producing a reformed gas containing hydrogen by a steam reforming reaction of a fuel;
a first power generating means adjacently located to the reforming means whose temperature is maintained in a predetermined range, for generating power by electrochemical reaction of hydrogen or hydrogen and carbon monoxide in said reformed gas with oxygen and supplying waste heat required for said steam reforming reaction and recycling an emission containing steam resulting from said power generation to said reforming means, a flow control valve being controlled so as to reduce the amount of said waste heat if an amount of said reformed gas produced increases and so as to increase the amount of said waste heat if the amount of said reformed gas produced decreases;
converting means for converting carbon monoxide in said emission into carbon dioxide and hydrogen by reaction of said carbon monoxide with steam;
separating means for separating hydrogen from an emission of said converting means; and second power generating means for generating power by electrochemical reaction of the separated hydrogen with oxygen, wherein an anode exhaust gas containing unreacted hydrogen from the first power generating means is supplied to the second power generating means through said converting means, a flow control valve being controlled such that an amount of air supplied to said first power generating means is controlled so as to be decreased if an amount of said fuel supplied to the reforming means increases and so as to be increased if the amount of said fuel supplied decreases.

27. The fuel cell power generating system as claimed in claim 26, wherein said fuel cell power generating system comprises:

means for determining whether an output power of a first power generating means increases or decreases; and means for decreasing an amount of air supplied to said first power generating means when said output power of said first power generating means increases, or increasing said amount of said air when said output power of said first power generating means decreases.

28. The fuel cell power generating system as claimed in claim 26, wherein said fuel cell power generating system comprises:

means for determining whether an output power of a second power generating means increases or decreases; and means for decreasing an amount of air supplied to a first power generating means when said output power of said second power generating means increases, or increasing said amount of said air when said output power of said second power generating means decreases.

29. A method of controlling a fuel cell power generating system as claimed in claim 26, comprising the steps of:

determining whether an output power of a first power generating means increases or decreases; and decreasing an amount of air supplied to said first power generating means when said output power of said first power generating means increases, or increasing said amount of said air when said output power of said first power generating means decreases.

30. A method of controlling a fuel cell power generating system as claimed in claim 26, comprising the steps of:

determining whether an output power of a second power generating means increases or decreases; and decreasing an amount of air supplied to a first power generating means when said output power of said second power generating means increases, or increasing said amount of said air when said output power of said second power generating means decreases.

* * * * *